(12) United States Patent
Mori et al.

(10) Patent No.: US 7,576,167 B2
(45) Date of Patent: Aug. 18, 2009

(54) CURABLE RESIN COMPOSITION

(75) Inventors: Shigeki Mori, Osaka (JP); Yukihiro Nomura, Saitama (JP); Kazuhiro Iyo, Osaka (JP); Shinichi Sato, Saitama (JP)

(73) Assignee: Konishi Co., Ltd. (JP)

( * ) Notice: Subject to any disclaimer, the term of this patent is extended or adjusted under 35 U.S.C. 154(b) by 385 days.

(21) Appl. No.: 10/564,843

(22) PCT Filed: Jul. 16, 2004

(86) PCT No.: PCT/JP2004/010549

§ 371 (c)(1),
(2), (4) Date: Jan. 13, 2006

(87) PCT Pub. No.: WO2005/007751

PCT Pub. Date: Jan. 27, 2005

(65) Prior Publication Data

US 2006/0189736 A1 Aug. 24, 2006

(30) Foreign Application Priority Data

Jul. 18, 2003 (JP) .............................. 2003-277042

(51) Int. Cl.
*C08G 77/06* (2006.01)
(52) U.S. Cl. .............................. 528/13; 528/14; 528/34; 528/35; 525/477
(58) Field of Classification Search ........................ None
See application file for complete search history.

(56) References Cited

U.S. PATENT DOCUMENTS

| 5,723,516 A | * | 3/1998 | Bigham et al. .............. 523/205 |
| 6,025,445 A | | 2/2000 | Chiba et al. |
| 2003/0149152 A1 | * | 8/2003 | Hao .......................... 524/435 |

FOREIGN PATENT DOCUMENTS

| EP | 0145518 A1 | 6/1985 |
| GB | 2230783 A | 10/1990 |
| JP | 2-228376 | 9/1990 |
| JP | 2-233709 | 9/1990 |
| JP | 2-251274 | 10/1990 |
| JP | 4-103668 | 4/1992 |
| JP | 4-108863 | 4/1992 |
| JP | 10-204303 | 8/1998 |
| JP | 11-001635 | 1/1999 |
| JP | 11-228833 | 8/1999 |
| JP | 3030020 | 6/2000 |
| WO | WO 02/00784 A1 * | 1/2003 |
| WO | WO 03/029355 | 4/2003 |

OTHER PUBLICATIONS

Nam, "Synthesis of New Separating Agents for Nuclear Materials", Aug., 1998.

* cited by examiner

*Primary Examiner*—Marc S Zimmer
(74) *Attorney, Agent, or Firm*—Kilpatrick Stockton LLP

(57) ABSTRACT

Disclosed is a moisture-curing type curable resin composition containing: a curable resin intramolecularly having a silicon-containing functional group; and a Lewis acid or a complex of the Lewis acid as a curing catalyst, the Lewis acid being selected from the group consisting of metal halides and boron halides, which is rapidly cured at room temperature. The silicon-containing functional group is represented by general formula: —$SiX^1X^2X^3$ or —$SiR^1X^1X^2$ (wherein, $X^1$, $X^2$ and $X^3$ respectively represent a hydrolytic group and may be the same as or different from each other, and $R^1$ represents a substituted or unsubstituted organic group having 1 to 20 carbons). If the silicon-containing functional group is —$SiR^1X^1X^2$, the curable resin further contains intramolecularly a polar component that is one of urethane, thiourethane, urea, thiourea, substituted urea, substituted thiourea, amide, and sulfide bonds, and hydroxyl, secondary amino and tertiary amino groups. Two-part type adhesive is constitutible with separating the curable resin from the curing catalyst.

4 Claims, No Drawings

CURABLE RESIN COMPOSITION

TECHNICAL FIELD

The invention relates to a resin composition curable by moisture in an atmosphere at room temperature and a moisture-setting adhesive composition containing the same. Particularly, the invention relates to an adhesive composition capable of being cured in a quite short period of time by notably improving the curing speed by blending a specified curing catalyst with a curable resin having a silicon-containing characteristic group, and a moisture-setting adhesive composition containing the resin composition.

BACKGROUND ART

There have been various curable resins used for bonding and linking. The mode of curing differs depending on the molecular constitution of resins, and the curable resins are used in different ways depending on the mode of curing such as thermosetting and reactive setting by making contact with a catalyst, moisture in the atmosphere and the like. Generally used adhesives and sealing materials take advantage of cold-setting resins, and the application mode and method of use are devised so as to start a curing reaction at the time of use. For example, the moisture-setting resin is supplied in a hermetical vessel shielded from the environment, and its curing reaction takes place due to contact with the atmosphere. On the other hand, adhesives in which curing is readily progressed due to contact between components are provided as a two-liquid type preparation so as to separate the components to one another.

A resin having a silicon-containing characteristic group such as hydrolyzable silyl groups has been developed for use as a moisture-setting resin from the view point of curing by a reaction with the moisture in the atmosphere.

For example, Japanese Patent Application Laid-Open No. H11-1635 discloses the use of a resin having hydrolyzable silyl groups as a curable resin for a moisture-setting powdery paint. The powdery paint contains a thermal latent catalyst for enhancing a hydrolysis reaction by heating, and a coating film is formed by curing as the powdery curable resin is melted by heating. Accordingly, the resin is stably preserved at room temperature without any reactions. A slush forming material employing the same mechanism as described above is disclosed in Japanese Patent Application Laid-Open No. 11-228833. In this publication document, a resin composition containing a powdery thermoplastic polyurethane resin treated with a hydrolyzable silane compound on the surface and a thermal latent catalyst for enhancing a hydrolysis reaction of the silyl group at a given temperature is molded in a heated mold to permit surface cross-linking to progress by melting of the powder and moisture.

On the other hand, it is attempted to use a resin having a hydrolyzable silyl group as a cold-setting adhesive or a curable resin for sealing materials. In this case, the curable resin is in a liquid state at room temperature, and is cured by accelerating the hydrolysis reaction with moisture in the atmosphere.

When the curable resin having a silicon-containing characteristic group such as hydrolyzable silyl groups is used for the cold-setting resins as described above, organic tin compounds such as dibutyl tin dilaurate and dibutyl tin diacetate are frequently used as curing catalysts. In particular, when a silylated urethane resin as described in Japanese Patent Publication No. 3030020 is used as a curable resin having a silicon-containing characteristic group, a curable resin composition having a relatively rapid curing speed may be obtained by blending the organic tin compound.

Other known curing catalysts for the curable resin having a silicon-containing characteristic group other than the organic tin compound include organic acids and amine compounds.

The curing rate of conventional adhesives and sealing materials using the curable resins having the silicon-containing characteristic group as described above is slow. Therefore, an improvement for enhancing the curing speed has been attempted in order to comply with the need of markets where more rapid curing is desired.

However, other problems occur by blending a large quantity of the organic tin compound as the curing catalyst for enhancing the curing speed, such that storage stability decreases, and that the resin becomes more dangerous and toxic due to an increased amount of the tin compound as a heavy metal compound. Also, when the curable resin is used as the adhesive or sealing material for plastics having hydrolyzable groups such as polyurethane resins and polyester resins, it is difficult to blend a large quantity of the organic tin compound since the organic tin compound blended in the curable resin may degrade the plastics.

The curing speed of the curing resin having a silicon-containing characteristic group is still slow when the organic acid or amine is used as the curing catalyst. Accordingly, the organic acid and amine are practically used as co-catalysts.

The object of the invention for solving the problems above is to provide a curable resin composition that is cured at room temperature with a quite high curing speed, using a curable resin having a silicon-containing characteristic group, and to provide a moisture-setting adhesive composition using the curable resin composition.

DISCLOSURE OF THE INVENTION

In order to solve the problems, according to one aspect of the present invention, there is provided a curable resin composition, comprising: a curable resin intramolecularly having a silicon-containing functional group represented by general formula: $-SiX^1X^2X^3$ (wherein, $X^1$, $X^2$ and $X^3$ respectively represent a hydrolytic group and may be the same as or different from each other); and a Lewis acid or a complex of the Lewis acid, the Lewis acid being selected from the group consisting of metal halides and boron halides.

According to another aspect of the present invention, there is provided a curable resin composition, comprising: a curable resin intramolecularly having a silicon-containing functional group represented by general formula: $-SiR^1X^1X^2$ (wherein, $X^1$ and $X^2$ respectively represent a hydrolytic group and may be the same as or different from each other, and $R^1$ represents a substituted or unsubstituted organic group having 1 to 20 carbons) and at least one polar component selected from the group consisting of urethane, thiourethane, urea, thiourea, substituted urea, substituted thiourea, amide and sulfide bonds, and hydroxyl, secondary amino and tertiary amino groups; and a Lewis acid or a complex of the Lewis acid, the Lewis acid being selected from the group consisting of metal halides and boron halides.

The curable resin composition described above is rapidly cured at room temperature by contacting moisture such as atmospheric moisture.

According to another aspect of the present invention, there is provided a cold-setting adhesive, comprising a curable resin intramolecularly having a silicon-containing functional group represented by general formula: $-SiX^1X^2X^3$ (wherein, $X^1$, $X^2$ and $X^3$ respectively represent a hydrolytic group and may be the same as or different from each other), and a Lewis acid or a complex of the Lewis acid, the Lewis acid being selected from the group consisting of metal halides and boron halides.

The cold-setting adhesive can comprise two parts that are mixed during use, wherein the curable resin and the Lewis acid or Lewis acid complex thereof are contained separately in the two parts.

BEST MODE FOR CARRYING OUT THE INVENTION

When a curable resin having a silicon-containing characteristic group in which a functional group X (X represents a hydrolyzable group) is directly linked to silicon is used as an adhesive or a sealing material curable at an room temperature, a curable resin that is in a liquid state or has fluidity or deformability at room temperature is used in order to evenly coat the adhesive surface or sealing surface with the resin without use of a solvent. For enhancing the curing speed of the curable resin, reactivity of the silicon-containing characteristic group and catalysts for accelerating hydrolysis reaction of the silicon-containing characteristic group should be considered:

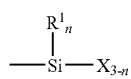

(1)

(wherein X represents a hydrolyzable group, $R^1$ represents a substituted or non-substituted organic group with a carbon number of 1 to 20, and n represents an integer of 0, 1 or 2.)

The inventors of the present invention have investigated effectiveness of blending various substances as a curing catalyst with the curable resin having a silicon-containing characteristic group and being a liquid at room temperature, in order to enhance the curing speed at the room temperature. As a result, the inventors have found that a specific kinds of Lewis acid and complexes thereof are effective as the curing catalyst when certain conditions are satisfied, and these substances are able to quite rapidly cure the liquid curable resin by acting at room temperature. While Lewis acid compounds are well known as a curing catalyst of thermosetting epoxy resins (see, for example, Japanese Patent Application Laid-Open Nos. 2-251274 and 2-228376), a reaction accelerating effect by the catalyst is hardly observed when n in the formula (1) is 1 or more, or when the number of the hydrolyzable groups in the silicon-containing characteristic group is 2 (bi-functional) or less. Therefore, it is quite difficult to cure liquid curable resins. However, a specified Lewis acid or its complex quite effectively functions as a curing catalyst only when n is 0, or when the number of the hydrolyzable group is three (tri-functional), and liquid curing resin is cured in a short period of time. While it is well known that a resin having a tri-functional silicon-containing characteristic group tends to rapidly cured as compared with the resin having a bi-functional silicon-containing characteristic group, the tendency described above is clearly different when a specified Lewis acid or its complex is used as a catalyst, and the tendency of the bi-functional group is extremely different from the tendency of the tri-functional group. That is, the curing speed is remarkably rapid when the Lewis acid or its complex is used as the curing catalyst as compared with using the tin compound as the catalyst. This is a phenomenon peculiar to a combination of the tri-functional silicon-containing characteristic group and Lewis acid or its complex. The Lewis acid used in the present invention is a halogenated metal or halogenated boron. Such Lewis acids and complexes thereof are considered to accelerate hydrolysis of the hydrolyzable groups by a cooperative action with the functional group of the silicon-containing characteristic group, and a mutual coupling reaction of the silyl groups progresses by enhancing elimination of the silyl group to remarkably increase curability.

The inventors of the present invention have found that it is effective to incorporate a polar element to the curable resin having the silicon-containing characteristic group as another method for enhancing hydrolyzability and cross-linking reactivity of the silicon-containing characteristic group when the Lewis acid or a complex thereof is used as a catalyst. In other words, curability is improved by using the Lewis acid or a complex thereof as a catalyst, when a bond or a group such as urethane bonds, thiourethane bonds, urea bonds, thiourea bonds, substituted urea bonds, substituted thiourea bonds, amide bonds, sulfide bonds, hydroxyl groups, secondary amino groups and tertiary amino groups exist in the molecule. In particular, when a curable resin having a urethane bond, substituted urea bond or tertiary amino group as the polar element is used, a curable resin composition curing at a quite rapid speed can be obtained. This may be conjectured that the curing catalyst is able to readily localize in the vicinity of the molecules of the curable resin by electronic coordination in these bonds or groups, particularly between nitrogen atom or oxygen atom having a lone electron pair, and the curing catalyst, i.e. the Lewis acid or its complex, to consequently activate the reaction of the silicon-containing characteristic group. While improvement of rapid curability by incorporation of the polar element is observed irrespective of the number of the functional groups of the silicon-containing characteristic group, the improvement of the curing speed is remarkably enhanced in the tri-functional group than in the bi-functional group.

The curable resin composition of the invention accomplished with based on the discoveries as described above basically comprises (A) a curable resin having the silicon-containing characteristic group and (B) a curing catalyst as the Lewis acid or a complex thereof selected from the group consisting of halogenated metals and halogenated boron. An aminosilane compound (C) and a second curing catalyst (D) can be added as an element capable of improving curability of the curable resin (A), and a mercaptosilane compound (E) can be added as an element for improving adhesivity. Blending of various additives and fillers are also acceptable, and necessary additive components can be used depending on applications. The curable resin (A) and the curing catalyst (B) can be provided in separate packages to provide them as a two-liquid moisture-setting adhesive. It is also possible to unite this combination of the curable resin (A) and the curing catalyst (B) with another combination of a curable compound and a curing agent thereof to construct a two-part moisture-setting adhesive.

The mixture of curable resin (A) and curing catalyst (B) is stable as long as it does not contact water such as moisture, while it is promptly hardened in contact with moisture. Therefore, it can be stably stored as a curable resin composition in a hermetic state shielded from the outer atmosphere to enable it to be stably provided as an adhesive. Rapid curability of the mixture can be improved in some cases by aging the mixture of curable resin (A) and curing catalyst (B) in a hermitic state. Improvement of rapid curability of this case is increased in proportion to the aging time, and is accelerated by increasing the temperature.

Each component constituting the curable resin composition and the curable resin adhesive according to the present invention will be described in detail hereinafter.

[I. Curable Resin (A)]

The curable resin (A) according to the invention has at least one silicon-containing characteristic group with n of 0 or 1 in the formula (I). Namely, the resin has the silicon-containing characteristic group that is a hydrolyzable silyl group represented by the formula of —$SiX_3$ or —$SiR^1(X)_2$ (in the formula, X represents a hydrolyzable group, and $R^1$ represents a substituted or non-substituted organic group with a carbon number of 1 to 20). The group represented by X in the formula above is a hydrolyzable group, and examples thereof include a halogen group, a hydride group, an alkoxy group, an acyloxy group, a ketoxymate group, an amino group, an amide group, an aminooxy group, a mercapto group and an alkenyloxy group. The alkoxy group is most preferable among them from the view points of high reactivity and low odor, etc. The two or three groups X of the silicon-containing characteristic group of the invention may be different to one another in the invention, and the above formula representing the silicon-containing characteristic group is actually represented by —$SiX^1X^2X^3$ or —$SiR^1X^1X^2$ (in the formula, $X^1$, $X^2$ and $X^3$ represent hydrolyzable groups that may be the same or different, and $R^1$ represents a substituted or non-substituted organic group with a carbon number of 1 to 20). In the description below, if the hydrolysable groups of the silicon-containing characteristic group are represented by X, it should be understood that $X^1$, $X^2$ and $X^3$ are simply summarized as X and that the respresentation is only for distinguishing the tri-functional group from the bi-functional group, and they may be thus different to one another in some cases.

The curable resin (A) can involve both groups of —$SiX_3$ and —$SiR^1(X)_2$ as the silicon-containing characteristic group in the molecule, or may be a mixture of a molecule having —$SiX_3$ and a molecule having —$SiR^1(X)_2$. It is not necessary that all the silicon-containing characteristic groups are —$SiX_3$ or $SiR^1(X)_2$, and may partly contain —$Si(R^1)_2X$ that is represented by n=2 in the formula (I). If the silicon-containing characteristic group contains no —$SiX_3$ and contains —$SiR^1(X)_2$, it is essential that the curable resin (A) further has the polar element in the molecule as described above. The resin (A) may comprise: a molecule having —$SiX_3$ as the silicon-containing characteristic group; and a molecule in which the silicon-containing characteristic group is —$Si(R^1)_2X$ and a polar element is contained. In other words, a mixture of a resin having a tri-functional silicon-containing characteristic group and a resin having a bi-functional silicon-containing characteristic group and polar element can be used as well.

The curable resin (A) is preferably a liquid at room temperature and has a viscosity (23° C.) of 50 to 600,000 mPa·s for forming a suitable cold-setting adhesive or sealing material. The number average molecular weight is preferably about 500 to 10,000, particularly about 500 to 50,000.

The curable resin (A) having no polar elements has —$SiX_3$ as the silicon-containing characteristic group, and it can be classified into an oxyalkylene polymer (A1), a saturated hydrocarbon polymer (A2) and a vinyl polymer (A3), depending on its main chain frame.

The curable resin (A) belonging to oxyalkylene polymer (A1) is a resin generally named as modified silicone which is disclosed in Japanese Patent Application Publication Nos. S45-36319, S46-12154, S49-32673, Japanese Patent Application Laid-Open Nos. S50-156599, S51-73561, S54-6096, S55-82123, S55-123620, S55-125121, S55-131022, S55-135135 and S55-137129.

Known methods for producing oxyalkylene polymer (A1) include a method of applying: an addition reaction to polyoxyalkylene having an alkenyl group that the alkenyl group is reacted with a hydrogenated silicone compound having the silicon-containing characteristic group in the molecule; or a radical addition reaction to polyoxyalkylene having an alkenyl group and a mercaptosilane compound having a mercapto group and the silicon-containing characteristic group in the molecule that the alkenyl group is reacted with the mercapto group.

The oxyalkylene polymer (A1) is commercially available, and such commercial products may be used in the present invention. Examples of the commercially available polymer include those manufactured by Kaneka Co. (trade names: S203, S303, S810, SAT010, STA030, SAT070, SAT200, SAT350, SAT404, S203, S810, MA903, MA904, MAX923, S911, S943, EST200, EST250, ESX280, SAT070, SAX720, SAX725, SAX770, MA430, MA440, MA440A, MA447 and MAX610), and those manufactured by Asahi Glass Co. (trade names: ES-S2410, ES-S2420, ES-S3430, ES-S3630 and ES-GX3440ST).

Examples of curable resin (A) belonging to the saturated hydrocarbon polymer (A2) include reactive silyl group-containing saturated hydrocarbon polymers disclosed in Japanese Patent Application Publication Nos. H4-69659, H7-108928, Japanese Patent Publication No. 2512468, Japanese Patent Application Laid-open No. S64-22904 and Japanese Patent Publication No. 2539445, those manufactured by Kaneka Co. (trade names: Epion Series), and those manufactured by Degussa Japan Co. (trade name: VESTOPLAST 206).

Examples of curable resin (A) belonging to the vinyl polymer (A3) include reactive silyl group-containing vinyl polymers described in Japanese Patent Application Laid-Open Nos. H9-272715, H9-272714, H11-080249, H11-080250, H11-005815, H11-116617, H11-116606, H11-080571, H11-080570, H11-130931, H11-100433, H11-116763, 2003-82192, 2003-119339, 2003-171416, 2003-246861, 2003-327852, 2003-327620 and 2004-002835; reactive plasticizer products XPR series manufactured by To a Gosei Co. (trade names: XPR-15 and XPR-22); products manufactured by Soken Chemical & Engineering Co. (trade names: Actflow AS-300, Actflow AS-301 and Actflow ASM-4001); and products manufactured by Kaneka Co. (trade name: SA100S).

Since interaction between the Lewis acid or its complex as curing catalyst (B) and the silicon-containing characteristic group of curable resin (A) is enhanced when curable resin (A) of the present invention contains the polar element in the molecule, the silicon-containing characteristic group in this case may be either one of —$SiX_3$ and —$SiR^1(X)_2$. Here, it is noted that the curing speed is the fastest when the curable resin (A) contains both the polar element and silicon-containing characteristic group represented by —$SiX_3$.

Effective as the polar element contained in the molecule of curable resin (A) of the present invention are urethane bond, thiourethane bond, urea bond, thiourea bond, substituted urea bond, substituted thiourea bond, amide bond, sulfide bond, hydroxyl group, secondary amino group and tertiary amino group. The polar element may comprise at least one bond or group selected from these bonds and groups, or may comprise a plurality of the bonds or groups. Specifically, the polar element contains the urethane bond represented by formula (2) below, the thiourethane bonds represented by formulae (3) to (5) below, the urea bond represented by formula (6) below, the thiourea bond represented by formula (7) below, the substituted urea bond represented by formula (8) below, the substituted thiourea bond represented by formula (9) below, the hydroxyl group represented by formula (10), the secondary amino group represented by formula (11) below, and the tertiary amino group represented by formula (12) below:

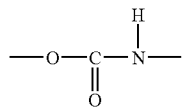
(2)

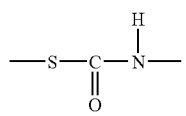
(3)

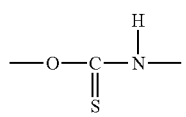
(4)

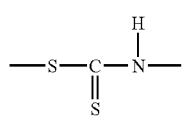
(5)

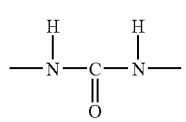
(6)

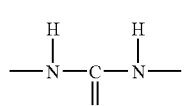
(7)

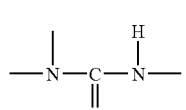
(8)

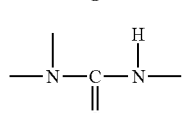
(9)

—OH (10)

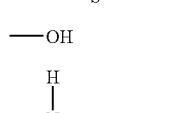
(11)

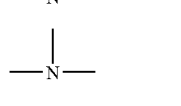
(12)

The polar element includes those formed by the reaction below. Particularly, the urethane bond includes the group formed by a reaction between hydroxyl group and isocyanate group. An example of the reaction scheme for forming the urethane bond is shown in formula (13) below:

(13)

The thiourethane bond includes a group formed by reaction between a hydroxyl group and an isothiocyanate group (reaction a), a group formed by reaction between a mercapto group and an isocyanate group (reaction b), and a bond formed by reaction between a mercapto group and an isothiocyanate group (c). While the thiourethane group formed by reaction (a) may be generally called as thiourethane of a thiocarbonyl type and the thiourethane group formed by reaction (b) may be generally called as thiourethane of a thioester type, the groups formed by the reactions (a) to (c) are collectively named as the thiourethane bond in the present invention. Examples of the reaction scheme for forming the thiourethane bond are shown in formulae (14) to (16) below:

(14)

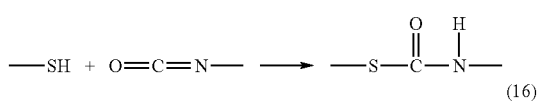
(15)

(16)

The urea bond includes a bond formed by the reaction between a primary amino group and an isocyanate group. An example of the reaction scheme for forming the urea bond is shown in formula (17) below:

(17)

The thiourea bond includes a bond formed by the reaction between a primary amino group and an isothiocyanate group. An example of the reaction scheme for forming the thiourea bond is shown in formula (18) below:

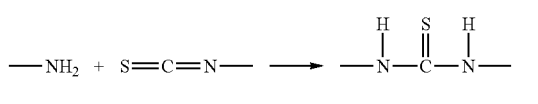
(18)

The substituted urea bond includes a bond formed by the reaction between a secondary amino group and an isocyanate group. An example of the reaction scheme for forming the substituted urea bond is shown in formula (19) below:

(19)

The substituted thiourea bond includes a bond formed by the reaction between a secondary amino group and an isothiocyanate group. An example of the reaction scheme for forming the substituted thiourea bond is shown in formula (20) below:

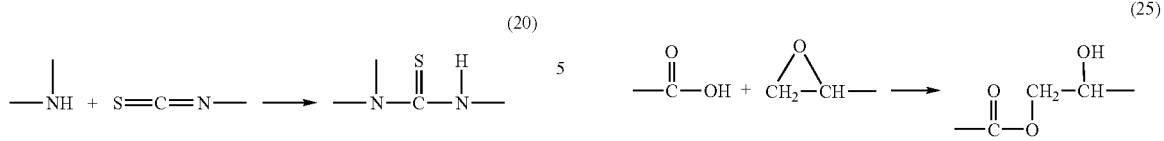
(20)

The hydroxyl groups include the groups formed by the reactions of an epoxy group with a first amino group, a second amino group, a mercapto group, a hydroxyl group and/or a carboxyl group. Examples of the schemes of the reactions for forming the hydroxyl groups are shown in formulae (21) to (25) below:

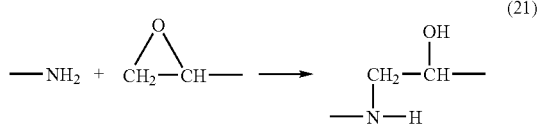
(21)

(22)

(23)

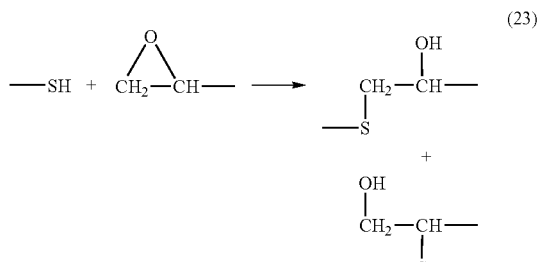
(24)

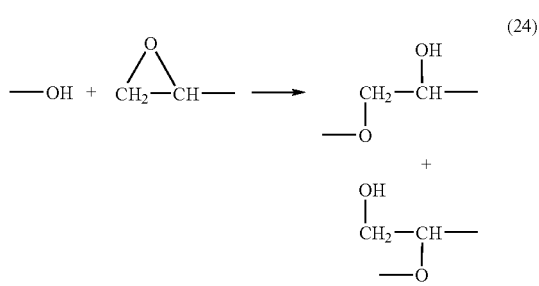

-continued
(25)

The secondary amino group includes a group formed by the reaction of a primary amino group with an α,β-unsaturated carbonyl compound and/or acrylonitrile compound in an amount equivalent to the amino group. An example of the reaction scheme for forming the secondary amino group is shown in formula (26) below:

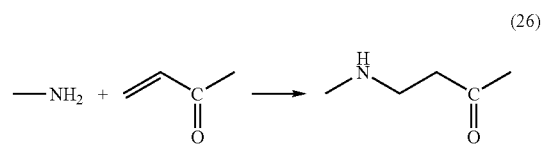
(26)

The tertiary amino group includes a group formed by the reaction of a primary amino group with an α,β-unsaturated carbonyl compound and/or acrylonitrile compound in twice an amount equivalent to the amino group. An example of the reaction scheme for forming the tertiary amino group is shown in formula (27) below:

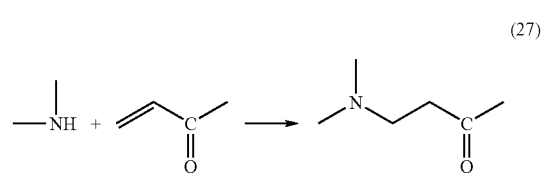
(27)

The curable resin (A) having the silicon-containing characteristic group is possibly produced by a conventional method, and the production method is not particularly limited. Typical examples of the method include known methods such as: a method for adding a hydrosilane compound to a polymer having alkenylated terminals (Japanese Patent Application Publication Nos. S45-36319, S46-12154, S49-32673, Japanese Patent Application Laid-Open Nos. S50-156599, S51-73561, S54-6096, S55-82123, S55-123620, S55-125121, S55-131022, S55-135135, S55-137129, Japanese Patent Application Publication Nos. S46-12154, H4-69659, H7-108928, Japanese Patent Publication No. 2512468, Japanese Patent Application Laid-Open No. S64-22904, and Japanese Patent Publication No. 2539445); a method for radically adding a mercaptosilated compound to a polymer having alkenylated terminals (Japanese Patent Application Laid-Open No. S55-137129); a method for initiating polymerization using an initiator having the silicon-containing characteristic group; a method for polymerizing using a chain transfer agent having the silicon-containing characteristic group; a method for introducing the silicon-containing characteristic group simultaneously with polymerization using a copolymerizable monomer having the silicon-containing characteristic group (for example, Japanese Patent Application Laid-Open Nos. S54-123192, S57-179210, S59-78220 and S60-23405); a method for introducing the silicon-containing characteristic group by hydrosilylation after synthesizing a vinyl polymer having an alkenyl group (for example Japanese Patent Application Laid-Open No. S54-40893 and H11-80571); and a method for introducing the silicon-containing characteristic group into a urethane prepolymer using an aminosilane compound (for example, Japanese Patent Application Laid-Open Nos. H11-100427, 2000-143757, 2000-169544, 2002-212415, 2004-123900, 2004-123901, Japanese Patent Publication Nos. 3030020, 3295663, 3313360, 3317353, and 3350011). The methods for producing curable resins (A) other than those described above will be also described in this application.

The curable resins (A) having the polar element (urethane bond, thiourethane bond, urea bond, thiourea bond, substituted urea bond, substituted thiourea bond, amide bond, sulfide bond, hydroxyl group, secondary amino group and tertiary amino group) also can be produced by taking advantage of known method, and the production method is not particularly limited. The polar element may be introduced by the chemical reactions forming linking groups with using the plural materials as in formulae (13) to (17), or a compound containing the polar element may be used in advance to react for producing the curable resin. It is also possible to take advantage of both methods above for producing the curable resin (A) containing a plurality of the polar elements.

Curable resin (A) containing both of the silicon-containing characteristic group and the polar element can be produced by appropriately using conventional methods considering the facts as described above, and the production method is not limited. Representative examples are as follows.

[Method for Producing Curable Resin (Aa) Having at Least One Silicon-containing Characteristic Group and at Least One Urethane Bond or Thiourethane Bond]

The curable resin (Aa) having the silicon-containing characteristic group and urethane bond or thiourethane bond is produced, using a resin (Ra) having a hydroxyl group or a resin (Rf) having a carboxyl group, by one of the following production methods (1) to (5). If the materials used below contain a polar element other than urethane bond and thiourethane bond in the molecule, the polar element may be introduced to reduplicate in the curable resin (A).

(1) a production method for allowing the resin (Ra) and a compound (CC) having the silicon-containing characteristic group and an isocyanate group to react at the isocyanate group or isothiocyanate group of the compound (CC) with the hydroxyl group of resin (Ra);

(2) a production method for allowing a compound (CA) having the silicon-containing characteristic group and a functional group (for example, primary amino group, secondary amino group, hydroxyl group and mercapto group) capable of reacting with isocyanate group and isothiocyanate group, to react with a isocyanate-containing compound (synthetic compound (Ra-z)) prepared by allowing the isocyanate group of polyisocyanate compound (z) with the hydroxyl group of resin (Ra);

(3) a production method for allowing a compound (CB) having an alkenyl group and an isocyanate group or isothiocyanate group to react at the isocyanate group or isothiocyanate group of the compound (CB) with the hydroxyl group of resin (Ra), followed by allowing an alkenyl group-containing compound (synthetic compound (Ra—B)) obtained above and a mercaptosilane compound (e) or (f) having the silicon-containing characteristic group and a mercapto group to react at the mercapto group of the mercaptosilane compound (e) or (f) with the alkenyl group of alkenyl group-containing compound (synthetic compound (Ra—B));

(4) a production method for allowing a compound (CB) having an alkenyl group and an isocyanate group or isothiocyanate group to react at the isocyanate group or isothiocyanate group of the compound (CB) with the hydroxyl group of resin (Ra), followed by allowing an alkenyl group-containing compound (synthetic compound (Ra—B)) obtained above to add a hydrosilane compound (g) to the alkenyl group of the alkenyl group-containing compound (synthetic compound (Ra—B)) by a hydrosilylation reaction; and (5) a production method for allowing a resin (Rf) having a carboxyl group to react at the isocyanate group or isothiocyanate group of the compound (CC) with the carboxyl group of resin (Rf).

The reaction between the resin (Ra) and the compound (CC) in production method (1) above may be performed in accordance with a conventional method (reaction method (1)) for nucleophilic addition reaction. Specifically, the reaction method (1) is carried out at −20 to +150° C. for about 1 to 1000 hours. A metallic compound (S-1) such as a tin compound or amine compound (S-2) can be used for this reaction, and reaction solvent (S-3) may be optionally used.

The reaction between the resin (Ra) and the polyisocyanate compound (z) in production method (2), and the reaction between the synthetic compound (Ra-z) and the compound (CA) can be performed in accordance with the reaction method (1) above.

The reaction between the resin (Ra) and the compound (CB) in production method (3), and the reaction between the synthetic compound (Ra—B) and the mercaptosilane compound (f) can be performed by a conventional method (reaction method (2)) for radical addition reaction. Specifically, while reaction method (2) is carried out at 40 to 150° C. for about 1 to 500 hours in the presence of radical initiator (S-4), UV irradiation and reaction solvent (S-3) may be optionally used.

The reaction between the resin (Ra) and the compound (CB) in production method (4) can be carried out according to reaction method (1) above. The hydrosilylation reaction between the synthetic compound (Ra—B) and the hydrosilane compound (g) can be carried out by conventional method (reaction method (3)) for adding the hydrosilane moiety of the hydrosilane compound to the alkenyl group using a metal compound (S-5) such as a transition metal compound of group VII as a catalyst. Specifically, the reaction method (3), for example a method for adding the hydrosilane compound to the alkenyl terminal of a polyether compound, is disclosed in Japanese Patent Application Publication Nos. S45-36319, S46-12154, S49-32673, Japanese Patent Application Laid-Open Nos. S50-156599, S51-73561, S54-6096, S55-82123, S55-123620, S55-125121, S55-131022, S55-135135, S55-137129, Japanese Patent Application Publication Nos. S46-12154, H4-69659, H7-108928, Japanese Patent Publication No. 2512468, Japanese Patent Application Laid-Open No. S64-22904, and Japanese Patent Publication No. 2539445.

The reaction between the resin (Rf) and the compound (CC) in production method (5) may be perfomed in accordance with the reaction method (1) above.

In the production methods (1) to (4), a curable resin having the silicon-containing characteristic group and a thiourethane bond can be obtained by using a resin (Rb) having a mercapto group in the molecule in place of the resin (Ra) having a hydroxyl group. Here, the reaction between the resin (Rb) and the compound (CB) can be performed in accordance with the reaction method (1) above. Alternatively, the curable resin having the silicon-containing characteristic group and thiourethane bond is obtained by allowing the primary or secondary amino group of aminothiol compound (w) to react with the isocyanate or thioisocyanate group of compound (cc), followed by allowing a mercapto group-containing compound (synthetic compound (v-C)) obtained above and a resin (Re) having an alkenyl group in the molecule to react at the mercapto group of the mercapto group-containing compound (synthetic compound (v-C)) with the alkenyl group of the resin (Re). The reaction between the polymercapro compound (v) and the compound (CC), and the reaction between the synthetic compound (v-C) and the resin (Re) may be performed in accordance with the reaction methods (1) and (2), respectively.

[Method for Producing Curable Resin (Ab) Having at Least One Silicon-containing Characteristic Group and at Least One Urea Bond, Thiourea Bond, Substituted Urea Bond or Thiourea Bond]

The curable resin (Ab) having at least one silicon-containing characteristic group and at least one urea bond, thiourea bond, substituted urea bond or thiourea bond is obtained by using a resin (Rc) having a primary or secondary amino group in the molecule, in place of the resin (Ra) having the hydroxyl group, in each of the production methods (1) to (4). The reaction between the resin (Rc) and the compound (CB) can be performed in accordance with the reaction method (1) above. The curable resin (Ab) having at least one silicon-containing characteristic group and at least one urea bond, thiourea bond, substituted urea bond or thiourea bond can be obtained also by allowing an aminothiol compound (w) having an amino group and a mercapto group to react at the primary or secondary amino group of the aminothiol compound (w) with the isocyanate group or isothiocyanate group of the compound (CC), followed by allowing the mercapto group of a mercapto group-containing compound (synthetic compound w-C)) obtained above to react with the alkenyl group of the resin (Re) having the alkenyl group in the molecule. The reaction between the aminothiol compound (w) and the compound (CC), and the reaction between the compound (w-C) and the resin (Re) can be performed in accordance with the reaction methods (1) and (2), respectively.

When the materials to be used contain a polar element other than the urea bond, thiourea bond, substituted urea bond and substituted thiourea bond in the molecule, the polar group can be introduced so as to reduplicate in the curable resin (A).

[Method for Producing Curable Resin (Ac) Having at Least One Silicon-containing Characteristic Group and at Least One Hydroxyl Group]

The curable resin (Ac) having the silicon-containing characteristic group and a hydroxyl group can be produced by methods (6) to (12) below. The polar group can be introduced so as to reduplicate in the curable resin (A) when the materials to be used below contain a polar group other than the hydroxyl group in the molecule:

(6) a production method for allowing the epoxy group of an epoxysilane compound (h) having the silicon-containing characteristic group and a resin (Rb) having the mercapto group to react at the epoxy group of the epoxysilane compound (h) with the mercapto group of the resin (Rb);

(7) a production method for allowing a polymercapto compound (v) and an epoxysilane compound (h) to react at the mercapto group of the polymercapto compound (v) with the epoxy group of the epoxysilane compound (h), followed by allowing the mercapto group-containing compound (synthetic compound (v-h)) obtained above and a resin (Re) having an alkenyl group to react at the mercapto group of the mercapto group-containing compound (synthetic compound (v-h)) with the alkenyl group of the resin (Re);

(8) a production method for allowing an epoxysilane compound (h) and a resin (Rc) having a primary or secondary amino group to react at the epoxy group of the epoxysilane compound (h) with the primary or secondary amino group of the resin (Rc);

(9) a production method for allowing a compound (CE) having the silicon-containing characteristic group and a primary amino group, secondary amino group or mercapto group and a resin (Rd) having an epoxy group to react at the primary amino group, secondary amino group or mercapto group of the compound (CE) with the epoxy group of the resin (Rd);

(10) a production method for: allowing the isocyanate group of a polyisocyanate compound (z) to react with the hydroxyl group of the resin (Ra), or the mercapto group of the resin (Rb), or the primary or secondary amino group of the resin (Rc), with obtaining an isocyanate group-containing compound (synthetic compound (Ra-z), a synthetic compound (Rb-z) or synthetic compound (Rc-z)); alloywing a gllycidol compound (u) having the hydroxyl group and epoxy group to react at the epoxy group of the glycidol compound (u) with the primary amino group or secondary amino group or mercapto group of the compound (CE), with obtaining a hydroxyl group-containing compound (synthetic compound (u-E)); and reacting the isocyanate group of the isocyanate group-containing compound with the hydroxyl group of the hydroxyl group-containing compound;

(11) a production method for allowing a polymerizable alkenyl compound (s) having an alkenyl group and an epoxy group to react at the epoxy group of the polymerizable alkenyl compound (s) with the primary amino group or secondary amino group or mercapto group of the compound (CE), followed by allowing the alkenyl group-containing compound (synthetic compound (s-E)) obtained above to react at the mercapt group of the resin (Rb) with the alkenyl group of the synthetic compound (s-E); and

(12) a production method for allowing a resin (Rf) having a carboxyl group to react at the epoxy group of an epoxysilane compound (h) with the carboxyl group of resin (Rf).

The reaction between the resin (Rb) and the epoxysilane compound (h) in production method (6) can be performed in accordance with the reaction method (1) above. The reaction between the polymercapto compound (v) and the epoxysilane compound (h) in production method (7) can be performed in accordance with the reaction method (1) above, and the reaction between the resin (Re) and the synthetic compound (v-h) in production method (7) can be performed in accordance with the reaction method (2) above. The reaction between the resin (Rc) and the epoxysilane compound (h) in production method (8) can be performed in accordance with the reaction method (1) above. The reaction between the resin (Rd) and the compound (CE) in production method (9) can be performed in accordance with the reaction method (1) above. The reaction between the resin (Ra, Rb or Rc) and the polyisocyanate compound (z), and the reaction between the glycidol compound (u) and the compound (CE), and the reaction between the synthetic compound (Ra-z, Rb-z or Rc-z) and the synthetic compound (u-E), each in production method (10), can be performed in accordance with the reaction method (1) above. The reaction between the compound (s) and the compound (CE) in production method (11) can be performed in accordance with the reaction method (1) above, and the reaction between the resin (Rb) and the synthetic compound (s-E) in production method (11) can be performed in accordance with the reaction method (2) above. The reaction between the resin (Rf) and the epoxysilane compound (h) in production method (12) can be performed in accordance with the reaction method (1) above.

[Method for Producing Curable Resin (Ad) Having at Least One Silicon-containing Characteristic Group, and at Least One Urethane Bond, Thiourethane Bond, Urea Bond, Thiourea Bond, Substituted Urea Bond, Substituted Thiourea Bond, Amide Bond, Sulfide Bond, Hydroxyl Group, Secondary Amino Group or Tertiary Amino Group]

The curable resin (Ad) having the silicon-containing characteristic group and a polar element is obtained by production methods (13) to (19) below:

(13) a production method for allowing an α,β-unsaturated carbonylsilane compound (i) having the silicon-containing characteristic group and an α,β-carbonyl group to react at the α,β-unsaturated carbonyl group of α,β-unsaturated carbonylsilane compound (i) with the mercapto group of the resin (Rb);

(14) a production method for allowing an alkenylsilane compound (j) having the silicon-containing characteristic group and an alkenyl group to react at the alkenyl group of alkenylsilane compound (j) with the mercapto group of the resin (Rb);

(15) a production method for allowing the α,β-unsaturated carbonyl group of the α,β-unsaturated carbonylsilane compound (i) to react with the mercapto group of the polymercapto compound (v), followed by allowing a mercapto group-containing compound (synthetic compound (v-i)) obtained above to react at the alkenyl group of the resin (Re) with the mercapto group of the synthetic compound (v-i);

(16) a production method for allowing the alkenyl group of an alkenylsilane compound (j) to react with the mercapto group of the polymercapto compound (v), followed by allowing a mercapto group-containing compound (synthetic compound (v-j)) obtained above to react at the alkenyl group of the resin (Re) with the mercapto group of the synthetic compound (v-j);

(17) a production method for allowing the α,β-unsaturated carbonyl group of the α,β-unsaturated carbonylsilane compound (I) to react with the primary or secondary amino group of the resin (Rc);

(18) a production method for allowing a resin (Rg) having an α,β-unsaturated group to react at the primary amino group, secondary amino group or mercapto group of the compound (CE) with the α,β-unsaturated group of the resin (Rg); and

(19) a production method for allowing an aminosilane compound (c) having the silicon-containing characteristic group and a primary or secondary amino group to react at the primary or secondary amino group of the aminosilane compound (c) with the carboxyl group of the resin (Rf) having a carboxyl group.

The reaction between the resin (Rb) and the α,β-unsaturated carbonylsilane compound (i) in production method (13) can be performed in accordance with the reaction method (1) above. The reaction between the resin (Rb) and the alkenylsilane compound (j) in production method (14) can be performed in accordance with the reaction method (2) above. The reaction between the polymercapto compound (v) and the α,β-carbonylsilane compound (i) in production method (15) can be performed in accordance with the reaction method (1) above, and the reaction between the resin (Re) and the synthetic compound (v-i) in production method (15) can be performed in accordance with the reaction method (2) above. The reaction between the polymercapto compound (v) and the alkenylsilane compound (j) and the reaction between the resin (Re) and the synthetic compound (v-j), each in production method (16), can be performed in accordance with the reaction method (2) above. The reaction between the resin (Rc) and the α,β-unsaturated carbonylsilane compound (i) in production method (17) can be performed in accordance with the reaction method (1) above. The reaction between the resin (Rg) and the compound (CE) in production method (18) can be performed in accordance with the reaction method (1) above. The reaction between the resin (Rf) and the aminosilane compound (c) in production method (19) can be performed in accordance with the reaction method (1) above.

[Method for Producing Curable Resin (Ae) Comprising a Molecular Chain of a Vinyl Polymer and Having at Least One Silicon-containing Characteristic Group and at Least One Polar Element]

The curable resin (Ae) comprising a molecular chain of a vinyl polymer and having the silicon-containing characteristic group and a polar element is obtained by copolymerization using, as a polymerizable monomer, a polymerizable alkenyl compound (P-1) having the polar element in the molecule and/or a polymerizable alkenyl compound (P-2) having the silicon-containing characteristic group and the polar element in the molecule, and by using a compound (T-1) having the silicon-containing characteristic group, the polar element and a mercapto group in the molecule (including the mercaptosilane compound (f) above) and/or a compound (T2) having the polar element and a mercapto group in the molecule as a chain transfer agent. The α,β-unsaturated carbonylsilane compound (i), the alkenylsilane compound (j) described above and the like are also available as the polymerizable alkenyl compound (P-1). The copolymerization can also be performed with other polymerizable alkenyl compound (t). However, if the polymerizable component is polymerizable alkenyl compound (P-1) and the chain transfer agent is compound (T-2), said other polymerizable alkenyl compound or another chain transfer agent added should be a compound having the silicon-containing characteristic group. The polymerization reaction can be performed in accordance with the known method (reaction method (4)) for polymerizing a compound having a polymerizable alkenyl group. Specifically, radical initiator (S-4) and/or chain transfer agent (S-6) is added to the polymerizable alkenyl compound, if necessary, and the mixture is allowed to react at 50 to 150° C. for about 1 to 12 hours in reaction method (4). A reaction solvent (S-3) may be used. The polymerization reaction may be carried out in the presence of a curable resin (A) of the invention and/or other curable compounds (M). While any one of the radical polymerization, cationic polymerization and anionic polymerization may be used for polymerization, the radical polymerization is preferable from the view point of easiness of the reaction. The polymerization reaction may be or may not be living polymerization.

[Materials for Producing Curable Resin (A)]

The materials used in the method for producing the curable resin (A) will be described below. As are evident from the foregoing descriptions, while the "silicon-containing characteristic group" below means —$SiX_3$ and/or —$SiR^1(X)_2$ depending on the presence or absence of the polar element in the curable resin (A) to be produced, all the silicon-containing characteristic groups are not limited to —$SiX_3$ or $SiR^1(X)_2$ above, and at least a part of the silicon-containing characteristic group may comprise —$SiX_3$ and/or $SiR^1(X)_2$ depending on the presence or absence of the polar element.

[Resins (Ra, Rb, Rc, Rd, Re, Rf, Rg)]

The resins (Ra to Rg) has a structure in which at least one functional group (Ra: hydroxyl group, Rb: mercapto group, Rc: primary and/or secondary amino group, Rd: epoxy group, Re: alkenyl group, Rf: carboxyl group, Rg: α,β-unsaturated carbonyl group) is bonded to a main chain frame (principal moiety) formed by polymerization, and can be prepared by using the polymerizable compound having the functional group described above as monomers or comonomers of starting materials forming the main chain frame. While the main chain frame is not particularly limited, it is preferably polyoxyalkylene, saturated hydrocarbon polymer, vinyl polymer (for example, copolymer of acryl monomer), polyester or polycarbonate. Polyoxyalkylene, saturated hydrocarbon polymer or vinyl polymer is suitable among them as the main chain frame, and polyoxyalkylene and vinyl polymer are particularly suitable. While the molecular weight of the main chain frame of the resin is also not particularly limited, the number average molecular weight is preferably 500 to 30,000, particularly 2,000 to 20,000.

The resin comprising the polyoxyalkylene polymer as the main chain frame can be produced by reacting mono-epoxide, etc. with an initiator in the presence of a catalyst. The initiator available includes a hydroxyl compound having at least one hydroxyl group. Examples of the mono-epoxide available include ethyleneoxide, propyleneoxide, butyleneoxide and hexyleneoxide, and tetrahydrofuran may be used together. Examples of the catalyst include, but are not limited to, alkali metal catalysts such as potassium-base compounds and cesium-base compounds, complex catalysts of composite metal cyan compounds and metal porphyrin catalysts. A complex mainly composed of zinc hexacyano cobaltate, and ether complexes and alcohol complexes are preferable as the complex catalysts of composite metal cyan compounds. The composition described in Japanese Patent Application Publication No. 46-27250 may be essentially used as the component of the ether complex and alcohol complex. Ethyleneglycol dimethylether (glyme) and diethyleneglycol dimethylether (diglyme) are preferable as the ether, and glyme is particularly preferable from the view point of handling for producing the complex. The alcohols described in Japanese Patent Application Laid-Open No. 4-14123 can be used, for example, as the alcohol, and t-butanol is particularly preferable.

The polyoxyalkylene polymer as the main chain frame favorably has the number of functional groups of 2 or more, and its typical examples include copolymers such as polyoxyethylene, polyoxypropylene, polyoxybutylene, polyoxuhexylene, polyoxytetramethylene and the like. The resin having the main chain frame comprising 2 to 6 valent polyoxypropylene polyol is preferable, and polyoxypropylene diol and polyoxypropylene triol are suitable. Polyoxyalkylene polymers further containing amino groups in the molecule may be also used.

Examples of the resin having a hydrocarbon polymer as the main chain frame include those in which the main chain frame is composed of: a polymer prepared with a main monomer comprising a monoolefin with a carbon number of 1 to 6 such as ethylene, propylene, 1-butene, isobutene and 1-hexene; or a hydrogenated homopolymer or copolymer of diolefin such as butadiene and isoprene, or of diolefin and monoolefin. The polymer prepared with isobutene as a principal monomer and the hydrogenated butadiene polymer may be favorably used as the main chain frame since introduction of functional groups at the terminal and control of the molecular weight are easy while the number of terminal functional groups can be increased. An isobutene homopolymer as well as copolymers containing 50% by weight or less, preferably 30% or less, and more preferably 10% by weight or less of copolymerizable monomers with isobutene may be used as the polymer mainly comprising isobutene. Examples of the copolymerizable monomer with isobutene include olefins with a carbon number of 4 to 12, vinylether, aromatic vinyl vompounfd, vinylsilane compounds and allylsilane compounds. Examples of such monomer include 1-butene, 2-butene, 2-methyl-1-butene, 3-methyl-1-butene, 1-pentene, 4-methyl-1-pentene, 1-hexene, vinyl cyclohexene, methyl vinyl ether, ethyl vinyl ether, isobutyl vinyl ether, styrene, α-methylstyrene, divinyl styrene, vinyltrimethoxy silane, vinyltriethoxy silane, allylaminotrimethyl silane, and allyldimethoxy silane.

Examples of the resin having a vinyl polymer as a main chain frame include polymers of a compound having at least one polymerizable alkenyl group in the molecule. The reaction for forming the main chain frame of the vinyl polymer by polymerizing the compound having the polymerizable alkenyl group can be performed in accordance with the reaction method (4) above.

While the resin having polyester as the main chain frame may be prepared based on the method for forming the main chain frame according to the method described in Japanese Patent Application Laid-Open No. 2003-193019, the method is not limited thereto.

While the resin having polycarbonate as the main chain frame may be prepared based on the methods for forming the main chain frame according to the methods described in Japanese Patent Application Laid-Open Nos. 2002-356550 and 2002-179787, the method is not limited thereto.

From the view pint of functional groups, the resin (Ra) having a hydroxyl group may be prepared by polymerization of a compound having a hydroxyl group and polymerizable alkenyl group with other polymerizable alkenyl monomer, or by polymerization of a compound having a hydroxyl group and a mercapto group with a polymerizable alkenyl monomer. The polymerization reaction can be performed in accordance with the reaction method (4) above.

Alternatively, commercially available resin products may be used as resin (Ra). Examples of the commercially available product include polyether polyol manufactured by Asahi Denka Co. (trade name: P-2000, P-3000, PR3007, PR5007), polyether polyol manufactured by Asahi Glass Co. (trade name: Preminol series such as PML-3005, PML-3010, PML-3012, PML-4002, PML-4010, PML-S-4011, PML-S-4012 and PML-5005), polyether polyol manufactured by Sumika Bayer Urethane Co., Ltd. (trade name: Sumiphen3600, Sumiphen3700, SBU-Polyol0319), polyether polyol manufactured by Mitsui Takeda Chemical Co. (trade name: P-28, P-21), polyether polyol manufactured by Daicel Chemical Industries, Ltd. (trade name: PTMG-1000, PTMG-2000, PTMG-3000), polyolefin polyol manufactured by Nippon Soda Co. (trade name GI-1000, GI-2000), polyolefin polyol manufactured by Mitsubishi Chemical Co. (trade name: Polyether H, Polyether HA), acryl polyol manufactured by Otake-Meishin Chemical Co. (trade name: APO series), acryl polyol manufactured by To a Gosei Co. (trade name: UH series such as UH-2000, UC-3000 series), polyester polyol manufactured by Degussa Japan Co. (trade name: Dynacoll 7000 series), polyester polyol manufactured by Asahi Denka Co. (trade name F18-62, F7-67, Y9-10, Y4-5, Y13-35, F9-30, Y6-10, Y6-22, T52-13, NS2400, NS2700), polyester polyol manufactured by Ito Oil Chemicals Co. (trade name: URIC series such as URIC H-30), polycaprolactone diol manufactured by Daicel Chemical Industries, Co. (trade name: Plakcel L220AL), polycarbonate polyol manufactured by Daicel Chemical Industries, Co. (trade name: Plakcel CD220), and polycarbonate polyol manufactured by Asahi Kasei Finechem Co. (trade name: CX series). While the products by Arakawa Chemical Co. (trade name: Rosin Polyol) and the products by Kyowa Co. (trade name: TOE-2000H, Kyowapole Pa.) are also available, the resins are not limited to those as described above.

The resin (Rb) having the mercapto group can be prepared from the resin (Re) having the alkenyl group. An example for preparing the resin (Rb) from resin (Re) is to add a polymercapto compound (compound (v)) having at least two mercapto groups in the molecule to the resin (Re) by a radical addition reaction. The radical addition reaction can be performed in accordance with the reaction method (2).

Alternatively, a commercially available resin may be used for resin (Rb), and examples of commercially available resin include, but are not limited to, those manufactured by Toray Thiocol Co. (trade name: Thiocol LP-32, Thiocol LP-3, Thiocol LP-33, Thiocol LP-2).

The resin (Rc) can be prepared by copolymerization of a compound having a primary or secondary amino group and an alkenyl group, or a compound having a primary or secondary amino group and a mercapto group, with other polymerizable alkenyl monomer. The polymerization reaction can be performed in accordance with the reaction method (4) above.

Among the resin (Rc), the resin having a secondary amino group can be prepared from the resin having a primary amino group. An example of the synthetic method is to allow the resin having a primary amino group to react with an α,β-unsaturated carbonyl compound (compound (1)) and/or an acrylonitrile compound (compound (1-1)) having an α,β-unsaturated carbonyl group in the molecule. The reaction can be performed in accordance with the reaction method (1) above.

The above-mentioned resin (Rc) can be also prepared from the above-mentioned resin (Re) having an alkenyl group. An example of the method for synthesizing the resin (Rc) from the resin (Re) is to add an aminothiol compound (compound (w)) having a mercapto group and a primary or secondary amino group in the molecule to the resin (Re) by a radical addition reaction. The radical addition can be performed in accordance with the reaction method (2) above.

Alternatively, commercially available resin products may be used for the resin (Rc). Examples of the commercially available resin include, but are not limited to, polyoxypropylene manufactured by SanTechno Japan Co. (trade name: Jefamin D-230, D-400, D-200) having a primary amino group at the terminal.

The resin (Rd) can be prepared by one of the following methods according to the description of Japanese Patent Application Laid-Open No. 9-132637, using the resin (Ra) and epihalohydrin as starting materials: (1) a method for allowing the starting materials to react in the presence of an basic compound such as sodium hydroxide; (2) a method for synthesizing a polyhalohydrin ether compound by allowing the strating materials to react in the presence of an acidic compound such as boron trifluoride, followed by allowing a basic compound such as sodium hydroxide to react with the product; and (3) a method for synthesizing a polyhalohydrin ether compound by allowing the starting materials to react in the presence of a basic substance such as triethylamine, followed by allowing a basic compound such as sodium hydroxide to react with the product. Alternatively, the resin may be obtained by synthesizing an isocyanate group-containing compound (synthetic compound (Ra-u), compound (Rb-u) or compound (Rc-u)) by allowing a polyisocyanate compound (compound (z)) to react with the resin (Ra), resin (Rb) or resin (Rc), followed by allowing a glycidol compound (u) having a hydroxyl group and an epoxy group in the molecule to react with the synthesized compound above. Preparation of the isocyanate group-containing compound and the reaction between the isocyanate group-containing compound and the glycidol compound (u) can be performed in accordance with the reaction method (1) above. The resin may be also obtained adding a polymerizable alkenyl compound (compound (s)) having a polymerizable alkenyl group and an epoxy group in the molecule to the resin (Rc) by a radical addition reaction. The radical addition reaction can be performed in accordance with the reaction method (2) above.

The resin (Rd) can be also prepared allowing a compound having an epoxy group and a polymerizable alkenyl group in the molecule to copolymerize with other polymerizable alkenyl monomer. The polymerization reaction can be performed in accordance with the reaction method (4) above.

Alternatively, commercially available resin products may be used for the above-mentioned resin (Rd). The commercially available resins are provided as bisphenol A epoxy resin, bisphenol F epoxy resin and other epoxy resins, and examples of them include, but are not limited to, the products from Daicel Chemical Industries, Co. (trade name: Celloxyside series, Epolead series), the products from Asahi Denka Co. (trade name Adeka Resin EP series), the products from Kyoeisha Chemical, Co. (trade name: Epolite series), the products from Japan Epoxy Resin Co. (trade name: Epicoat series), and the products from Toagosei Co. (trade name: UG-4000 series).

The resin (Re) can be prepared by a known method from the above-mentioned resin (Ra) having a hydroxyl group. While an example of the method is to form an alcoholate of the hydroxyl group of resin (Ra) with metallic sodium, followed by reacting with a halogenated compound having an alkenyl group such as allyl chloride, the method is not limited thereto. The resin (Re) can be prepared from the above-mentioned resin (Rb) having a mercapto group or from the above-mentioned resin (Rc) having a primary or secondary amino group. An example of the method is to allow polymerizable alkenyl compound (s) having a polymerizable alkenyl group and an epoxy group in the molecule to react at the epoxy group of the polymerizable alkenyl compound (s) with the mercapto group of the resin (Rb) or with the primary or secondary amino group of the resin (Rc). The reaction between the above-mentioned resin (Rb) or the above-mentioned resin (Rc) and the polymerizable alkenyl compound (s) can be performed in accordance with the reaction method (1) above.

Alternatively, commercially available resin products may be used for the above-mentioned rein (Re). Examples of the commercially available resin include, but are not limited to, the products by Asahi Denka, Co. (trade name: LX-1164, ARA-200, ARA-4000).

The resin (Rf) can be prepared by copolymerization of a compound having a carboxyl group and a polymerizable alkenyl group with other polymerizable alkenyl monomer. The polymerization reaction can be performed in accordance with the reaction method (4) above.

Alternatively, commercially available resin products may be used for the above-mentioned resin (Rf). Examples of the available resin are those from Daicel Chemical Industries, Co. (trade name: Plakcel 200BA).

The resin (Rg) can be prepared from the above-mentioned resin (Ra) having a hydroxyl group, the above-mentioned resin (Rb) having a mercapto group, or the above-mentioned resin (Rc) having a primary or secondary amino group. Examples of the preparation method include, but are not limited to, a method for allowing an acid chloride (such as acrylic chloride and methacrylic chloride) having an α,β-unsaturated carbonyl group in the molecule to react with the hydroxyl group of resin (Ra), the mercapto group of resin (Rb) or the primary or secondary amino group of resin (Rc).

Alternatively, commercially available resin products may be used for the above-mentioned resin (Rg). Examples of the commercially available resin include, but are not limited to, the products from Toagosei, Co. (trade name: UVA-2000 series), the products from Kyoeisha Chemical, Co. (trade name: Lite Ester series, Lite Acrylate series, Epoxy Ester series).

[Compound (CA)]

This compound has at least one silicon-containing characteristic group, and at least one functional group capable of reacting with isocyanate or isothiocyanate group, in the molecule. The compound includes aminosilane compound (c), hydroxylsilane compound (d), and mercaptosilane compounds (e) and (f) described below.

[Compound (CB)]

This compound has at least one alkenyl group, and at least one isocyanate or isothiocyanate group in the molecule.

The compound includes alkenyl isothiocyanate compound (x) and alkenyl isocyanate compound (y) described below.

[Compound CC]

This compound has at least one silicon-containing characteristic group and at least one isocyanate or thioisocyanate group in the molecule. The compound includes: an isocyanate group-containing compound obtained by allowing the above-mentioned compound (CA) to react with either one of isocyanate silane compound (a), isothiocyanate silane compound (b) and polyisocyanate compound (z) described below; an isocyanate or isothiocyanate group-containing compound obtained by allowing the above-mentioned compound (CB) to react with mercaptosilane compound (f) described below; and an isocyanate or isothiocyanate group-containing compound obtained by allowing the above-mentioned compound (CB) to react with hydrosilane compound (g) described below. The reactions between the compound (CA) and the compound (a), (b), or (z), and the reaction between the compound (CB) and the compound (f) can be performed in accordance with the reaction method (1) above. The reaction between the compound (CB) and the compound (g) can be performed in accordance with the reaction method (2).

[Compound (CD)]

This compound has at lest one silicon-containing characteristic group and at least one epoxy group or α,β-unsaturated carboxyl group. The compound includes epoxysilane compound (h) and α,β-unsaturated carboxylsilane compound (i) described below.

[Compound (CE)]

This compound has at least one silicon-containing characteristic group, and at least one group selected from primary amino group, secondary amino group and mercapto group, in the molecule. The compounds include aminosilane compound (c) and mercaptosilane compounds (e) and (f) described below.

[Isocyanate Silane Compound (a)]

This compound has at least one silicon-containing characteristic group and at least one isocyanate group, and includes the compound represented by formula (28) below:

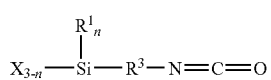

(28)

(wherein $R^1$, X and n are the same groups or number as those described previously, and $R^3$ represents a bivalent organic group with a molecular weight of 1,000 or less.)

Typical examples of compound (a) include, but are not limited to, γ-isocyanatepropyltrimethoxsilane, γ-isocyanatepropylmethyldimethoxysilane, γ-isocyanatepropyltriethoxysilane, γ-isocyanatepropylmethyldiethoxysilane, γ-isocyanatepropyltrimethoxysilane, γ-isocyanatepropylmethyldimethoxysilane, γ-isocyanatepropyltriethoxysilane, γ-isocyanatepropylmethyldiethoxysilane and γ-isocyanatepropyltriethoxysilane.

[Isothiocyanate Silane Compound (b)]

This compound has at least one silicon-containing characteristic group and at least one isothiocyanate group in the molecule, and contains the compound represented by formula (29) below:

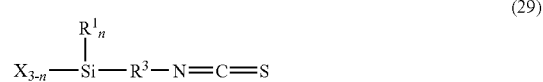

(29)

(wherein R1, R3, X and n are the same groups or number as those defined previously.)

The above-mentioned compound (b) can be prepared by a known method. For example, γ-isocyanatepropyltriethoxysilane can be prepared by the method described in Org. Prep. Proced. Int., 24, 346 (1995).

[Aminosilane Compound (c)]

The aminosilane compound has at least one silicon-containing characteristic group and at least one primary or secondary amino group in the molecule, and includes the compounds represented by the following formulae (30) to (36) and (41):

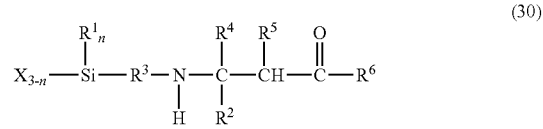

(30)

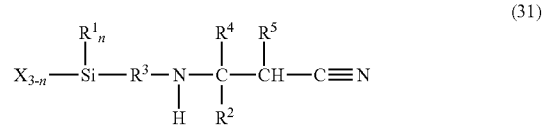

(31)

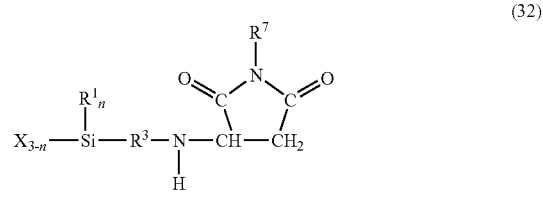

(32)

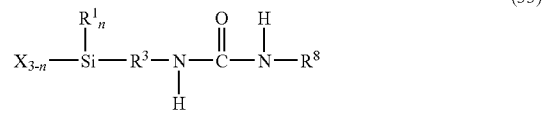

(33)

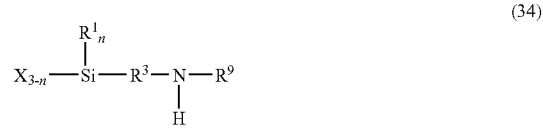

(34)

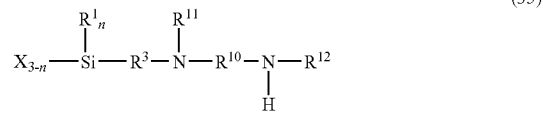

(35)

-continued

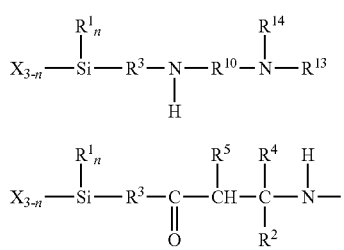

(36)

(41)

(wherein X represents a hydrolyzable group; n is an integer of 0, 1 or 2; $R^1$ denotes a substituted or non-substituted group with a carbon number of 1 to 20, $R^2$ denotes a hydrogen atom or an organic group with a molecular weight of 1,000 or less, $R^3$ denotes a bivalent organic group with a molecular weight of 1000 or less, $R^4$ denotes a hydrogen atom or a group represented by —COOR$^{15}$ or an organic group with a molecular weight of 1,000 or less, $R^5$ denotes a hydrogen atom or an organic group with a molecular weight of 1,000 or less, $R^6$ denotes either of a hydrogen atom, OR$^{16}$, $R^{16}$ and NH$_2$, $R^{15}$ denotes a hydrogen atom or an organic group with a molecular weight of 1,000 or less, and $R^{16}$ denotes a hydrogen atom or an organic group with a molecular weight of 1,000 or less that may contain the silicon-containing characteristic group; $R^7$ represents either of a phenyl group, a cyclohexyl group and an organic group with a carbon number of 1 to 20, and $R^8$ denotes an organic group with a molecular weight of 1,000 or less that may include the silicon-containing characteristic group; $R^9$ denotes either of a hydrogen atom, a phenyl group, an organic group with a carbon number of 1 to 20 and an organic group with a molecular weight of 1,000 or less that may contain the silicon-containing characteristic group; $R^{10}$ denotes an organic group with a molecular weight of 1,000 or less; $R^{11}$, $R^{12}$, $R^{13}$ and $R^{14}$ denote a hydrogen atom or the groups represented by formula (37), (38), (39) or (40), respectively, wherein $R^{14}$ is a group represented by formula (37), (38), (39) or (40) when $R^{13}$ is a group represented by formula (37) or (38), $R^{14}$ is a group represented by formula (37), (38) or (39) when $R^{13}$ is a group represented by formula (39), and $R^{14}$ is a hydrogen atom when $R^{13}$ is a group represented by formula (40).

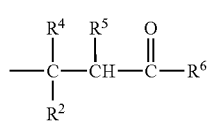

(37)

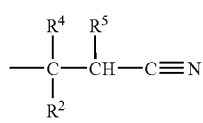

(38)

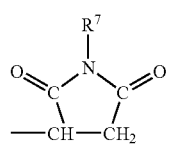

(39)

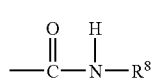

(40)

The compound represented by formula (30) above is obtained by allowing the amino group of aminosilane compound (k-1) represented by formula (117) below to react with the α,β-unsaturated carbonyl group of the α,β-unsaturated carbonyl compound (compound (1)) represented by formula (119) below. The reaction can be performed in accordance with the reaction method (1) above.

The compound represented by formula (31) above is obtained by allowing the amino group of the aminosilane compound (k-1) represented by formula (117) below to react with the α,β-unsaturated carbonyl group of the acrylonitrile compound (compound (1-1)) represented by formula (121) below. The reaction can be performed in accordance with the reaction method (1) above.

The compound represented by formula (32) above is obtained by allowing the amino group of aminosilane compound (k-1) represented by formula (117) below to react with the α,β-unsaturated carbonyl group of the maleimide compound (belonging to the α,β-unsaturated compound (compound (1))) represented by formula (120) below. The reaction can be performed in accordance with the reaction method (1) above.

The compound represented by formula (33) above is obtained by allowing the amino group of allowing the amino group of aminosilane compound (k-1) represented by formula (117) below to react with the isocyanate group of the monoisocyanate compound (compound (m)) represented by formula (122) below. The reaction can be performed in accordance with the reaction method (1) above.

The compound represented by formula (34) above is obtained by allowing the aminosilane compound (k-2) represented by formula (118) below to react with one or more of the α,β-unsaturated carbonyl compound (compound (1)) represented by formula (119) or (120) below, acrylonitrile compound (compound (1-1)) and monoisocyanate compound (compound (m)) represented by formula (122) below. The reaction can be performed in accordance with the reaction method (1) above.

The compound represented by formula (41) above is obtained by allowing an α,β-unsaturated carbonylsilane compound having the silicon-containing characteristic group and α,β-unsaturated carbonyl group in the molecule to react at the α,β-unsaturated carbonyl group of the α,β-unsaturated carbonylsilane compound with the primary amino group of the amine compound (compound (n-1)) represented by formula (123) below. The reaction can be performed in accordance with the reaction method (1) above.

The aminosilane compound (c) above also includes a compound having the silicon-containing characteristic group and an amino group obtained by allowing the primary amino group of the aminosilane compound (k-1) represented by formula (117) below or aminosilane compound (k-2) represented by formula (118) below to react with a cyclic carbonate compound in an equivalent amount to the amino group. Examples of the cyclic carbonate compound include, but are not limited to, ethylene carbonate and propylene carbonate. The reaction can be performed in accordance with the reaction method (1) above.

(117)

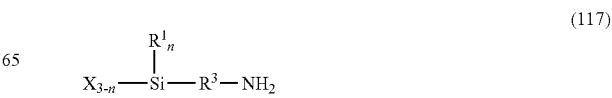

-continued

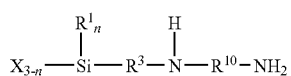
(118)

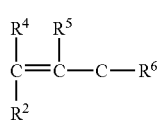
(119)

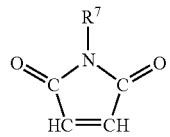
(120)

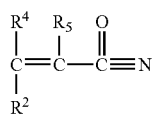
(121)

$R^{24}-N=C=O$ (122)

$R^{24}-NH_2$ (123)

(wherein, $R^1$ to $R^7$, $R^{10}$, X and n are the same groups and number defined previously; $R^{24}$ denotes an organic group with a molecular weight of 1,000 or less that may contain the silicon-containing characteristic group.)

Aminosilane compound (c) further includes a compound having the silicon-containing characteristic group and an amino group in the molecule, which is prepared by a radical addition reaction of an aminothiol compound (compound (w)) having an amino group and a mercapto group in the molecule with an alkenylsilane compound (compound (j)) having the silicon-containing characteristic group and an alkenyl group in the molecule, between the mercapto group of the aminothiol compound (compound (w)) and the alkenyl group of the alkenylsilane compound (compound (j)). The radical addition reaction can be performed in accordance with the reaction method (2) above.

Typical examples of aminosilane compound (c) above include, but are not limited to, γ-aminopropyltrimethoxysilane, γ-aminopropylmethyldimethoxysilane, γ-aminopropyltriethoxysilane, γ-aminopropylmethyldiethoxysilane, aminophenyltrimethoxysilane, 4-amino-3-dimethylbutyltrimethoxysilane, 4-amino-3-dimethylbutylmethyl dimethoxysilane, 4-amino-3-dimethylbutyltriethoxysilane, 4-amino-3-dimethylbutylmethyldiethoxysilane, N-phenyl-γ-aminopropyltrimethoxysilane, N-naphthyl-γ-aminopropyltrimethoxysilane, N-phenyl-γ-aminopropylmethyl dimethoxysilane, N-naphthyl-γ-aminopropylmethyldimethoxysilane, N-(n-butyl)-γ-aminopropyltrimethoxysilane, N-(n-butyl)-γ-aminopropylmethyldimethoxysilane, N-ethyl-γ-aminopropyltrimethoxysilane, N-ethyl-γ-aminopropylmethyldimethoxysilane, N-ethylaminoisobutyltrimethoxysilane, N-methyl-γ-aminopropyltrimethoxysilane, N-methyl-γ-aminopropylmethyldimethoxysilane, N-β(aminoethyl)-γ-aminopropyltrimethoxysilane, N-β(aminoethyl)-γ-aminopropyltriethoxysilane, N-β(aminoethyl)-γ-aminopropylmethyldimethoxysilane, N-β(aminoethyl)-γ-aminopropylmethyldiethoxysilane, N-3-[amino(dipropyleneoxy)]aminopropyltrimethoxysilane, (aminoethylaminomethyl)phenethyltrimethoxysilane, N-(6-aminohexyl)aminopropyltrimethoxysilane, N-(2-aminoethyl)-11-aminoundecyltrimethoxysilane, bis(trimethoxysilylpropyl)amine and the like.

[Hydroxysilane Compound (d)]

This compound has at least one silicon-containing characteristic group and at least one hydroxyl group, and includes the compounds represented by formulae (42) to (52) below:

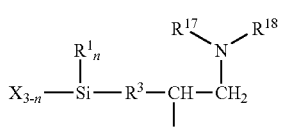
(42)

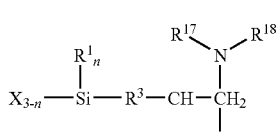
(43)

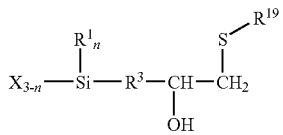
(44)

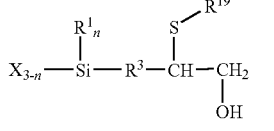
(45)

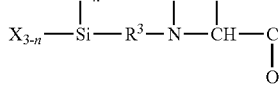
(46)

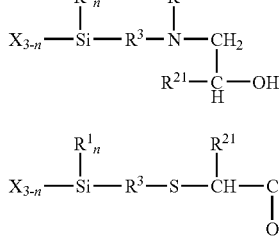
(47)

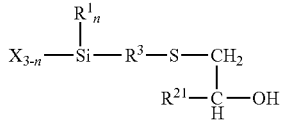
(48)

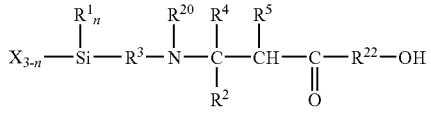
(49)

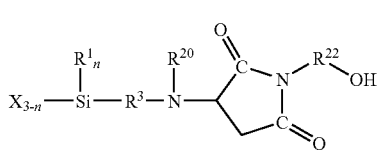
(50)

(51)

-continued

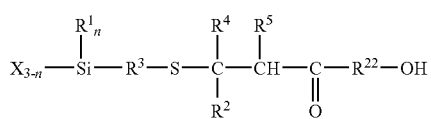
(52)

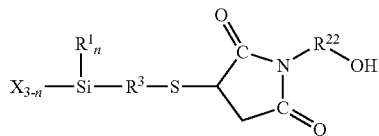
(53)

(wherein $R^1$, $R^3$, X and n are defined by the same groups and number as described previously; $R^{17}$ and $R^{18}$ denote a hydrogen atom or an organic group with a molecular weight of 1,000 or less, respectively, which may contain the silicon-containing characteristic group; $R^{19}$ denotes a hydrogen atom or an organic group with a molecular weight of 1,000 or less, which may contain the silicon-containing characteristic group; $R^{20}$ and $R^{21}$ denote a hydrogen atom or organic group with a molecular weight of 1,000 or less, respectively, which may contain the silicon-containing characteristic group; and $R^{22}$ represents an organic group with a carbon number of 1,000 or less.)

The compound represented by formula (42) or (43) is obtained by allowing an epoxy group of epoxysilane compound (h) represented by formula (58) below and an amine compound (compound (n-1) and compound (n-2)) represented by any one of formula (123), formula (124) and formula (125) below to react at the epoxy group of epoxysilane compound (h) with the amino group of the amine compound (compound (n-1) and compound (n-2)). The reaction can be performed in accordance with the reaction method (1) above.

The compound represented by formula (44) or (45) above is obtained by allowing the epoxy group of epoxysilane compound (h) below to react with the mercapto group of the thiol compound (compound (o)) represented by formula (126) below. The reaction can be performed in accordance with the reaction method (1) above.

The compound represented by formula (46) or (47) above is obtained by allowing the amino group of the aminosilane compound (c) above with the epoxy group of the monoepoxy compound (compound (o)) represented by formula (127) below. The reaction can be performed in accordance with the reaction method (1) above.

The compound represented by formula (48) or (45) above is obtained by allowing the mercapto group of the mercaptosilane compound (compound (e)) below to react with the epoxy group of the monoepoxy compound (compound (o)) represented by formula (127) below. The reaction can be performed in accordance with the reaction method (1) above.

The compound represented by formula (50) or (51) above is obtained by allowing the amino group of the aminosilane compound (compound (k-1)) represented by formula (101) below to react with the α,β-unsaturated carbonyl group of the hydroxyl group-containing α,β-unsaturated carbonyl compound (compound (q)) represented by formula (128) or (129) below. The reaction can be performed in accordance with the reaction method (1) above.

The compound represented by formula (52) or (53) above is obtained by allowing the mercapto group of the mercaptosilane compound (compound (e)) represented by formula (54) below to react with the α,β-unsaturated carbonyl group of the hydroxyl group-containing α,β-unsaturated carbonyl compound (compound (q)) represented by formula (128) or (129) below. The reaction can be performed in accordance with the reaction method (1) above.

The hydroxysilane compound (d) also includes a compound obtained by allowing a compound having a hydroxyl group and an alkenyl group to add the alkenyl group of said compound to the mercapto group of mercaptosilane compound (e) or (f) below by an radical addition reaction. The radical addition reaction can be performed in accordance with the reaction method (2) above.

[Mercaptosilane Compound (e)]

While the mercaptosilane compound has at least one silicon-containing characteristic group and at least one mercapto group, the compound has no protonic polar group except the mercapto group. This compound also includes a compound represented by following formula (54):

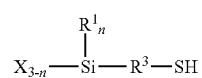
(54)

(wherein $R^1$, $R^3$, X and n are the same groups and number as defined previously.)

Typical examples of mercaptosilane compound (e) include, but are not limited to, γ-mercaptopropyl trimethoxysilane, γ-mercaptopropylmethyldimethoxysilane, γ-mercaptopropyltriethoxysilane and γ-mercaptopropylmethyldiethoxysilane. Commercially available compounds may be also used.

[Mercaptosilane Compound (f)]

This compound has at least one silicon-containing characteristic group and at least one mercapto group, and includes the compound represented by formula (55) or (56) below:

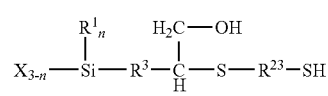
(55)

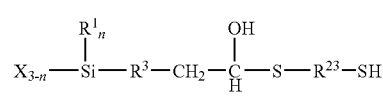
(56)

(wherein $R^1$, $R^3$, X and n are the same groups and number as defined previously, and $R^{23}$ denotes a bivalent organic group with a molecular weight of 10,000 or less.)

The compound represented by formula (55) or (56) is obtained by allowing the epoxy group of epoxysilane compound (h) represented by formula (58) below to react with the mercapto group of polymercapto compound (v) represented by formula (133) below. The reaction can be performed in accordance with the reaction method (1) above.

[Hydrosilane Compound (g)]

The hydrosilane compound is represented by formula (57) below:

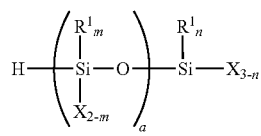
(57)

(wherein $R^1$, $R^3$, X and n are the same groups and number as defined previously; m represents an integer of 0 or 1 and, a represents an integer of 0 or of 1 to 19; and m in the repeating unit may be the same or different between all the repeating units.)

Typical examples of hydrosilane compound (g) include, but are not limited to, halogenated silane such as trichlorosilane, methyldichlorosilane, dimethylchlorosilane and trimethylsyloxydichlorosilane; alkoxysilane such as trimethoxysilane, triethoxysilane, methyldimethoxysilane, phenyldimethoxysilane and 1,3,3,5,5,7,7-heptamethyl-1,1-dimetoxytetrasyloxane; acyloxysilane such as methyldiactoxysilane and trimethylsiloxymethylacetoxysilane; ketoxymate silane such as bis(dimethylketoxymate)methylsilane, bis(cyclohexylketoxymate)methylsilane and bis(diethylketoxymate)trimethylsiloxysilane; hydrosilane such as dimethylsilane, trimethylsiloxymethylsilane and 1,1-dimethyl-3,3-dimethyldisiloxane; and alkenyloxy silane such as tri(isopropenyloxy)silane.

[Epoxysilane Compound (h)]

This compound has at least one silicon-containing characteristic group and at least one epoxy group in the molecule, and includes the compound represented by formula (58) below:

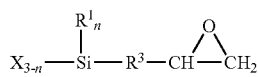
(58)

(wherein $R^1$, $R^3$, X and n are the same groups and number as defined previously.)

Typical examples of the epoxysilane compound (h) include, but are not limited to, β-(3,4-epoxycyclohexyl)ethyltrimethoxysilane, γ-glycydoxypropyltrimethoxysilane, γ-glycydoxypropylmethyldimethoxysilane, γ-glycydoxypropyltriethoxysilane and γ-glycydoxypropylmethyldiethoxysilane. Compound (h) is commercially available.)

The compound (h) is obtained by allowing the isocyanate group or thioisocyanate group of the compound (CC) having the silicon-containing characteristic group and an isocyanate group or isothiocyanate group to react with the hydroxyl group of glycidol compound (u) below; or by allowing the alkenyl group of the compound having an alkenyl group and an epoxy group in the molecule represented by formula (81) below to add to the mercapto group of mercaptosilane compound (e) or mercaptosilane compound (f) by a radical addition reaction. The reaction between the compound (CC) and the compound (u) can be performed in accordance with the reaction method (1) above, while the reaction between the compound represented by formula (81) below and the compound (e) or compound (f) can be performed in accordance with the reaction method (2) above:

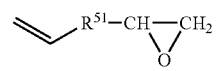
(81)

(wherein $R^{51}$ denotes an organic group with a molecular weight of 1,000 or less.)

[α,β-Unsaturated Carbonylsilane Compound (i)]

This compound has at least one silicon-containing characteristic group and at least one α,β-unsaturated carbonyl group, and includes reaction products (i-1) to (i-5) obtained by the following reactions.

Reaction product (i-1): The amino group of aminosilane compound (c) above or the mercapto group of mercaptosilane compound (e) or mercaptosilane compound (f) above is added to the α,β-unsaturated carbonyl group of the polyfunctional (meth)acrylate compound represented by formula (59) below by Michael addition reaction.

Reaction product (i-2): The amino group of aminosilane compound (c) or the mercapto group of mercaptosilane compound (e) or mercaptosilane compound (f) is allowed to react with the epoxy group of the epoxy compound represented by formula (61) below.

Reaction product (i-3): The amino group, hydroxyl group or mercapto group of one compound selected from compound (CA) and mercaptosilane compound (f) above is allowed to react with the isocyanate group of the isocyanate compound represented by formula (62) below.

Reaction product (i-4): The isocyanate group of a compound belonging to the compound (CC) above is allowed to react with the hydroxyl group of the hydroxyl compound represented by formula (63) below.

Reaction product (i-5): Reaction product (io-z) having an isocyanate group and an α,β-unsaturated carbonyl group in the molecule represented by formula (64) below is prepared by allowing the hydroxyl group of the hydroxyl compound represented by formula (63) below to react with the isocyanate group of compound (z) below, and the amino group, hydroxyl group or mercapto group of a compound selected from compound (CA) and mercaptosilane compound (f) above is allowed to react with the reaction product described above.

α,β-Unsaturated carbonyl compound (i) is also prepared by allowing an acid chloride having the α,β-unsaturated carbonyl group in the molecule such as acrylic chloride and methacrylic chloride to react with one of aminosilane compound (c), hydroxylsilane compound (d), mercaptosilane compounds (e) and (f) above.

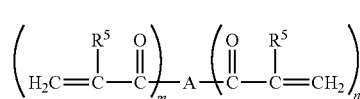
(59)

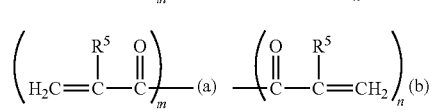
(60)

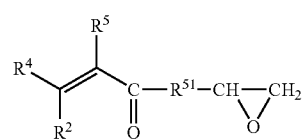
(61)

-continued

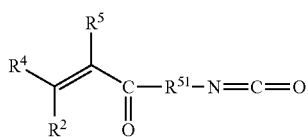
(62)

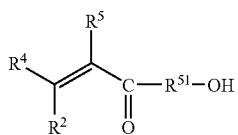
(63)

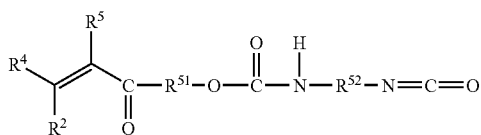
(64)

(wherein $R^2$, $R^4$ and $R^5$ are the groups defined as described above; A represents a residue of the (meth)acrylic compound having a group represented by (a) in formula (60) and a group represented by (b) in formula (60) in the molecule; m and n represent integers of 1 to 3, respectively; a plural number of $R^5$ contained in a molecule may be the same or different; $R^{51}$ represents an organic group with a molecular weight of 1,000 or less; and R $R^{52}$ represents a residue other than isocyanate group, of polyisocyanate compound (z) below.)

The polyfunctional(meth)acrylate compound (methacrylacryl) represented by formula (59) above includes polyacrylate or polymethacrylate of polyol compounds such as butanediol, hexanediol, ethyleneglycol, propyleneglycol, diethyleneglycol, triethyleneglycol, tripropyleneglycol, glycerin, neopentylglycol, trimethylolpropane, pentaerythritol, dipentaerythritol, polyethyleneglycol and polypropyleneglycol. Typical examples of them include ethyleneglycol di(meth)acrylate, triethyleneglycol di(meth)acrylate, neopentylglycol di(meth)acrylate, trimethylolpropane tri(meth) acrylate, pentaerythritol tri(meth)acrylate, dipentaerythritol hexa(meth)acrylate and 1,6-hexanediol di(meth)acrylate. While the products from Kyoeisha Chemical Co. (trade name: Epoxy Ester 40EM, 70PA, 200PA, 80MF, 3002M, 30002A) commercially available as (meth)acrylic acid adducts of polyglucidylether among the polyol compounds may be also used, the compound is not limited thereto.

Michael addition reaction for obtaining reaction product (i-1) by a reaction between the polyfunctional (meth)acrylate compound represented by formula (59) above and the amino group or mercapto group of a compound selected from aminosilane compound (c), mercaptosilane compounds (e) and (f) can be performed in accordance with the reaction method (1) above. During the reaction described above, the reactions such as those described in general formula (65) (the reaction between the polyfunctional (meth)acrylate compound and compound (c)), in general formula general formula (66) (the reaction between the polyfunctional (meth)acrylate compound and compound (e)), and in general formula general formula (66) (the reaction between the polyfunctional (meth) acrylate compound and compound (f)) progress. Typical examples of the epoxy compound represented by formula (61) above include, but are not limited to, glycidyl(meth) acrylate and tetrahydrofulfuryl(meth)acrylate.

The reaction for obtaining reaction product (i-2) from the epoxy group of the epoxy compound represented by formula (61) above and the amino group or mercapto group of the compound selected from aminosilane compound (c) and mercaptosilane compounds (e) and (f) can be performed in accordance with the reaction method (1) above. During the reaction above, reactions represented by general formula general formula (68) (the reaction between the epoxy compound and the compound (c)), by general formula (69) (the reaction between the epoxy compound and the compound (e)) and by general formula (70) (the reaction between the epoxy compound and the compound (f)) progress during the reaction as described above. The notation "R" in the formulae denoting the reactions described below is only used for indicating the presence of an organic group, and the same notation "R" is used for indicating different organic groups.

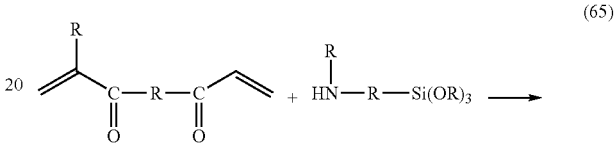
(65)

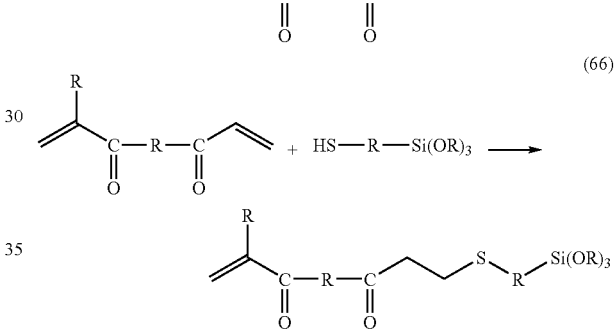
(66)

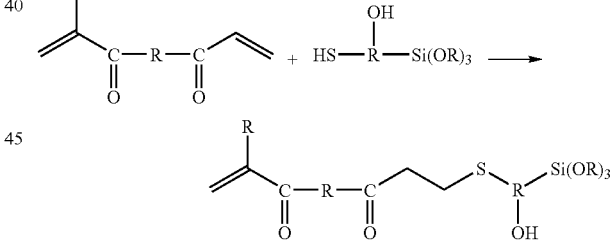
(67)

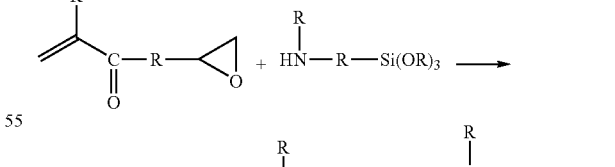
(68)

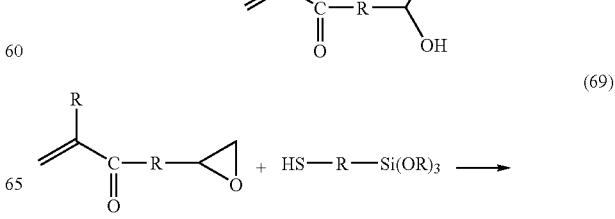
(69)

-continued

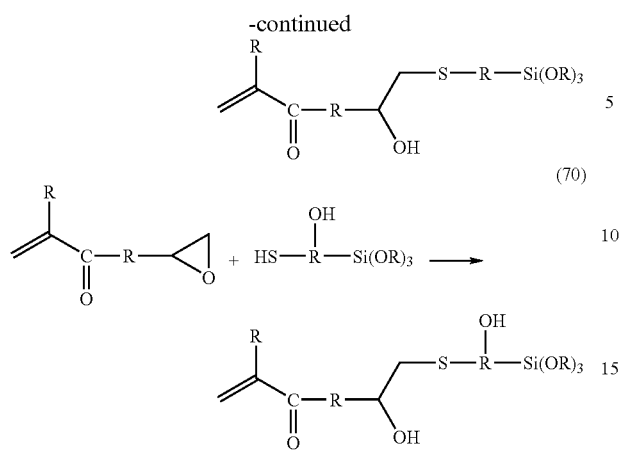

(70)

Typical examples of the isocyanate compound represented by formula (62) include 2-methacryloyloxyethyl isocyanate manufactured by Showa Denko Co. (trade name: Calens MOI).

The reaction for obtaining reaction product (i-3) by a reaction between the isocyanate group of the isocyanate compound represented by formula (62) above, and the amino group, hydroxyl group or mercapto group of the compound selected compound (CA) and mercaptosilane compound (f) above, can be performed in accordance with the reaction method (1) described above. The reaction represented by general formula (71) below (the reaction between the isocyanate compound and the compound (c)), the reaction represented by general formula (72) below (the reaction between the isocyanate compound and the compound (d)), and the reaction represented by general formula (73) below (the reaction between the isocyanate compound and the compound (e)) progress during the reaction described above. When the compound selected from compound (CA) and mercaptosilane compound (f) has a plurality of functional groups reactive to the isocyanate compound, the product obtained is a mixture of products in which one of the reactive functional groups is reacted with the isocyanate group of the isocyanate compound. For example, if a compound having the hydroxyl group and mercapto group together is used, the product obtained is a mixture of the reaction products represented by general formulae (72) and (73).

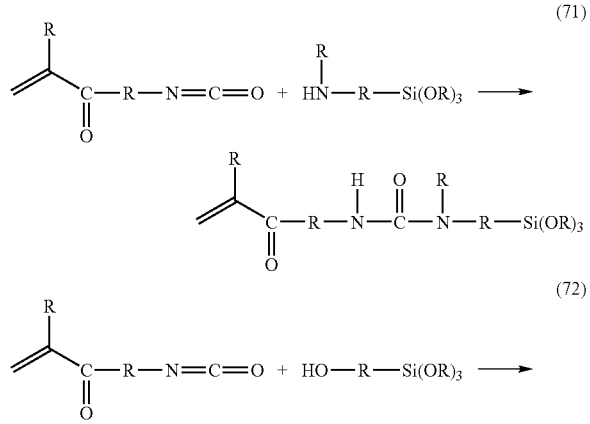

-continued

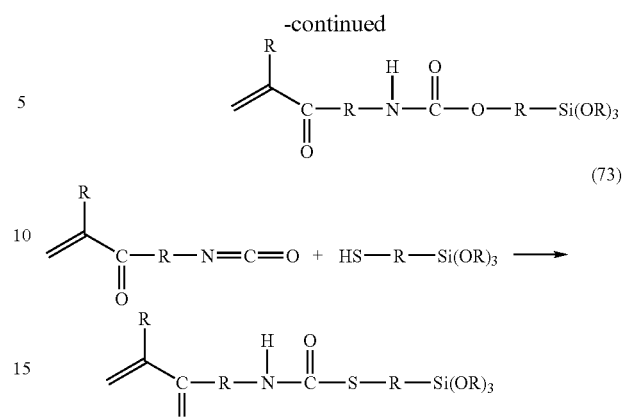

(73)

Typical examples of the hydroxyl compound represented by formula (63) include, but are not limited to, hydroxyl group-containing (meth)acrylate such as 4-hydroxybutyl (meth)acrylate, 2-hydroxyethyl(meth)acrylate, 2-hydroxypropyl(meth)acrylate and N-methylol acrylamide.

The reaction for obtaining reaction product (i-4) by a reaction between the hydroxyl group of the hydroxyl compound represented by formula (63), and the isocyanate group or isothiocyanate group of the compound belonging to the compound (CC) above can be performed in accordance with the reaction method (1) above. The reaction as shown by general formula (74) below progresses during the reaction above.

The reaction for synthesizing reaction product (io-z) represented by formula (64) above by allowing the hydroxyl group of the hydroxyl compound represented by formula (63) to react with the isocyanate group of polyisocyanate compound (z) in the preparation of the reaction product (i-5) can be performed in accordance with the reaction method (1) above. The reaction represented by general formula (75) progresses during the reaction above.

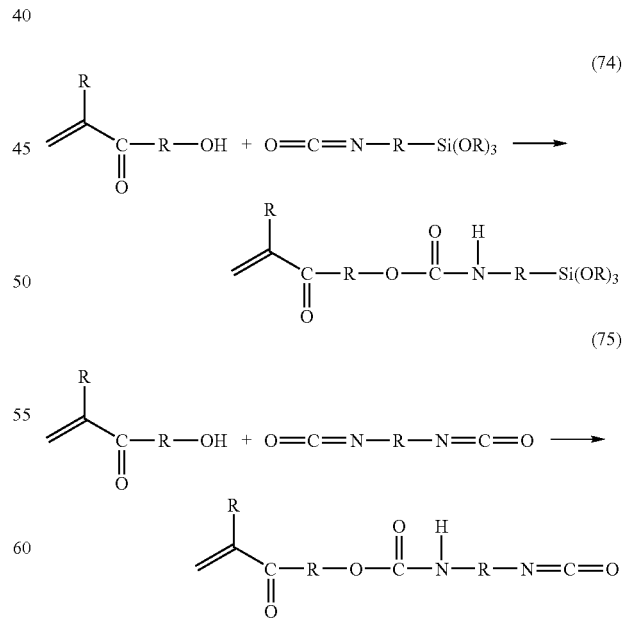

The reaction for obtaining reaction product (i-5) by allowing the reaction product (io-z) represented by formula (64), obtained by allowing the hydroxyl group of the hydroxyl compound represented by formula (63) to react with the isocyanate group of isocyanate compound (z), to react with the amino group, hydroxyl group or mercapto group of the compound selected from the compound (CA) and the mercaptosilane compound (f) can be performed in accordance with the reaction method (1) above. During the reaction described above, the reactions represented by general formula (76) below (the reaction between reaction product (io-z) and aminosilane compound (c)), represented by general formula (77) below (the reaction between reaction product (io-z) and hydroxylsilane compound (d)), and by general formula (78) below (the reaction between reaction product (io-z) and mercaptosilane compound (e)) progress. When the compound (CA) has a plurality of reactive functional groups to the isocyanate group, the reaction product is a mixture of compounds in which one of the reactive functional groups has reacted with the isocyanate group of the reaction product (io-z). For example, if a compound (f) having a hydroxyl group and a mercapto group together is used, the reaction product is a mixture of the products represented by general formulae (77) and (78).

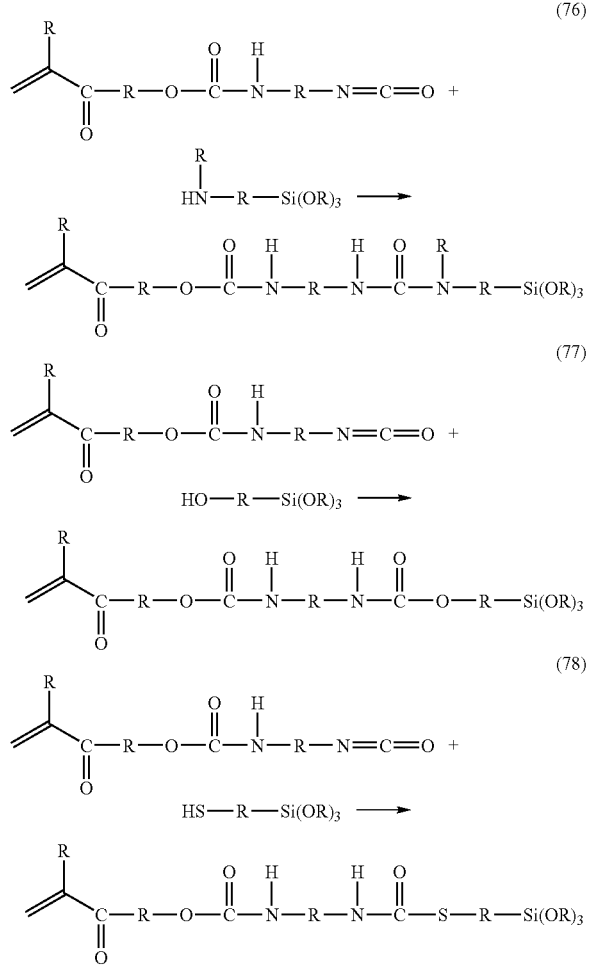

[Alkenylsilane Compound (j)]

This compound has at least one silicon-containing characteristic group and at least one alkenyl group in the molecule, and includes reaction products (j-1) to (j-13) obtained by the following reactions.

Reaction product (j-1): The α,β-unsaturated carbonyl group of the polyfunctional ally compound represented by formula (79) below is allowed to react with the amino group or mercapto group of the compound selected from aminosilane compound (c) and mercaptosilane compounds (e) and (f).

Reaction product (j-2): The epoxy group of the epoxy compound represented by formula (81) below is allowed to react with the amino group, hydroxyl group or mercapto group of the compound selected from aminosilane compound (c), and mercaptosilane compounds (e) and (f).

Reaction product (j-3): The isocyanate group of the isocyanate compound represented by formula (82) below is allowed to react with the amino group, hydroxyl group or mercapto group of the compound selected from compound (CA) and compound (f).

Reaction product (j-4): The hydroxyl group of the hydroxyl compound represented by formula (83) below is allowed to react with the isocyanate group or thioisocyanate group of the compound selected from compound (CC).

Reaction product (j-5): Reaction product (jo-z) represented by formula (86) below and having an isocyanate group and an alkenyl group in the molecule, which is prepared by allowing the hydroxyl group of the hydroxyl compound represented by formula (83) below to react with the isocyanate group of polyisocyanate (z) described below, and the isocyanate group is allowed to react with the amino group, hydroxyl group or mercapto group of the compound selected from compound (CA) and mercaptosilane compound (f).

Reaction product (j-6): The mercapto group of the thiol compound represented by formula (84) below is allowed to react with the isocyanate group or thioisocyanate group of compound (CC).

Reaction product (j-7): Reaction product (js-z), represented by formula (87) below and having an isocyanate group and an alkenyl group in the molecule, is prepared by allowing the mercapto group of the thiol compound represented by formula (84) below to react with the isocyanate group of polyisocyanate compound (z) described below, and the isocyanate group is allowed to react with the amino group, hydroxyl group or mercapto group of the compound selected from compound (CA) and mercaptosilane compound (f).

Reaction product (j-8): The mercapto group of the thiol compound represented by formula (84) is allowed to react with the α,β-unsaturated carbonyl group of α,β-unsaturated carbonylsilane compound (i).

Reaction product (j-9): The mercapto group of the thiol compound represented by formula (84) below is allowed to react with the epoxy group of epoxysilane compound (h).

Reaction product (j-10): The amino group of the amine compound represented by formula (85) below is allowed to react with the isocyanate group or thioisocyanate group of compound (CC).

Reaction product (j-11): Reaction product (jn-z), represented by formula (88) below and having an isocyanate group and an alkenyl group in the molecule, is prepared by allowing the amino group of the amine compound represented by formula (85) below to react with the isocyanate group of polyisocyanate compound (z), and the isocyanate group is allowed to react with the amino group, hydroxyl group or mercapto group of the compound selected from compound (CA) and mercaptosilane compound (f).

Reaction product (j-12): The amino group of the amine compound represented by formula (85) below is allowed to react with the α,β-unsaturated carbonyl group of α,β-unsaturated carbonylsilane compound (i).

Reaction product (j-13): The amino group of the amine compound represented by formula (85) below is allowed to react with the epoxt group of epoxysilane compound (h).

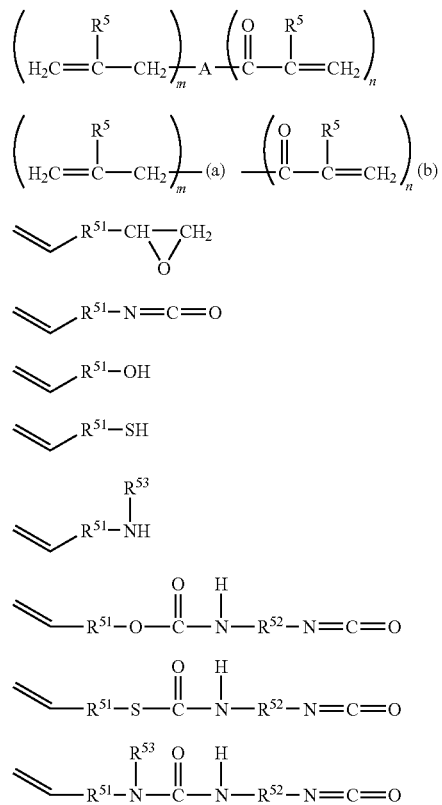

(wherein $R^5$, $R^{51}$, $R^{52}$ and $R^{53}$ are the groups as defined above; $R^{53}$ represents a hydrogen atom or an organic group with a molecular weight of 1,000 or less that may contain the silicon-containing characteristic group; A denotes a residue of the (meth)acrylic compound having the group represented by (a) of formula (80) or the group represented by (b) of formula (80) above; m and n represent integers of 1 to 3, respectively; and a plurality of $R^5$ contained in a molecule may be the same or different.)

The polyfunctional ally compound represented by formula (79) above corresponds to a compound in which the (meth)acryloyl group is substituted with the allyl group at one terminal of the polyfunctional (meth)acrylate represented by formula (59) above. Accordingly, a specific example of the polyfunctional allyl compound includes a compound in which the (meth)acryloyl group at one terminal in the specific example of the polyfunctional (meth)acrylate compound represented by formula (59) above is substituted with the allyl group.

The preparation of reaction product (j-1) by Michael addition reaction between the polyfunctional allyl compound represented by formula (79) and the compound selected from aminosilane compound (c) and mercapto compounds (e) and (f) can be performed in accordance with the reaction method (1) described above. During the reaction described above, reactions represented by general formula (89) below (the reaction between the polyfunctional allyl compound and compound (c)), by general formula (90) below (the reaction between the polyfunctional allyl compound and compound (e)), and by general formula (91) below (the reaction between the polyfunctional allyl compound and compound (f)) progress.

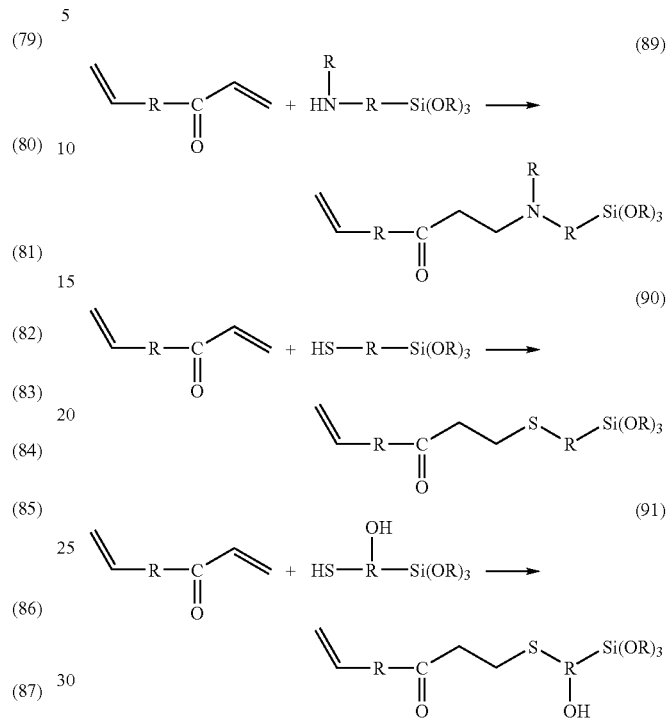

Typical examples of the epoxy compound represented by formula (81) above include, but are not limited to, allyl glycidy lether, 3-vinylcyclohexene oxide, products manufactured by Daiso Co. (trade name: Neoallyl G) and by Daicel Chemical Industries, Co. (trade name: Celoxide 2000).

The preparation of reaction product (j-2) by the reaction between the epoxy group of the epoxy compound represented by formula (81) above and the amino group or mercapto group of the compound selected from aminosilane compound (c) and mercaptosilane compounds (e) and (f) can be performed in accordance with the reaction method (1) described above. During the reaction above, the reactions represented by general formula (92) below (the reaction between the epoxy compound and compound (c)), by general formula (93) below (the reaction between the epoxy compound and compound (e)), and by general formula (94) below (the reaction between the epoxy compound and compound (f)) progress.

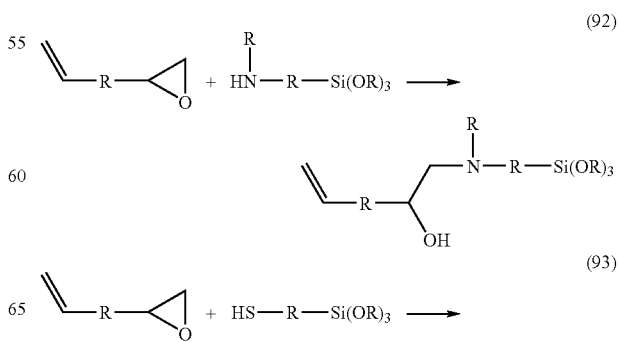

-continued

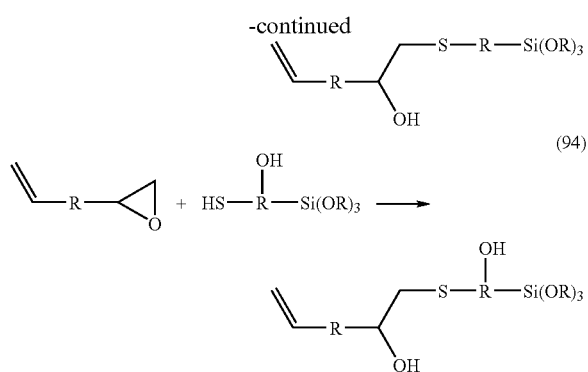

(94)

Typical examples of the isocyanate compounds represented by formula (82) above include, but are not limited to, allyl isocyanate, m-isopropenyl-α,α-dimethylbenzyl isocyanate, a product manufactured by Japan SciTech Industry (trade name: m-TMI) and the like.

The reaction product (j-3) by the reaction of the isocyanate group of the isocyanate compound represented by general formula (82) above and the amino, hydroxyl or mercapto group of a compound selected from the compound (CA) and the compound (f) can be prepared according to the reaction method (1) described above. At this time, the reactions represented by the following general formula (95) (reaction of an isocyanate compound and the compound (c)), the following general formula (96) (reaction of an isocyanate compound and the compound (d)) and the following general formula (97) (reaction of an isocyanate compound and the compound (e)) progress. When the compound selected from the compounds (CA) and (f) has a plurality of functional groups reactive with isocyanate group, the compound is converted to a mixture containing compounds of which one of the reactive functional groups is bound to the isocyanate group of isocyanate compound. For example, if a compound having both hydroxyl and mercapto groups, such as those represented by general formulae (55) and (56) above, is used, a mixture of the reaction products in the following general formulae (96) and (97) is obtained.

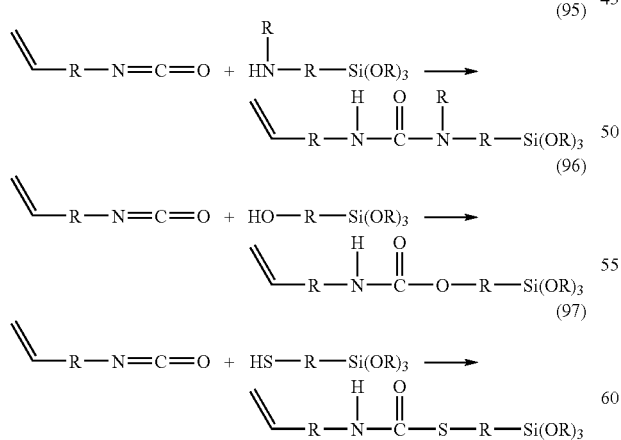

Typical examples of the hydroxyl compound represented by general formula (83) above include, but are not limited to, allyl alcohol, a product manufactured by Daicel Chemical Industries, (trade name: Placcel CF-200), and the like.

The reaction product (j-4) in the reaction of the hydroxyl group of a hydroxyl compound represented by general formula (83) above with the isocyanate or isothiocyanate group of the compound (CC) can be prepared according to the reaction method (1) described above. At this time, the reaction represented by the following general formula (98) progresses.

The reaction product (jo-z) in the reaction of the hydroxyl group of a hydroxyl compound represented by general formula (83) above with the isocyanate group of the compound (z) can be prepared according to the reaction method (1) described above. At this time, the reaction represented by the following general formula (99) progresses.

The reaction product (j-5) in the reaction of the isocyanate group of the reaction product (jo-z) above with the amino, hydroxyl or mercapto group of the compound (CA) can be prepared according to the reaction method (1) described above. At this time, the reactions such as those represented by the following general formula (100) (reaction of reaction product (jo-z) and compound (c)), the following general formula (101) (reaction of reaction product (jo-z) and compound (d)), and the following general formula (102) (reaction of reaction product (jo-z) and compound (e)) progress. When the compound (CA) has a plurality of functional groups reactive with isocyanate group, the compound is converted to a mixture containing compounds of which one of the reactive functional groups is bound to the isocyanate group of reaction product (jo-z). For example, if a compound having both hydroxyl and mercapto groups is used, a mixture of reaction products prepared in the following formulae 101 (general formula) and 102 (general formula) is obtained.

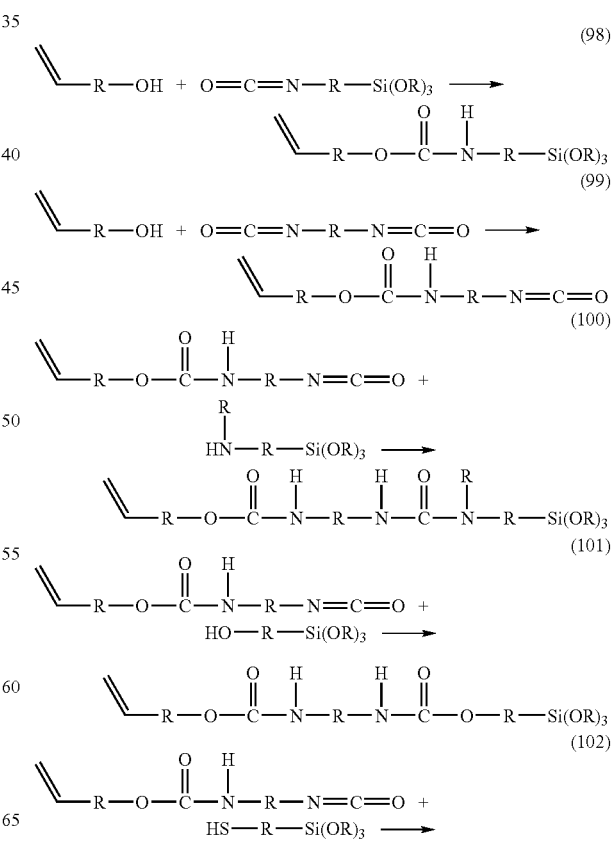

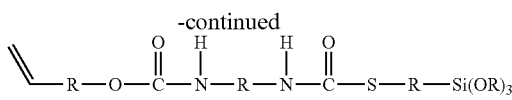

Typical examples of the thiol compounds represented by general formula (84) above include, but are not limited to, allylmercaptan, furfurylmercaptan and the like.

The reaction product (j-6) in the reaction of the mercapto group of a thiol compound represented by general formula (84) above with the isocyanate or isothiocyanate group of the compound (CC) can be prepared according to the reaction method (1) described above. At this time, the reaction represented by the following general formula (103) progresses.

The reaction product (js-z) represented by general formula (87) above in the reaction of the mercapto group of a thiol compound represented by general formula (84) above with the isocyanate group of the compound (z) can be prepared according to the reaction method (1) described above. At this time, the reaction represented by the following general formula (104) progresses.

The reaction product (j-7) in the reaction of the isocyanate group of the reaction product (js-z) represented by general formula (87) above with the amino, hydroxyl or mercapto group of the compound selected from the compounds (CA) and (f) can be prepared according to the reaction method (1) described above. At this time, the reactions such as those represented by the following general formula (105) (reaction of reaction product (js-z) and compound (c)), the following general formula (106) (reaction of reaction product (js-z) and compound (d)) and the general formula (107) (reaction of reaction product (js-z) and compound (e)) progress. When the compound (CA) has a plurality of functional groups reactive with isocyanate group, a mixture containing compounds of which one of the reactive functional groups is bound to the isocyanate group of reaction product (js-z) is obtained. For example, if a compound having hydroxyl and mercapto groups, such as those represented by general formulae (55) and (56) above, is used, a mixture of reaction products is prepared in the following general formulae (106) and (107).

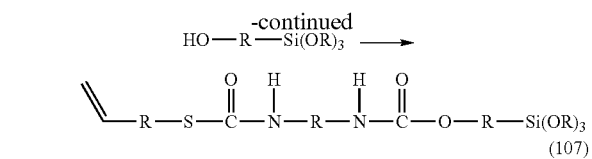

The reaction product (j-8) in the reaction of the mercapto group of a thiol compound represented by general formula (84) above with the α,β-unsaturated carbonyl group of compound (i) can be prepared according to the reaction method (1) described above. At this time, the reaction represented by the following general formula (108) progresses.

The reaction product (j-9) in the reaction of the mercapto group of a thiol compound represented by general formula (84) above with the epoxy group of compound (h) can be prepared according to the reaction method (1) described above. Generally, a reaction accompanied with ring opening of an epoxy group gives two products, depending on the direction of the ring opening. Specifically, the reaction represented by the following general formula (109) progresses.

The reaction product (j-10) in the reaction of the amino group of an amine compound represented by general formula (85) above with the isocyanate or isothiocyanate group of compound (CC) can be prepared according to the reaction method (1) described above. At this time, the reaction represented by the following general formula (110) progresses.

The reaction product (jn-z) represented by general formula (88) above in the reaction of the amino group of an amine compound represented by general formula (85) above with the isocyanate group of compound (z) can be prepared according to the reaction method (1) described above. At this time, the reaction represented by the following general formula (111) progresses.

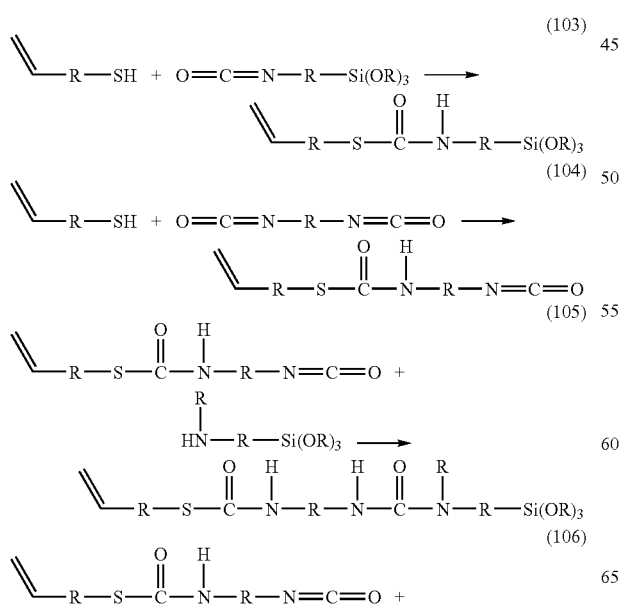

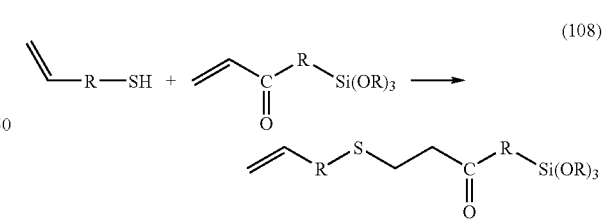

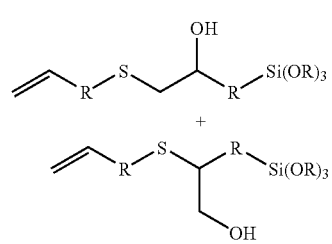

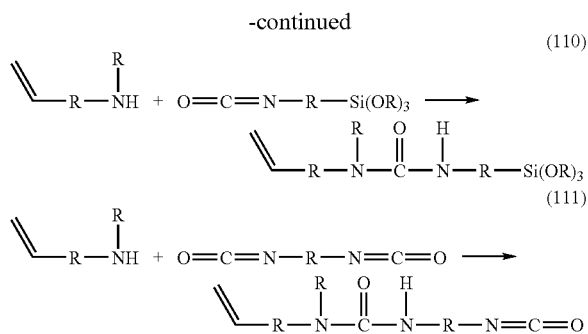

(110)

(111)

The reaction product (j-11) in the reaction of the isocyanate group of a reaction product (jn-z) represented by general formula (88) with the amino, hydroxyl or mercapto group of the compound selected from the compounds (CA) and (f) can be prepared according to the reaction method (1) described above. At this time, the reactions such as those represented by the following general formula (112) (reaction of reaction product (jn-z) and compound (c)), the following general formula (113) (reaction of reaction product (jn-z) and compound (d)), and the following general formula (114) (reaction of reaction product (jn-z) and compound (e)) progress. When the compound (CA) has a plurality of functional groups reactive with isocyanate groups, a mixture containing compounds of which one of the reactive functional groups is bound to the isocyanate group of reaction product (jn-z) is obtained. For example, if a compound having hydroxyl and mercapto groups is used, a mixture of reaction products is prepared in the following general formulae (113) and (114).

The reaction product (j-12) in the reaction of the amino group of an amine compound represented by general formula (85) above with the α,β-unsaturated carbonyl group of compound (i) can be prepared according to the reaction method (1) described above. At this time, the reaction represented by the following general formula (115) progresses.

The reaction product (j-13) in the reaction of the amino group of an amine compound represented by general formula (85) above with the epoxy group of compound (h) can be prepared according to the reaction method (1) described above. Generally, a reaction accompanied with ring opening of an epoxy group gives two products, depending on the direction of the ring opening. Specifically, the reaction represented by the following general formula (116) or the like progresses.

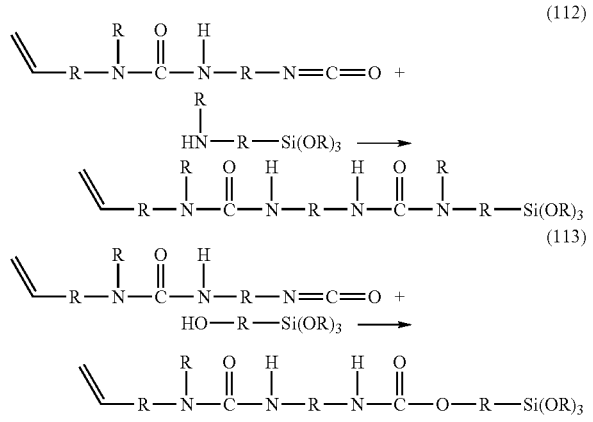

(112)

(113)

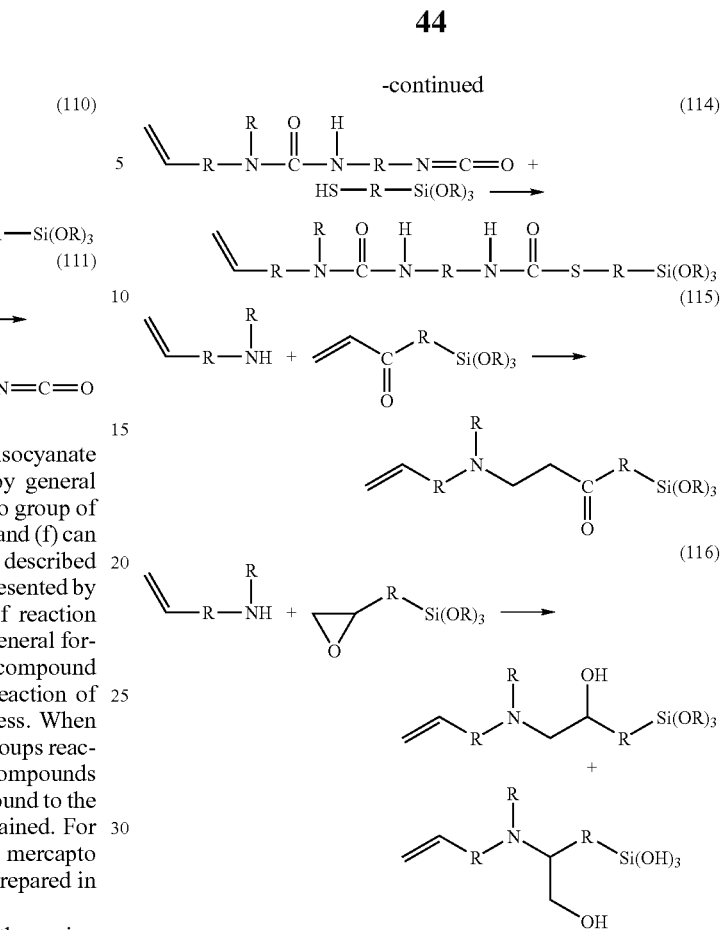

(114)

(115)

(116)

The alkenylsilane compounds (j) include compounds having a silicon-containing functional group, a polar component part and an alkenyl group in the molecule. Such compounds are available as commercial products. Examples of the commercial products include, but are not limited to, products manufactured by Shin-Etsu Chemical (trade name: KBM576, X-12-575, X-12-577, X-12-563B and X-12-565) and the like.

[Aminosilane Compound (k-1)]

The aminosilane compound (k-1), that is a raw material for the aminosilane compound (c), has at least one silicon-containing functional group and at least one primary amino group in the molecule. Typical examples thereof include, but are not limited to, γ-aminopropyltrimethoxysilane, γ-aminopropylmethyldimethoxysilane, γ-aminopropyltriethoxysilane, γ-aminopropylmethyldiethoxysilane, aminophenyltrimethoxysilane, 4-amino-3-dimethylbutyltrimethoxysilane, 4-amino-3-dimethylbutylmethyldimethoxysilane, 4-amino-3-dimethylbutyltriethoxysilane, 4-amino-3-dimethylbutylmethyldiethoxysilane and the like. These compounds are available as commercial products. Among the compounds above, γ-aminopropyltrimethoxysilane, γ-aminopropylmethyldimethoxysilane, γ-aminopropyltriethoxysilane and 4-amino-3-dimethylbutyltrimethoxysilane are preferable, from the points of reactivity and availability.

[Aminosilane Compound (k-2)]

The aminosilane compound (k-2), that is a raw material for the aminosilane compound (c), has at least one silicon-containing functional group, at least one primary amino group, and at least one secondary amino group in the molecule. Typical examples thereof include, but are not limited to, N-β-(aminoethyl)-γ-aminopropyltrimethoxysilane, N-β-(aminoethyl)-γ-aminopropyltriethoxysilane, N-β-(aminoethyl)-γ- aminopropylmethyldimethoxysilane, N-β-(aminoethyl)-γ-aminopropylmethyldiethoxysilane, N-3-[amino(dipropyleneoxy)]aminopropyltrimethoxysilane, (aminoethylaminomethyl)phenethyltrimethoxysilane, N-(6-aminohexyl)aminopropyltrimethoxysilane, N-(2-aminoethyl)-11-aminoundecyltrimethoxysilane and the like. These compounds are available as commercial products. Among the compounds above, N-β-(aminoethyl)-γ-aminopropyltrimethoxysilane, N-β-(aminoethyl)-γ-aminopropyltriethoxysilane and N-β-(aminoethyl)-γ-aminopropylmethyldimethoxysilane are preferable, from the points of reactivity and availability.

[α,β-Unsaturated Carbonyl Compound (l)]

This compound (l) is a compound having at least one α,β-unsaturated carbonyl group in the molecule, and it includes compounds which are grossly grouped into (meth)acrylic acid compounds, vinylcarbonyl compounds, maleic acid compounds and maleimide compounds.

Examples of the (meth)acrylic acid compounds include (meth)acrylic acid, methyl(meth)acrylate, ethyl(meth)acrylate, propyl(meth)acrylate, isopropyl(meth)acrylate, butyl(meth)acrylate, isobutyl(meth)acrylate, t-butyl(meth)acrylate, pentyl(meth)acrylate, amyl(meth)acrylate, isoamyl(meth)acrylate, hexyl(meth)acrylate, heptyl(meth)acrylate, octyl(meth)acrylate, 2-ethylhexyl acrylate, nonyl(meth)acrylate, decyl(meth)acrylate, isodecyl(meth)acrylate, undecyl(meth)acrylate, dodecyl(meth)acrylate, lauryl(meth)acrylate, octadecyl(meth)acrylate, stearyl(meth)acrylate, tetrahydrofurfuryl(meth)acrylate, butoxyethyl(meth)acrylate, ethoxydiethylene glycol(meth)acrylate, benzyl(meth)acrylate, cyclohexyl(meth)acrylate, phenoxyethyl(meth)acrylate, polyethylene glycol(meth)acrylate, polypropylene glycol(meth)acrylate, methoxyethylene glycol(meth)acrylate, ethoxyethylene glycol(meth)acrylate, methoxypolyethylene glycol(meth)acrylate, methoxypolypropylene glycol(meth)acrylate, dicyclopentadienyl(meth)acrylate, dicyclopentanyl(meth)acrylate, dicyclopentenyl(meth)acrylate, tricyclodecanyl(meth)acrylate, bornyl(meth)acrylate, isobornyl(meth)acrylate, diacetone(meth)acrylate, isobutoxymethyl(meth)acrylate, dimethylaminoethyl(meth)acrylate, diethylaminoethyl(meth)acrylate, 7-amino-3,7-dimethyloctyl(meth)acrylate, glycidyl(meth)acrylate, (meth)acrylamide, N,N-dimethyl(meth)acrylamide, N-t-octyl(meth)acrylamide, N-isopropyl(meth)acrylamide, N-methylol(meth)acrylamide, diacetone(meth)acrylamide, N,N-dimethyl(meth)acrylamide, N,N-diethyl(meth)acrylamide, N-[3-(dimethylamino)propyl]methacrylamide, (meth)acryloylmorpholine, 2-(meth)acryloyloxyethyl succinate, maleic acid, 2-(meth)acryloyloxyethyl maleate, 2-(meth)acryloyloxyethyl phthalate, 2-(meth)acryloyloxyethyl hexahydrophthalate, γ-methacryloxypropyltrimethoxysilane, γ-methacryloxypropyltriethoxysilane, γ-methacryloxymethyldimethoxysilane, γ-methacryloxymethyldiethoxysilane, γ-acryloxypropyltrimethoxysilane, γ-acryloxymethyldimethoxysilane and the like.

Examples of the vinylcarbonyl compounds include vinylacetone, vinylethylketone, vinylbutylketone, mesityl oxide, acrolein, methacrolein, cinnamyl compounds, crotonaldehyde and the like.

Examples of the maleic acid compounds include maleic acid, itaconic acid, crotonic acid, dimethyl maleate, diethyl maleate, dibutyl maleate, di-2-ethylhexyl maleate, dioctyl maleate and the like.

Examples of the maleimide compounds include N-phenylmaleimide, N-cyclohexylmaleimide, hydroxyphenylmonomaleimide, N-laurylmaleimide, diethylphenylmonomaleimide, p-hydroxyphenylmaleimide, N-(2-chlorophenyl)maleimide and the like.

In addition, the compounds belonging to the compound (l) other than the compounds above include compounds containing a fluorine, sulfur or phosphorus atom inside, and polymerizable alkenyl compounds containing one of the polar components. Examples of the fluorine atom-containing compounds include perfluorooctylethyl(meth)acrylate, trifluoroethyl (meth)acrylate and the like; and examples of the phosphorus atom-containing compounds include (meth)acryloxyethylphenyl acid phosphate and the like.

Among the compounds above, methyl acrylate, ethyl acrylate, propyl acrylate, butyl acrylate, t-butyl acrylate, octyl acrylate, 2-ethylhexyl acrylate, lauryl acrylate, dimethyl maleate, diethyl maleate, dibutyl maleate, di-2-ethylhexyl maleate, N-phenylmaleimide, N-cyclohexylmaleimide and the like are preferable as the compound (l), from the points of reactivity and availability. Among them, methyl acrylate and ethyl acrylate are particularly preferable for improvement in fast curing ability, while 2-ethylhexyl acrylate and lauryl acrylate are particularly preferable for improvement in flexibility. In addition, the compounds (l) may be used in combination of two or more.

[Acrylonitrile Compound (l-1)]

Typical examples of the compound (l-1) include, but are not limited to, acrylonitrile, α-methylacrylonitrile, 2,4-dicyanobutene and the like.

[Isocyanate Compound (m)]

The compound (m) above is a compound having at least one isocyanate group in the molecule, and typical examples thereof include, but are not limited to, ethyl isocyanate, n-hexyl isocyanate, n-dodecyl isocyanate, p-toluenesulfonyl isocyanate, n-octadecyl isocyanate, phenyl isocyanate, benzyl isocyanate, 2-methoxyphenyl isocyanate, as well as isocyanatosilanes such as γ-isocyanatopropyltrimethoxysilane and the like.

[Amine Compounds (n-1)]

The compound (n-1) is a compound having at least one primary amino group in the molecule, and typical examples thereof include, but are not limited to, aniline, o-toluidine, m-toluidine, p-toluidine, 2,3-xylidine, 2,4-xylidine, mesitylamine, methylamine, ethylamine, propylamine, isopropylamine, n-butylamine, s-butylamine, t-butylamine, pentylamine, n-hexylamine, cyclohexylamine, benzylamine, 2-ethylhexylamine, octylamine, phenethylamine, dodecylamine, stearylamine, γ-aminopropyltrimethoxysilane, γ-aminopropylmethyldimethoxysilane, γ-aminopropyltriethoxysilane, γ-aminopropylmethyldiethoxysilane, aminophenyltrimethoxysilane, 4-amino-3-dimethylbutyltrimethoxysilane, 4-amino-3-dimethylbutylmethyldimethoxysilane, 4-amino-3-dimethylbutyltriethoxysilane, 4-amino-3-dimethylbutylmethyldiethoxysilane and the like.

[Amine Compounds (n-2)]

The compound (n-2) is an amine compound having at least one secondary amino group in the molecule, and examples thereof include the compounds represented by the following general formulae (124) and (125).

(124)

-continued

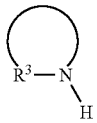
(125)

(wherein $R^3$ and $R^{24}$ are the groups specified above. $R^{25}$ is a group represented by one of general formula (37) to (38) described above or an organic group having a molecular weight of 1,000 or less, and may contain the silicon-containing functional group described above. $R^{24}$ and $R^{25}$ may be the same as each other.)

Typical examples of the compound (n-2) include, but are not limited to, piperidine, N-methylaniline, N-ethylaniline, N-propylaniline, N-butylaniline, N-pentylaniline, benzylmethylamine, dimethylamine, diethylamine, dipropylamine, diisopropylamine, di(n-butyl)amine, di(s-butyl)amine, di(t-butyl)amine, dipentylamine, di(n-hexyl)amine, dicyclohexylamine, dibenzylamine, di(2-ethylhexyl)amine, dioctylamine, diphenethylamine, didodecylamine, distearylamine, N-phenyl-aminopropyltrimethoxysilane, N-ethyl-aminoisobutyltrimethoxysilane, N-(n-butyl)-3-aminopropyltrimethoxysilane and the like.

[Thiol Compound (o)]

The compound (o) is a thiol compound having at least one mercapto group in the molecule, and examples thereof include the compounds represented by the following general formula (126).

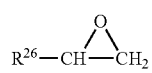
(126)

(wherein $R^{24}$ is the group specified above.)

Typical examples of the compounds (o) include, but are not limited to, methanethiol, ethanethiol, propanethiol, isopropanethiol, n-butanethiol, s-butanethiol, t-butanethiol, pentanethiol, hexanethiol, 2-ethylhexanethiol, octanethiol, decanethiol, dodecanethiol, thiophenol, γ-mercaptopropyltrimethoxysilane, γ-mercaptopropylmethyldimethoxysilane, γ-mercaptopropyltriethoxysilane, γ-mercaptopropylmethyldiethoxysilane and the like.

[Epoxy Compound (p)]

The compound (p) is an epoxy compound having at least one epoxy group in the molecule, and examples thereof include the compounds represented by the following general formula (127).

$$R^{26}-CH-CH_2 \atop \diagdown O \diagup \qquad (127)$$

(wherein $R^{26}$ represents a hydrogen atom or an organic group having a molecular weight of 1,000 or less, and may contain the silicon-containing functional group described above.)

Typical examples of the compounds (p) include, but are not limited to, ethylene oxide, propylene oxide, butylene oxide, hexylene oxide, cylcohexene oxide, β-(3,4-epoxycyclohexyl)ethyltrimethoxysilane, allyl glycidyl ether, p-t-butylphenol monoglycidyl ether, neopentyl alcohol monoglycidyl ether, monoglycidyl ether derivatives of an alkyl alcohol having an alkyl group of 1 to 12 carbon atoms, 3-vinylcyclcohexene oxide, 1,6-hexanediol diglycidyl ether, epichlorohydrin, β-methylepichlorohydrin, glycidol, γ-glycidoxypropyltrimethoxysilane, γ-glycidoxypropylmethyldimethoxysilane, γ-glycidoxypropyltriethoxysilane, γ-glycidoxypropylmethyldiethoxysilane and the compounds (h).

[Hydroxyl Group-containing α,β-Unsaturated Carbonyl Compound (q)]

The compound (q) is a hydroxyl group-containing α,β-unsaturated carbonyl compound having at least one hydroxyl group and at least one α,β-unsaturated carbonyl group in the molecule, and examples thereof include the compounds represented by the following general formulae (128) and (129).

(128)

(129)

(wherein $R^2$, $R^4$, $R^5$ and $R^{22}$ are respectively the groups specified above.)

Typical examples of the compounds (q) include, but are not limited to, hydroxy group-containing (meth)acrylates such as 4-hydroxybutyl(meth)acrylate, 2-hydroxyethyl(meth)acrylate, 2-hydroxypropyl(meth)acrylate, N-methylol acrylamide and the like.

[Polymerizable Alkenyl Compound (s)]

The compound (s) is a polymerizable alkenyl compound having at least one polymerizable alkenyl group and an epoxy group in the molecule, and examples thereof include the compounds represented by general formula (81) above.

[Polymerizable Alkenyl Compound (t)]

The compound (t) is a polymerizable alkenyl compound having at least one polymerizable alkenyl group in the molecule, and examples thereof include the compounds represented by the following general formula (135).

(135)

(wherein $R^2$, $R^4$ and $R^5$ are the groups specified above, and $R^{27}$ represents an organic group having a molecular weight of 1,000 or less.)

When $R^{27}$ in general formula (135) above is a group represented by the following general formula (136), the compound, which is an acrylic acid compound commonly used in polymerization reaction, is suitable in the present invention.

(136)

(wherein $R^2$, $R^3$ and $R^4$ are respectively the groups specified above, and $R^{28}$ represents an organic group having a molecular weight of 1,000 or less.)

Typical examples of the compounds (t) include, but are not limited to, acrylic acid, methacrylic acid, (hereinafter, an acrylic acid compound and a methacrylic acid compound are jointly called (meth)acrylic acid), methyl(meth)acrylate, ethyl(meth)acrylate, propyl(meth)acrylate, isopropyl(meth) acrylate, butyl(meth)acrylate, isobutyl(meth)acrylate, t-butyl (meth)acrylate, pentyl(meth)acrylate, amyl(meth)acrylate, isoamyl(meth)acrylate, hexyl(meth)acrylate, heptyl(meth) acrylate, octyl(meth)acrylate, 2-ethylhexyl acrylate, nonyl (meth)acrylate, decyl(meth)acrylate, isodecyl(meth)acrylate, undecyl(meth)acrylate, dodecyl(meth)acrylate, lauryl (meth)acrylate, octadecyl(meth)acrylate, stearyl(meth) acrylate, tetrahydrofurfuryl(meth)acrylate, butoxyethyl (meth)acrylate, ethoxydiethylene glycol(meth)acrylate, benzyl(meth)acrylate, cyclohexyl(meth)acrylate, phenoxyethyl(meth)acrylate, polyethylene glycol(meth)acrylate, polypropylene glycol(meth)acrylate, methoxyethylene glycol(meth)acrylate, ethoxyethylene glycol(meth)acrylate, methoxypolyethylene glycol(meth)acrylate, methoxypolypropylene glycol(meth)acrylate, dicyclopentadienyl (meth)acrylate, dicyclopentanyl(meth)acrylate, dicyclopentenyl(meth)acrylate, tricyclodecanyl(meth)acrylate, bornyl (meth)acrylate, isobornyl(meth)acrylate, diacetone(meth) acrylate, isobutoxymethyl(meth)acrylate, dimethylaminoethyl(meth)acrylate, diethylaminoethyl (meth)acrylate, 7-amino-3,7-dimethyloctyl (meth)acrylate, glycidyl(meth)acrylate, (meth)acrylamide, N,N-dimethyl (meth)acrylamide, N-t-octyl(meth)acrylamide, N-isopropyl (meth)acrylamide, N-methylol(meth)acrylamide, diacetone (meth)acrylamide, N,N-dimethyl(meth)acrylamide, N,N-diethyl(meth)acrylamide, N-[3-(dimethylamino)propyl] methacrylamide, (meth)acryloylmorpholine, acrylonitrile, α-methylacrylonitrile, 2,4-dicyanobutene, 2-(meth)acryloyloxyethyl succinate, maleic acid, dimethyl maleate, diethyl maleate, dibutyl maleate, di-2-ethylhexyl maleate, dioctyl maleate, 2-(meth)acryloyloxyethyl maleate, 2-(meth)acryloyloxyethyl phthalate, 2-(meth)acryloyloxyethyl hexahydrophthalate, γ-methacryloxypropyltrimethoxysilane, γ-methacryloxypropyltriethoxysilane, γ-methacryloxymethyldimethoxysilane, γ-methacryloxymethyldiethoxysilane, γ-acryloxypropyltrimethoxysilane, γ-acryloxymethyldimethoxysilane, vinyl glycidyl ether, allyl glycidyl ether, vinylpyrrolidone, vinylcarbazole, styrene, α-methylstyrene, m-methylstyrene, p-methylstyrene, p-ethylstyrene, p-methoxystyrene, divinylbenzene; alkyl vinyl ethers such as methyl vinyl ether; cinnamyl compounds such as methyl cinnamate, ethyl cinnamate, cinnamic acid, cinnamic aldehyde, cinnamyl alcohol and cinnamic acid amide; hydroxy group-containing (meth)acrylates such as 2-hydroxyethyl(meth) acrylate, 2-hydroxypropyl(meth)acrylate, 2-acryloyloxypropyl(meth)acrylate and N-methylol acrylamide; allyl alcohol, allylphenol, eugenol, hydroxystyrene, 3-methyl-1-butyn-3-ol, 3-methyl-1-pentyn-3-ol, 3,5-dimethyl-1-hexyn-3-ol, propargyl alcohol, 2-methyl-3-butyn-2-ol, undecylenoic acid, 2-butenoic acid, furfuryl alcohol, 9-decenol-1,5-hexen-1-ol, 2-hydroxyethyl vinyl ether, 4-hydroxybutyl vinyl ether, diethylene glycol monobutyl ether, mesityl oxide, vinyl chloride, vinyl acetate, vinyl propionate, butadiene, isoprene, chloroprene, ethylene, other olefins, unsaturated esters, halogenated olefins, allylamine compounds, allylmercaptan compounds, furfurylmercaptan compounds, the compound (i), the compounds (j), the compounds (l), the compounds (l-1), the compounds (q) and the like.

[Glycidol Compound (u)]

The compound (u) is a glycidol compound having at least one hydroxyl group and at least one epoxy group in the molecule, and examples thereof include the compounds represented by the following general formula (134).

(wherein $R^{23}$ is the group specified above.)

Typical examples of the compounds (u) include, but are not limited to, glycidol, diglycerol diglycidylether, 4-hydroxy-3-methoxycyclohexylethylene oxide and the like.

[Polymercapto Compound (v)]

The compound (v) is a polymercapto compound having two or more mercapto groups in the molecule, and examples thereof include the compounds represented by the following general formula (133).

(wherein $R^{23}$ is the group specified above.)

Typical examples of the compounds (v) include, but are not limited to, 1,2-ethanedithiol, 1,2-propanedithiol, 1,3-propanedithiol, 1,2-butanedithiol, 1,3-butanedithiol, 2,3-butanedithiol, 1,4-butanedithiol, 2,5-dimercapto-1,3,4-thiadiazole, dimercaptobenzene, dimercaptotoluene, dimercaptoxylene, 1,5-dimercapto-3-thiapentane, 1,8-dimercapto-3,6-dioxaoctane, dimercaptonaphthalene, (±)-dithiothreitol, dithioerythritol, 1,4-butanediol bis(3-mercaptopropionate), ethylene glycol bis(3-mercaptopropionate), tetraethylene glycol bis(3-mercaptopropionate), trimethylolpropane tris(3-mercaptopropionate), pentaerythritol tetrakis(3-mercaptopropionate), dipentaerythritol hexakis(3-mercaptopropionate) and the like, as well as compounds having a spirane ring skeleton and thiol groups at both terminals. These compounds are available as commercial products and the commercial products may be used.

[Aminothiol Compound (w)]

The compound (w) is an aminothiol compound having at least one amino group and at least one mercapto group in the molecule, and examples thereof include the compounds represented by the following general formula (132).

(wherein $R^{23}$ and $R^{25}$ are respectively the groups specified above.)

Typical examples of the compounds (w) include, but are not limited to, aminomethylthiol, 2-aminoethylthiol, 3-aminopropylthiol, 4-aminobutylthiol, o-aminothiophenol, p-aminothiophenol and the like.

[Alkenyl Isothiocyanate Compound (x)]

The compound (x) is an alkenyl isothiocyanate compound having at least one alkenyl group and at least one isothiocyanate group in the molecule, and examples thereof include the compounds represented by the following general formula (131).

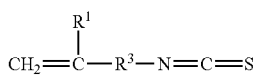

(131)

(wherein $R^1$ and $R^3$ are respectively the groups specified above.)

Typical examples of the compounds (x) include, but are not limited to, allyl isothiocyanate and the like.

[Alkenyl Isocyanate Compound (y)]

The compound (y) is an alkenyl isocyanate compound having at least one alkenyl group and at least one isocyanate group in the molecule, and examples thereof include the compounds represented by the following general formula (130).

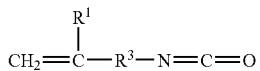

(130)

(wherein $R^1$, $R^3$ and Y are the groups specified above.)

Typical examples of the compounds (y) include, but are not limited to, allyl isocyanate, m-isopropenyl-α,α-dimethylbenzyl isocyanate, 2-methacryloyloxyethyl isocyanate, a product manufactured by Mitsui Takeda Chemicals (trade name: m-TMI), a product manufactured by Showa Denko K.K. (trade name: Karenz MOI) and the like.

[Polyisocyanate Compound (z)]

The compound (z) is a polyisocyanate compound having two or more isocyanate groups in the molecule, and examples thereof include diisocyanate compounds, other polyisocyanate compounds and the like. Examples of the diisocyanate compounds include aliphatic, alicyclic, araliphatic and aromatic diisocyanate compounds and the like. Typical examples thereof are listed below:

Aliphatic diisocyanate compounds: trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl caproate, and the like.

Alicyclic diisocyanate compounds: 1,3-cyclopentene diisocyanate, 1,4-cyclohexane diisocyanate, 1,3-cyclohexane diisocyanate, 3-isocyanatomethyl-3,5,5-trimethylcyclohexyl isocyanate, 4,4'-methylene bis(cyclohexylisocyanate), methyl-2,4-cyclohexane diisocyanate, methyl-2,6-cyclohexane diisocyanate, 1,3-bis(isocyanatomethyl)cyclohexane, 1,4-bis(isocyanatomethyl)cyclohexane, isophorone diisocyanate and the like.

Araliphatic diisocyanate compounds: 1,3- or 1,4-xylylene diisocyanate or the mixture thereof, ω,ω'-diisocyanato-1,4-di ethylbenzene, 1,3- or 1,4-bis(1-isocyanato-1-methylethyl) benzene or the mixture thereof, and the like.

Aromatic diisocyanate compounds: m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, 4,4'-diphenyl ether diisocyanate, and the like.

The polyisocyanate compounds other than diisocyanate compounds include, but are not limited to, aliphatic, alicyclic, araliphatic, aromatic polyisocyanate compounds and the like. Typical examples thereof are listed below:

Aliphatic polyisocyanate compounds: lysine ester triisocyanates, 1,4,8-triisocyanatooctane, 1,6,11-triisocyanatoundecane, 1,8-diisocyanato-4-isocyanatomethyloctane, 1,3,6-triisocyanatohexane, 2,5,7-trimethyl-1,8-diisocyanato-5-isocyanatomethyloctane, and the like.

Alicyclic polyisocyanate compounds: 1,3,5-triisocyanatocyclohexane, 1,3,5-trimethylisocyanatocyclohexane, 3-isocyanato-3,3,5-trimethylcyclohexyl isocyanate, 2-(3-isocyanatopropyl)-2,5-di(isocyanatomethyl)-bicyclo[2,2,1] heptane, 2-(3-isocyanatopropyl)-2,6-di(isocyanatomethyl)-bicyclo[2,2,1]heptane, 5-(2-isocyanatoethyl)-2-isocyanatomethyl-3-(3-isocyanatopropyl)-bicyclo[2,2,1] heptane, 6-(2-isocyanatoethyl)-2-isocyanatomethyl-3-(3-isocyanatopropyl)-bicyclo[2,2,1]heptane, 5-(2-isocyanatoethyl)-2-isocyanatomethyl-2-(3-isocyanatopropyl)-bicyclo[2,2,1]heptane, 6-(2-isocyanatoethyl)-2-(3-isocyanatopropyl)-bicyclo[2,2,1] heptane, and the like.

Araliphatic polyisocyanate compounds: 1,3,5-triisocyanatomethylbenzene, and the like.

Aromatic polyisocyanate compounds: triphenylmethane-4,4',4''-triisocyanate, 1,3,5-triisocyanatobenzene, 2,4,6-triisocyanatotoluene, 4,4'-diphenylmethane-2,2',5,5'-tetraisocyanate, and the like.

Other polyisocyanate compounds: sulfur atom-containing diisocyanates such as phenyl diisothiocyanate, and the like.

[Metal Compound (S-1)]

Examples of the metal compound (S-1) include, but are not limited to, dibutyltin dilaurate, dioctyltin dilaurate, dibutyltin dimalate, dioctyltin dimalate, dibutyltin phthalate, dioctyltin phthalate, stannous octanoate, dibutyltin methoxide, dibutyltin dimethoxide, dioctyltin dimethoxide, dibutyltin diacetylacetate, dioctyltin diacetylacetate, dibutyltin diversatate, dioctyltin diversatate, reaction products of dibutyltin oxide and a phthalic diester, tin compounds such as tin stearate, bismuth compounds, products manufactured by Nitto Kasei (trade name: T-100, U-100, U-130, U-15, U-20, U-200, U-220, U-230, U-28, U-300, U-303, U-317, U-340, U-400, U-50, U-500, U-550, U-600, U-700, U-700ES, U-8, U-800, U-810, U-830, U-ES, U-280, U-350, U-360, U-840, U-850, U-860, and U-870), products manufactured by Sankyo Organic Chemicals (trade name: SCAT-1, SCAT-1W, SCAT-4A, SCAT-7, SCAT-8, SCAT-8B, SCAT-24, SCAT-25, SCAT-27, SCAT-31A, SCAT-32A, SCAT-46A, SCAT-51, SCAT-52A, No. 918, STANN BL, and STANN SNT-1F), products manufactured by Sumika Bayer Urethane (trade name: Desmorapid PA, Desmorapid SO), acetylacetone metal salts (typically, the metal is aluminum or chromium), and the like.

[Amine Compound (S-2)]

Examples of the amine compounds (S-2) include, but are not limited to, aliphatic amines such as ethylenediamine, diethylenetriamine, triethylenetetramine, tetraethylenepentamine, diethylaminopropylamine, hexamethylenediamine, methylpentamethylenediamine, trimethylhexamethylenediamine, guanidine, trimethylamine, triethylamine, tributylamine and oleylamine; alicyclic amines such as menthenediamine, isophoronediamine, norbornanediamine, piperidine, N,N'-dimethylpiperazine, N-aminoethylpiperazine, 1,2-diaminocyclohexane, bis(4-amino-3-methylcyclohexyl)methane, bis(4-amino-methylcyclohexyl)methane, polycyclohexylpolyamine, and 1,8-diazabicyclo[5,4,0]undecene-7 (DBU); aromatic amines such as meta-phenylenediamine and 4,4'-diaminodiphenylsulfone; aliphatic aromatic amines such as m-xylylenediamine, benzyldimethylamine, 2-(dimethylaminomethyl)phenol, and 2,4,6-tris(dimethylaminomethyl)phenol; ether bond-containing amines such as 3,9-bis(3-aminopropyl)-2,4,8,10-tetraoxaspiro[5,5]undecane (ATU), morpholine, N-methylmorpholine, polyoxypropylenediamine, polyoxypropylenetriamine, and polyoxyethylenediamine; hydroxyl group-containing amines such as diethanolamine and triethanolamine; polyamide amines such as polyamides obtained by reacting a dimer acid with a polyamine such as diethylenetriamine or triethylenetetramine, etc., and polyamides obtained by reacting a polycarboxylic acid other than the dimer acid; imidazoles such as 2-ethyl-4-methylimidazole; dicyandiamides; polyoxypropylene amines such as polyoxypropylenediamine and polyoxypropylenetriamine; epoxy-modified amines obtained by reacting an amine as described above with an epoxy compound; modified amines such as Mannich-modified amines obtained by reacting an amine as described above with formalin or phenol, Michael-addition-modified amines, and ketimines; amine salt compounds such as 2,4,6-tris(dimethylaminomethyl)phenol 2-ethylhexanoic acid salt; quaternary ammonium salts such as tetramethylammonium chloride and benzalkonium chloride; products manufactured by Sankyo Aeroproducts such as DABCO (registered trade name) and DABCO BL series products; straight-chain or cyclic tertiary amine salts containing multiple nitrogen atoms, such as 1,8-diazabicyclo[5.4.0]-7-undecene, 1,5-diazabicyclo[4.3.0]-5-nonene, and 1,4-diazabicyclo[2.2.2]octane; aminosilanes such as γ-aminopropyltrimethoxysilane and γ-aminopropyltriethoxysilane; products manufactured by Sumika Bayer Urethane (trade name: Desmorapid DB, Desmorapid PP, Desmorapid PV, Desmorapid 10/9, and Desmorapid LA), and the like.

[Reaction Solvent (S-3)]

Examples of the reaction solvent (S-3) include, but are not limited to, aliphatic hydrocarbons such as hexane and heptane; aromatic hydrocarbons such as benzene, toluene and xylene; alicyclic hydrocarbons such as cyclohexane and cycloheptane; ester compound such as ethyl acetate and butyl acetate; carbonyl compounds such as acetone and methyl ethyl ketone; ether compounds such as diethylether and tetrahydrofuran; alcohol compounds such as methanol, ethanol, propanol and butanol; amide compounds such as dimethylformamide and diethylformamide; sulfoxide compounds such as dimethylsulfoxide and diethylsulfoxide; and the like.

[Radical Initiator (S-4)]

Examples of the radical initiator (S-4) for use include azo compounds such as 2,2'-azobisisobutylonitrile, 2,2'-azobis(2-methylbutylonitrile), 2,2'-azobis(2,4-dimethylvaleronitrile), 2,2'-azobis(2-methyl-4-trimethoxysilylpentanitrile), and 2,2'-azobis(2-methyl-4-methyldimethoxysilylpentanitrile); peroxides such as benzoyl peroxide, t-alkylperoxy esters, acetyl peroxide, diisopropyl peroxycarbonate; and the like.

[Metal Compound (S-5)]

Examples of the metal compound (S-5) include, but are not limited to, platinum compounds such as platinum black, chloroplatinic acid, platinum alcohol compounds, platinum olefin complexes, platinum aldehyde complexes, and platinum ketone complexes; and the like.

[Chain Transfer Agent (S-6)]

Examples of the chain transfer agent (S-6) include, but are not limited to, n-butylmercaptan, ethyl thioglycolate, isopropylmercaptan, t-butylmercaptan, n-octylmercaptan, n-dodecylmercaptan, t-dodecylmercaptan, thiophenol, thio-β-naphthol, γ-mercaptopropyltrimethoxysilane, γ-mercaptopropylmethyldimethoxysilane, γ-trimethoxysilylpropyl disulfide; mercapto compounds such as the compounds (e), the compounds (f) and the compounds (o); aromatic hydrocarbon compounds such as benzene and toluene; disulfide compounds; disulfide group-containing silane-coupling agents; and the like.

[Curable Compound (M)]

The curable compound (M) means a curable compound other than the curable resin (A) according to the present invention, and it is not particularly limited. Specific examples thereof include, but are not limited to, organopolysiloxanes, silicone alkoxy oligomers (e.g., those manufactured by Shin-Etsu Chemical (trade name: KC-89S, KR-500, X-40-9225, X-40-9246, X-40-9250, KR-217, KR-9218, KR-213, KR-510, X-40-9227, X-40-9247, X-41-1053, X-41-1056, X-40-1805, X-40-1810, X-40-2651, X-40-2308 and X-40-9238), silane-coupling agents (e.g., isocyanatosilane and isothiocyanatosilane compounds such as γ-isocyanatopropyltrimethoxysilane, γ-isocyanatopropylmethyldimethoxysilane, γ-isocyanatopropyltriethoxysilane, γ-isocyanatopropylmethyldiethoxysilane, γ-isothiocyanatopropyltrimethoxysilane, γ-isothiocyanatopropylmethyldimethoxysilane, γ-isothiocyanatopropyltriethoxysilane, γ-isothiocyanatopropylmethyldiethoxysilane, and γ-isocyanatopropyltriethoxysilane; aminosilane compounds such as γ-aminopropyltrimethoxysilane, γ-aminopropylmethyldimethoxysilane, γ-aminopropyltriethoxysilane, γ-aminopropylmethyldiethoxysilane, aminophenyltrimethoxysilane, 4-amino-3-dimethylbutyltrimethoxysilane, 4-amino-3-dimethylbutylmethyldimethoxysilane, 4-amino-3-dimethylbutyltriethoxysilane, 4-amino-3-dimethylbutylmethyldiethoxysilane, N-phenyl-γ-aminopropyltrimethoxysilane, N-naphthyl-γ-aminopropyltrimethoxysilane, N-phenyl-γ-aminopropylmethyldimethoxysilane, N-naphthyl-γ-aminopropylmethyldimethoxysilane, N-(n-butyl)-γ-aminopropyltrimethoxysilane, N-(n-butyl)-γ-aminopropylmethyldimethoxysilane, N-ethyl-γ-aminopropyltrimethoxysilane, N-ethyl-γ-aminopropylmethyldimethoxysilane, N-methyl-γ-aminopropyltrimethoxysilane, N-methyl-γ-aminopropylmethyldimethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, N-3-[amino(dipropyleneoxy)]aminopropyltrimethoxysilane, (aminoethylaminomethyl)phenethyltrimethoxysilane, N-(6-aminohexyl)aminopropyltrimethoxysilane, N-(2-aminoethyl)-11-aminoundecyltrimethoxysilane, and bis(trimethoxysilylpropyl)amine; mercaptosilane compounds such as γ-mercaptopropyltrimethoxysilane, γ-mercaptopropylmethyldimethoxysilane, γ-mercaptopropyltriethoxysilane, and γ-mercaptopropylmethyldiethoxysilane; epoxysilanes such as β-(3,4-epoxycyclohexyl)ethyltrimethoxysilane, γ-glycidoxypropyltrimethoxysilane, γ-glycidoxypropylmethyldimethoxysilane, γ-glycidoxypropyltriethoxysilane, and γ-glycidoxypropylmethyldiethoxysilane; acrylsilane compounds such as γ-acryloxypropyltrimethoxysilane, γ-acryloxypropylmethyldimethoxysilane, γ-acryloxypropyltriethoxysilane, and γ-acryloxypropylmethyldiethoxysilane; methacrylsilane compounds such as γ-methacryloxypropyltrimethoxysilane, γ-methacryloxypropylmethyldimethoxysilane, γ-methacryloxypropyltriethoxysilane, and γ-methacryloxypropylmethyldiethoxysilane; vinylsilane compounds such as vinyltrimethoxysilane, vinylmethyldimethoxysilane, vinyltriethoxysilane, vinylmethyldiethoxysilane, and vinyltrichlorosilane; sulfide group-containing silane compounds such as bis(3-trimethoxysilylpropyl)tetrasulfane, bis(3-methyldimethoxysilylpropyl)tetrasulfane, bis(3- triethoxylsilylpropyl)tetrasulfane, bis(3-methyldiethoxysilylpropyl)tetrasulfane, bis(3-trimethoxysilylpropyl)disulfide, bis(3-methyldimethoxysilylpropyl)disulfide, bis(3-triethoxylsilylpropyl)disulfide, and bis(3-methyldiethoxysilylpropyl)disulfide; isocyanuratosilane compounds such as 1,3,5-N-tris(3-trimethoxysilylpropyl)isocyanuratosilane, 1,3,5-N-tris(3-methyldimethoxysilylpropyl)isocyanuratosilane, 1,3,5-N-tris(3-triethoxylsilylpropyl)isocyanuratosilane, and 1,3,5-N-tris(3-methyldiethoxysilylpropyl)isocyanuratosilane; the compound (a), the compound (b), the compound (c), the compound (d), the compound (e), the compound (f), the compound (h), the compound (i), the compound (j), epoxy resins having at least one epoxy group in the molecule, urethane prepolymers having at least one isocyanate group in the molecule, titanium coupling agents, silicate compounds (e.g., methyl silicate, ethyl silicate, a product manufactured by Mitsubishi Chemical Corp. (trade name: MS51)), and the like.

[II. Curing Catalyst (B): Lewis Acid or Its Complex]

The curing catalyst (B), i.e., Lewis acid selected from the group consisting of metal halides and boron halides or the complex thereof, is a reaction catalyst for crosslinking in the reaction of the silicon-containing functional group in the curable resin (A) according to the present invention (hydrolysis of a hydrolytic silyl group with water and condensation of silanol groups), and hardens the curable resin (A) in an extremely short period of time. The catalytic activity is hardly effective when the silicon-containing functional group is a bifunctional group, but is effective when the silicon-containing functional group is a trifunctional group, or when the curable resin (A) has a polar component even though it is a bifunctional group. The catalytic efficiency is greatest when the curable resin (A) has a polar component and the silicon-containing functional group is a trifunctional group, and is next greatest when the silicon-containing functional group is a trifunctional group and has no polar component.

Examples of the Lewis acid include metal halides such as titanium chloride (IV), tin chloride (IV), zirconium chloride (IV), aluminum chloride (III), iron chloride, zinc chloride, copper chloride, antimony chloride, gallium chloride, indium chloride, titanium bromide, tin bromide, zirconium bromide, aluminum bromide, iron bromide, zinc bromide and copper bromide; and boron halides such as boron trifluoride, boron trichloride, boron tribromide and boron triiodide, and the like. Examples of the Lewis acid complexes include, but are not limited to, amine complexes, alcohol complexes and ether complexes. Examples of the amine compounds constituting the amine complex include ammonia, monoethylamine, triethylamine, pyridine, piperidine, aniline, morpholine, cyclohexylamine, n-butylamine, monoethanolamine, diethanolamine, triethanolamine and the like. Examples of the alcohols constituting the alcohol complex include primary alcohols such as methanol, ethanol, propanol and n-butanol; and secondary alcohols such as isopropanol and 2-butanol, and the like. Examples of the ethers constituting the ether complex include dimethyl ether, diethyl ether, n-dibutyl ether and the like. However, the component constituting the complex is not limited thereto. Among the Lewis acid complexes above, $BF_3$ complexes are particularly preferably, from the point of easiness in handling and others.

Use of the Lewis acid or the complex thereof as the curing catalyst results in acceleration of curing, and it is probably because the curing catalyst is easily localized in the vicinity of the silicon-containing functional groups in the curable resin composition. Organic metal compounds such as organic tin compounds are more organic in nature because of the organic group present therein, and distributed relatively uniformly in the curable resin composition because of their affinity to the polymer main chain. In contrast to the organic metal compounds, the Lewis acids and the complexes thereof described above are more inorganic in nature and more compatible with rather inorganic silicon atoms in the curable resin composition, and thus, likely to be localized more closely to the silicon-containing functional groups. For that reason, the Lewis acids are more effective in action, even when the amount thereof used is small.

The catalytic activity on curing of the curable resin (A) seems to be influenced by the acidity of Lewis acid.

The curing catalysts (B), the Lewis acids or the complexes thereof, can be used alone or in combination of two or more. The curing catalyst (B) is preferably used in an amount of preferably 0.001 to 10 parts by weight, particularly 0.01 to 5 parts by weight, with respect to 100 parts by weight of the curable resin (A).

[III. Optional Component: Aminosilane Compound (C)]

The aminosilane compound (C) is a compound having a hydrolytic silyl or silanol group and an amino group in the molecule. The silicon-containing functional group of the curable resin (A) activated by the catalytic action of curing catalyst (B) interacts with and binds to the aminosilane compound (C), so that the aminosilane compound (C) functions as a crosslinking element, with improving the curing efficiency and the adhesiveness of the curable resin (A). It may be an aminosilane compound (c) that is a raw material for the curable resin (A) described above.

Typical examples of the aminosilane compounds (C) include, but are not limited to, γ-aminopropyltrimethoxysilane, γ-aminopropylmethyldimethoxysilane, γ-aminopropyltriethoxysilane, γ-aminopropylmethyldiethoxysilane, aminophenyltrimethoxysilane, 4-amino-3-dimethylbutyltrimethoxysilane, 4-amino-3-dimethylbutylmethyldimethoxysilane, 4-amino-3-dimethylbutyltriethoxysilane, 4-amino-3-dimethylbutylmethyldiethoxysilane, N-phenyl-γ-aminopropyltrimethoxysilane, N-naphthyl-γ-aminopropyltrimethoxysilane, N-phenyl-γ-aminopropylmethyldimethoxysilane, N-naphthyl-γ-aminopropylmethyldimethoxysilane, N-(n-butyl)-γ-aminopropyltrimethoxysilane, N-(n-butyl)-γ-aminopropylmethyldimethoxysilane, N-ethyl-γ-aminopropyltrimethoxysilane, N-ethyl-γ-aminopropylmethyldimethoxysilane, N-methyl-γ-aminopropyltrimethoxysilane, N-methyl-γ-aminopropylmethyldimethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, N-3-[amino(dipropyleneoxy)]aminopropyltrimethoxysilane, (aminoethylaminomethyl)phenethyltrimethoxysilane, N-(6-aminohexyl)aminopropyltrimethoxysilane, N-(2-aminoethyl)-11-aminoundecyltrimethoxysilane, bis(trimethoxysilylpropyl)amine, and the like.

The amount of the aminosilane compound (C) blended is not particularly limited, but preferably 0.1 to 20 parts by weight, particularly preferably 1 to 10 parts by weight, with respect to 100 parts by weight of the curable resin (A).

[IV. Optional Component: Second Curing Catalyst (D)]

The second curing catalyst (D) is a curing catalyst used in combination with the curing catalyst (B) that is a Lewis acid or the complex thereof. The second curing catalysts (D) include organic tin compounds and other organic metal compounds, bases such as amines, and acids such as carboxylic acid compounds and organic phosphoric acid compounds. Water (moisture) in air also functions as a catalyst.

Examples of the organic tin compounds include, but are not limited to, dibutyltin dilaurate, dioctyltin dilaurate, dibutyltin dimalate, dioctyltin dimalate, dibutyltin phthalate, dioctyltin phthalate, stannous octanoate, dibutyltin methoxide, dibutyltin dimethoxide, dioctyltin dimethoxide, dibutyltin diacetylacetate, dioctyltin diacetylacetate, dibutyltin diversatate, dioctyltin diversatate, reaction products from dibutyltin oxide and a phthalic diester, tin stearate and the like. Among the organic tin compounds above, dioctyltin compounds are particularly preferable, from the point of the curing speed of curable resin. In addition, the dioctyltin compounds are known to be more stable than dibutyltin compounds commonly used and have fewer problems in danger and health hazard. In addition to the tin compounds exemplified above, the dioctyltin compounds include the compounds represented by the following general formulae (131') and (133') wherein $R^{30}$ is an octyl group; and the compounds wherein u is an integer of 0 to 5 is particularly useful.

The following general formula (131') represents an organic tin compound usable as the second curing catalyst (D), and specifically shows a poly(dialkylstanoxane) dicarboxylate.

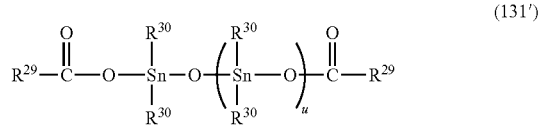

(131')

(wherein, $R^{29}$ and $R^{30}$ each represent a substituted or unsubstituted hydrocarbon group having 1 to 12 carbon atoms; u represents an integer of 1 or more; and $R^{29}$ and $R^{30}$ may be the same as or different from each other.)

Examples of the hydrocarbon groups represented by $R^{29}$ or $R^{30}$ include straight-chain or branched straight-chain alkyl groups such as methyl, ethyl, propyl, isopropyl, butyl, isobutyl, s-butyl, t-butyl, pentyl, hexyl, heptyl, octyl, 2-ethylhexyl, decyl and lauryl; substituted or unsubstituted phenyl groups; and the like. The u is an integer of 1 or more, but preferably an integer of 1 to 3.

Typical examples of the poly(dialkylstanoxane) dicarboxylates represented by general formula (131') include, tetraalkyl distanoxane dicarboxylates such as 1,1,3,3-tetramethyl-1,3-bis(acetoxy)distanoxane, 1,1,3,3-tetramethyl-1,3-bis(butyryloxy)distanoxane, 1,1,3,3-tetramethyl-1,3-bis(octanoyloxy)distanoxane, 1,1,3,3-tetramethyl-1,3-bis(2-ethylhexanoyloxy)distanoxane, 1,1,3,3-tetramethyl-1,3-bis(lauroyloxy)distanoxane, 1,1,3,3-tetrabutyl-1,3-bis(acetoxy)distanoxane, 1,1,3,3-tetrabutyl-1,3-bis(butyryloxy)distanoxane, 1,1,3,3-tetrabutyl-1,3-bis(octanoyloxy)distanoxane, 1,1,3,3-tetrabutyl-1,3-bis(2-ethylhexanoyloxy)distanoxane, 1,1,3,3-tetrabutyl-1,3-bis(lauroyloxy)distanoxane, 1,1,3,3-tetraoctyl-1,3-bis(acetoxy)distanoxane, 1,1,3,3-tetraoctyl-1,3-bis(butyryloxy)distanoxane, 1,1,3,3-tetraoctyl-1,3-bis(octanoyloxy)distanoxane, 1,1,3,3-tetraoctyl-1,3-bis(2-ethylhexanoyloxy)distanoxane, 1,1,3,3-tetraoctyl-1,3-bis(lauroyloxy)distanoxane, 1,1,3,3-tetralauryl-1,3-bis(acetoxy)distanoxane, 1,1,3,3-tetralauryl-1,3-bis(butyryloxy)distanoxane, 1,1,3,3-tetralauryl-1,3-bis(octanoyloxy)distanoxane, 1,1,3,3-tetralauryl-1,3-bis(2-ethylhexanoyloxy)distanoxane, and 1,1,3,3-tetralauryl-1,3-bis(lauroyloxy)distanoxane; hexaalkyl tristanoxane dicarboxylates such as 1,1,3,3,5,5-hexamethyl-1,5-bis(acetoxy)tristanoxane, 1,1,3,3,5,5-hexamethyl-1,5-bis(butyryloxy)tristanoxane, 1,1,3,3,5,5-hexamethyl-1,5-bis(octanoyloxy)tristanoxane, 1,1,3,3,5,5-hexamethyl-1,5-bis(2-ethylhexanoyloxy)tristanoxane, 1,1,3,3,5,5-hexamethyl-1,5-bis(lauroyloxy)tristanoxane, 1,1,3,3,5,5-hexabutyl-1,5-bis(acetoxy)tristanoxane, 1,1,3,3,5,5-hexabutyl-1,5-bis(butyryloxy)tristanoxane, 1,1,3,3,5,5-hexabutyl-1,5-bis(octanoyloxy)tristanoxane, 1,1,3,3,5,5-hexabutyl-1,5-bis(2-ethylhexanoyloxy)tristanoxane, 1,1,3,3,5,5-hexabutyl-1,5-bis(lauroyloxy)tristanoxane, 1,1,3,3,5,5-hexalauryl-1,5-bis(acetoxy)tristanoxane, 1,1,3,3,5,5-hexalauryl-1,5-bis(butyryloxy)tristanoxane, 1,1,3,3,5,5-hexalauryl-1,5-bis(octanoyloxy)tristanoxane, 1,1,3,3,5,5-hexalauryl-1,5-bis(2-ethylhexanoyloxy)tristanoxane, and 1,1,3,3,5,5-hexalauryl-1,5-bis(lauroyloxy)tristanoxane; and the like.

In addition, poly(dialkylstanoxane) disilicate compounds, that are reaction products of a poly(dialkylstanoxane) dicarboxylate represented by general formula (131') with a silicate compound represented by the following general formula (132'), are also usable as the second curing catalyst (D).

(132')

(wherein $R^{31}$ and $R^{32}$ each represent an alkyl group having 1 to 4 carbons; v represents an integer of 0 to 3; $R^{31}$ and $R^{32}$ may be the same as or different from each other; and a plurality of groups for each of $R^{31}$ and $R^{32}$, if present, may be the same as or different from each other respectively.)

Typical examples of the alkyl groups, $R^{31}$ and $R^{32}$, in general formula (132') include methyl, ethyl, propyl, isopropyl, butyl, isobutyl, s-butyl and t-butyl. Typical examples of the silicate compound represented by general formula (132') for use include tetraalkoxysilanes such as tetramethoxysilane, tetraethoxysilane, tetrapropoxysilane, tetraisopropoxysilane and tetrabutoxysilane; trialkoxymonoalkylsilanes such as triethoxymethylsilane, triethoxyethylsilane, triethoxypropylsilane, triethoxyisopropylsilane and triethoxybutylsilane; dialkoxydialkylsilanes such as diethoxydimethylsilane, diethoxydiethylsilane, diethoxydipropylsilane, diethoxydiisopropylsilane and diethoxydibutylsilane; monoalkoxytrialkylsilanes such as ethoxytrimethylsilane, ethoxytriethylsilane, ethoxytripropylsilane, ethoxytriisopropylsilane and ethoxytributylsilane; and the like. Hydrolysates of these alkoxysilanes can also be used similarly.

The reaction products from a poly(dialkylstanoxane) dicarboxylate represented by general formula (131') above and a silicate compound represented by general formula (132') above or the hydrolysate thereof can be obtained by heating the mixture at 100 to 130° C. approximately for 1 to 3 hours and distilling the resulting carboxylic ester under reduced pressure. It is preferable then to perform the reaction at a ratio of 1 equivalence or more of alkoxy group with respect to 1 equivalence of carboxyl group and eliminate residual carboxyl group completely. Residual carboxyl group may deteriorate catalytic activity. The reaction may be performed in the presence or absence of a solvent, but is normally preferred to carry out in the absence of solvent. Typical examples of the reaction products, poly(dialkylstanoxane) disilicate compounds, include the compounds represented by the following general formula (133').

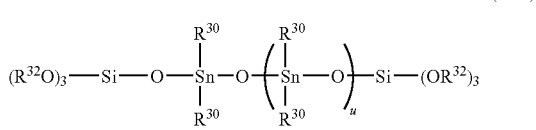

(133')

(wherein $R^{30}$, $R^{32}$ and u are the same as the groups and numerical value specified above.)

The organic tin compounds are available as commercial products, and these products may be used. Examples of the commercial products include, but are not limited to, products manufactured by Nitto Kasei (trade name: T-100, U-100, U-130, U-15, U-20, U-200, U-220, U-230, U-28, U-300, U-303, U-317, U-340, U-400, U-50, U-500, U-550, U-700, U-700ES, U-8, U-800, U-810, U-830, U-ES, U-280, U-350, U-360, U-840, U-850, U-860 and U-870), products manufactured by Sankyo Organic Chemicals (trade name: SCAT-1, SCAT-1W, SCAT-4A, SCAT-7, SCAT-8, SCAT-8B, SCAT-24, SCAT-25, SCAT-27, SCAT-31A, SCAT-32A, SCAT-46A, SCAT-51, SCAT-52A, No. 918, STANN BL, and STANN SNT-1F), products manufactured by Sumika Bayer Urethane (trade name: Desmorapid PA and Desmorapid SO), and the like.

Examples of the organic metal compounds usable as the second curing catalyst (D) other than the organic tin compounds include, but are not limited to, bismuth compounds corresponding to the organic tin compounds above wherein tin is replaced with bismuth; titanate compounds such as tetrabutyl titanate, tetraisopropyl titanate and triethanolamine titanate; carboxylic acid metal salts such as lead octanoate, lead naphthenate, nickel naphthenate, lithium naphthenate, and cobalt naphthenate; metal acetylacetonate complexes such as aluminum acetylacetonate complex, and vanadium acetylacetonate complex; products manufactured by Nitto Kasei (trade name: U-600 and U-660); and the like.

Examples of the amines usable as the second curing catalyst (D) include, but are not limited to, aminosilane compounds such as γ-aminopropyltrimethoxysilane, γ-aminopropylmethyldimethoxysilane, γ-aminopropyltriethoxysilane, γ-aminopropylmethyldiethoxysilane, aminophenyltrimethoxysilane, 4-amino-3-dimethylbutyltrimethoxysilane, 4-amino-3-dimethylbutylmethyldimethoxysilane, 4-amino-3-dimethylbutyltriethoxysilane, 4-amino-3-dimethylbutylmethyldiethoxysilane, N-phenyl-γ-aminopropyltrimethoxysilane, N-naphthyl-γ-aminopropyltrimethoxysilane, N-phenyl-γ-aminopropylmethyldimethoxysilane, N-naphthyl-γ-aminopropylmethyldimethoxysilane, N-(n-butyl)-γ-aminopropyltrimethoxysilane, N-(n-butyl)-γ-aminopropylmethyldimethoxysilane, N-ethyl-γ-aminopropyltrimethoxysilane, N-ethyl-γ-aminopropylmethyldimethoxysilane, N-methyl-γ-aminopropyltrimethoxysilane, N-methyl-γ-aminopropylmethyldimethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, N-3-[amino(dipropyleneoxy)]aminopropyltrimethoxysilane, (aminoethylaminomethyl)phenethyltrimethoxysilane, N-(6-aminohexyl)aminopropyltrimethoxysilane, N-(2-aminoethyl)-11-aminoundecyltrimethoxysilane, and bis(trimethoxysilylpropyl)amine; aliphatic amines such as ethylenediamine, diethylenetriamine, triethylenetetramine, tetraethylenepentamine, diethylaminopropylamine, hexamethylenediamine, methylpentamethylenediamine, trimethylhexamethylenediamine, guanidine, trimethylamine, triethylamine, tributylamine, and oleylamine; alicyclic amines such as menthenediamine, isophoronediamine, norbornanediamine, piperidine, N,N'-dimethylpiperazine, N-aminoethylpiperazine, 1,2-diaminocyclohexane, bis(4-amino-3-methylcyclohexyl)methane, bis(4-amino-methylcyclohexyl)methane, polycyclohexylpolyamine, and 1,8-diazabicyclo[5,4,0]undecene-7 (DBU); aromatic amines such as meta-phenylenediamine and 4,4'-diaminodiphenylsulfone; aliphatic aromatic amines such as m-xylylenediamine, benzyldimethylamine, 2-(dimethylaminomethyl)phenol, and 2,4,6-tris(dimethylaminomethyl)phenol; ether bond-containing amines such as 3,9-bis(3-aminopropyl)-2,4,8,10-tetraoxaspiro[5,5]undecane (ATU), morpholine, N-methylmorpholine, polyoxypropylenediamine, polyoxypropylenetriamine, and polyoxyethylenediamine; hydroxyl group-containing amines such as diethanolamine and triethanolamine; polyamide amines such as those obtained by reacting a dimer acid with a polyamine such as diethylenetriamine, diethylenetetramine, etc.; polyamide amines such as those obtained by reacting a polycarboxylic acid other than the dimer acid; imidazoles such as 2-ethyl-4-methylimidazole; dicyandiamides; polyoxypropylene amines such as polyoxypropylene diamine and polyoxypropylene triamine; modified amines such as epoxy-modified amines obtained by reacting an epoxy compound with an amine as described above, Mannich-modified amines obtained by reacting an amine as described above with formalin or phenol, Michael-addition-modified amines, and ketimines; amine salt compounds such as 2,4,6-tris(dimethylaminomethyl)phenol 2-ethylhexanoic acid salt; quaternary ammonium salts such as tetramethylammonium chloride and benzalkonium chloride; products manufactured by Sankyo Aeroproducts such as DABCO (registered trade name) and DABCO BL series products; straight-chain or cyclic tertiary amine salts containing multiple nitrogen atoms such as 1,8-diazabicyclo[5.4.0]-7-undecene, 1,5-diazabicyclo[4.3.0]-5-nonene, and 1,4-diazabicyclo[2.2.2]octane; aminosilanes such as γ-aminopropyltrimethoxysilane and γ-aminopropyltriethoxysilane; products manufactured by Sumika Bayer Urethane (trade name: Desmorapid DB, Desmorapid PP, Desmorapid PV, Desmorapid 10/9, Desmorapid LA); and the like.

Examples of the organic phosphoric acid compound usable as the second curing catalyst (D) include, but are not limited to, monomethyl phosphate, dimethyl phosphate, trimethyl phosphate, monoethyl phosphate, diethyl phosphate, triethyl phosphate, di-n-butyl phosphate, mono-n-butyl phosphate, tri-n-butyl phosphate, triphenyl phosphate, and the like.

The second curing catalyst (D) may be used alone or in combination of two or more. The second curing catalyst (D) is used in an amount of preferably 0.01 to 10 parts by weight, particularly preferably 0.02 to 5 parts by weight, with respect to 100 parts by weight of the curable resin (A)

[V. Optional Additive Component: Mercaptosilane Compound (E)]

The mercaptosilane compound (E) is a compound having a hydrolytic silyl or silanol group and a mercapto group in the molecule. The silicon-containing functional group of the curable resin (A) activated by the catalytic action of curing catalyst (B) interacts with and binds to the mercaptosilane compound (E), so that the a mercaptosilane compound (E) functions as a crosslinking element, with improving the curing efficiency and the adhesiveness of the curable resin (A). The mercaptosilane compound (E) and the mercapto compound (F), that are raw materials for the curable resin (A) described above, may be used for it.

Typical examples of the mercaptosilane compounds (E) include, but are not limited to, γ-mercaptopropyltrimethoxysilane, γ-mercaptopropylmethyldimethoxysilane, γ-mercaptopropyltriethoxysilane, γ-mercaptopropylmethyldiethoxysilane, and the like.

The amount of the mercaptosilane compound (E) used is not particularly limited, but preferably 0.1 to 20 parts by weight, particularly preferably 1 to 10 parts by weight, with respect to 100 parts by weight of the curable resin (A).

[VI. Additives Blended According to Applications]

The curable resin composition described above can be used favorably in a variety of applications such as adhesive, sealant, paint, coating agent, filler (e.g., sealant for covering the material injected into cracks and preventing leakage thereof in repairing concrete cracks), molding material, and coating material, etc., and, when it is used in these applications, a silane-coupling agent, a filler and various other additives are added as needed, according to the requirements in properties in the specific application. In particular, a silane-coupling agent and a filler are often used. Examples of the various additives include tackifier, thixotropic agent, dehydrating agent, diluent, plasticizer, flame retardant, oligomer, antioxidant, ultraviolet absorbent, pigment, titanate coupling agent, aluminum coupling agent, dry oil such as tung oil, curable compound, and the like.

The curable resin adhesive prepared according to the application, which contains the curable resin composition described above, is extremely high in curing speed, and in particular, when it is applied to a moisture-curing adhesive, it becomes a fast-curing solvent-free adhesive not found in the past.

Hereinafter, the various additives will be described.

[Silane-coupling Agent]

Examples of the silane-coupling agents for use in the curable resin composition according to present invention include, but are not limited to, isocyanatosilane and isothiocyanatosilane compounds such as γ-isocyanatopropyltrimethoxysilane, γ-isocyanatopropylmethyldimethoxysilane, γ-isocyanatopropyltriethoxysilane, γ-isocyanatopropylmethyldiethoxysilane, γ-isocyanatopropyltrimethoxysilane, γ-isocyanatopropylmethyldimethoxysilane, γ-isocyanatopropyltriethoxysilane, γ-isocyanatopropylmethyldiethoxysilane, and γ-isocyanatopropyltriethoxysilane; aminosilane compounds such as γ-aminopropyltrimethoxysilane, γ-aminopropylmethyldimethoxysilane, γ-aminopropyltriethoxysilane, γ-aminopropylmethyldiethoxysilane, aminophenyltrimethoxysilane, 4-amino-3-dimethylbutyltrimethoxysilane, 4-amino-3-dimethylbutylmethyldimethoxysilane, 4-amino-3-dimethylbutyltriethoxysilane, 4-amino-3-dimethylbutylmethyldiethoxysilane, N-phenyl-γ-aminopropyltrimethoxysilane, N-naphthyl-γ-aminopropyltrimethoxysilane, N-phenyl-γ-aminopropylmethyldimethoxysilane, N-naphthyl-γ-aminopropylmethyldimethoxysilane, N-(n-butyl)-γ-aminopropyltrimethoxysilane, N-(n-butyl)-γ-aminopropylmethyldimethoxysilane, N-ethyl-γ-aminopropyltrimethoxysilane, N-ethyl-γ-aminopropylmethyldimethoxysilane, N-ethyl-aminoisobutyltrimethoxysilane, N-methyl-γ-aminopropyltrimethoxysilane, N-methyl-γ-aminopropylmethyldimethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-β-(aminoethyl)-γ-aminopropylmethyldiethoxysilane, N-3-[amino(dipropyleneoxy)]aminopropyltrimethoxysilane, (aminoethylaminomethyl)phenethyltrimethoxysilane, N-(6-aminohexyl)aminopropyltrimethoxysilane, N-(2-aminoethyl)-11-aminoundecyltrimethoxysilane, and bis(trimethoxysilylpropyl)amine; mercaptosilane compounds such as γ-mercaptopropyltrimethoxysilane, γ-mercaptopropylmethyldimethoxysilane, γ-mercaptopropyltriethoxysilane, and γ-mercaptopropylmethyldiethoxysilane; epoxysilanes such as β-(3,4-epoxycyclohexyl)ethyltrimethoxysilane, γ-glycidoxypropyltrimethoxysilane, γ-glycidoxypropylmethyldimethoxysilane, γ-glycidoxypropyltriethoxysilane, and γ-glycidoxypropylmethyldiethoxysilane; acrylic silane compounds such as γ-acryloxypropyltrimethoxysilane, γ-acryloxypropylmethyldimethoxysilane, γ-acryloxypropyltriethoxysilane, and γ-acryloxypropylmethyldiethoxysilane; methacrylic silane compounds such as γ-methacryloxypropyltrimethoxysilane, γ-methacryloxypropylmethyldimethoxysilane, γ-methacryloxypropyltriethoxysilane, and γ-methacryloxypropylmethyldiethoxysilane; vinylsilane compounds such as vinyltrimethoxysilane, vinylmethyldimethoxysilane, vinyltriethoxysilane, vinylmethyldiethoxysilane, and vinyltrichlorosilane; sulfide group-containing silane compounds such as bis(3-trimethoxysilylpropyl)tetrasulfane, bis(3-methyldimethoxysilylpropyl)tetrasulfane, bis(3-triethoxysilylpropyl)tetrasulfane, bis(3-methyldiethoxysilylpropyl)tetrasulfane, bis(3-trimethoxysilylpropyl)disulfide, bis(3-methyldimethoxysilylpropyl)disulfide, bis(3-triethoxysilylpropyl)disulfide, and bis(3-methyldiethoxysilylpropyl)disulfide; isocyanuratosilane compounds such as 1,3,5-N-tris(3-trimethoxysilylpropyl)isocyanuratosilane, 1,3,5-N-tris(3-methyldimethoxysilylpropyl)isocyanuratosilane, 1,3,5-N-tris(3-triethoxysilylpropyl)isocyanuratosilane, and 1,3,5-N-tris(3-methyldiethoxysilylpropyl)isocyanuratosilane; the compound (a), the compound (b), the compound (c), the compound (d), the compound (e), the compound (f), the compound (h), the compound (i) and the compound (j) as described above, and the like.

The silane-coupling agent may be used alone or in combination of two or more, and use of an amino group-containing silane-coupling agent is preferable. The blending ratio of the silane-coupling agent is preferably 0.1 to 20 parts by weight, particularly preferably 1 to 10 parts by weight, with respect to 100 parts by weight of the curable resin (A).

[Filler]

Examples of the filler for use in the curable resin composition according to the present invention include, but are not limited to, calcium carbonate, various modified calcium carbonates, magnesium carbonate, organic polymers, clay, talc, silica, fumed silica, glass balloon, various balloons such as plastic balloon, metal hydroxides such as aluminum hydroxide and magnesium hydroxide, spicular crystalline fillers and fibrillated fibers.

Examples of the silica filler include, but are not limited to, hydrophilic silica powder, hydrophobic silica powder, fused quartz glass powder and the like. Among them, hydrophobic silica powder is particularly preferable. Typical examples of the hydrophobic silica powder include fumed silica, which is widely used as a thixotropic agent in adhesives and others, and modified silica powders obtained by hydrohpobilizing a silica powder such as silica aerogel with an organic silicon compound such as dimethyl dichlorosilane, hexamethyldisilazane, dimethylsiloxane and trimethoxyoctylsilane; and in particular, one obtained by treating fumed silica with hexamethyldisilazane and ones obtained by treating silica aerogel with dimethylsiloxane and/or hexamethyldisilazane are preferable. The hydrophobilization treatment is performed by stirring the silica powder and the organic silicon compound rapidly at a temperature of about 100 to 400° C. The treatment is desirably performed in a medium such as an organic solvent, for more uniform contact between them. As for the blending ratio of the silica powder and the organic silicon compound, the organic silicon compound is normally used in an amount of 3 to 40 parts by weight with respect to 100 parts by weight of silica powder.

The fused quartz glass powder preferably has a $SiO_2$ content of 99.8% or more and contains extremely small amounts of alkali metals and other impurities. The fused quartz glass powder may be used as it is or after subjecting to surface-treatment with a surface-finishing agent. Examples of the surface-finishing agent include organic titanate compounds, organic aluminum compounds, organic zirconium compounds, alkoxysilanes and the like. Examples of the organic titanate compounds include tetrapropoxytitanium, tetrabutoxytitanium, tetrakis(2-ethylhexyloxy)titanium, tetrastearyloxytitanium, dipropoxy-bis(acetylacetonato)titanium, titanium propoxyoctyleneglycolate, titanium stearate, isopropyl triisostearoyltitanate, isopropyl tridodecyl benzenesulfonyltitanate, isopropyl tris(dioctylpyrophosphato)titanate, tetraisopropyl bis(dioctylphosphite) titanate, tetraoctyl bis(ditridodecylphosphite) titanate, tetra(2,2-diallyloxymethyl-1-butyl)bis(ditridodecyl)phosphite titanate, bis(dioctylpyrophosphate)oxyacetate titanate, tris(dioctylpyrophosphato)ethylene titanate, and the like. Examples of the organic aluminum compounds include acetoalkoxy aluminum diisopropylates and the like; and examples of the organic zirconium compounds include zirconium butyrate, zirconium acetylacetonate, acetylacetone zirconium butyrate, zirconium lactate, zirconium stearate butyrate, and the like. Alternatively, examples of the alkoxysilanes include vinyltrimethoxysilane, vinyltriethoxysilane, bis[tris(β-methoxyethoxy)silane], N-(β-aminoethyl)-γ-aminopropylmethyldimethoxysilane, N-(β-aminoethyl)-γ-aminopropyltrimethoxysilane, γ-aminopropyltrimethoxysilane, γ-aminopropyltriethoxysilane, γ-glycidoxypropyltrimethoxysilane, γ-glycidoxypropylmethyldimethoxysilane, β-(γ,δ-epoxycyclohexyl)ethyltrimethoxysilane, γ-chloropropyltrimethoxysilane, γ-chloropropylmethyldimethoxysilane, γ-methacryloxypropyltrimethoxysilane, γ-mercaptopropyltrimethoxysilane, hexamethyldisilazane, hexamethyldisiloxane, and the like.

Examples of the organic polymer fillers include, but are not limited to, polyester powder, polycarbonate powder, urethane resin powder, polymethylsilsesquioxane powder, acrylic resin powder, styrene resin powder, vinyl resin powders such as polyvinyl chloride resin powder, polyolefin powders such as of polyethylene and polypropylene, silicone powder, SBR powder, chloroprene powder, NBR powder, rubber powders such as acrylic rubber powder, and the like.

Examples of the fibrillated fiber fillers include fibrillated fibers of aromatic polyamide, polyester fibers, polyolefin fiber and polyacrylonitrile fiber, and the like; and those having an average fiber length of approximately 0.1 to 5 mm are preferable. Roughly fibrillated fiber lower in the degree of fibrillation than the fibrillated fiber above may be used in combination with the fibrillated fiber. The roughly fibrillated fiber means a fiber in which the number of fibril-shaped branches per unit length of the main fiber is small, and examples thereof include appropriately fibrillated or non-fibrillated fibers of polyester, polyolefin and polyacrylonitrile, sepiolite, glass fiber, carbon fiber and the like.

The filler may be used alone or in combination of two or more. The powdery filler preferably has a particle diameter of 10 nm to 200 μm, more preferably 100 nm to 100 μm, and particularly preferably 1.0 to 30 μm. The blending ratio of the filler is preferably 1 to 500 parts by weight, more preferably 1 to 300 parts by weight, and particularly preferably 1 to 200 parts by weight, with respect to 100 parts by weight of the curable resin (A).

[Diluent]

The diluent for use in the curable resin composition is not particularly limited, if it is a solvent having a diluting effect. However, the solvent is preferably compatible with the curable resin (A). The water content thereof is preferably 500 ppm or less. The blending ratio of the diluent can be adjusted as needed.

A reactive diluent having a crosslinkable functional group such as a hydrolytic silyl, epoxy or isocyanate group in the molecule is also usable as the diluent.

A liquid compound having an acrylic polymer as the main chain is also usable as the diluent. Such compounds are available as commercial products, and examples of the commercially available products include, but are not limited to, products manufactured by Toagosei (trade name: XPR-15, 22, 39, 40, UP-1000, 1010, 1020, 1021, 1061, 1070, 1080 and 1110, and UG-4010), and products manufactured by Soken Chemical & Engineering (trade name: UMB-1001, 2005, 2005B and 2005P, UME-1001, UMM-1001 and 4005, UT-1001, 2001, 2001P and 3001, AS-300 and 301, ASM-4001, CB-3060, and BGV-11 and 12) and the like.

[Tackifier]

Any one of tackifiers commonly used, either solid or liquid at room temperature, can be used as needed as the tackifier. Typical examples thereof include phenol resins, modified phenol resins (e.g., cashew oil-modified phenol resins, tall oil-modified phenol resins, etc.), terpene phenol resins, xylene-phenol resins, cyclopentadiene-phenol resins, coumarone-indene resins, rosin resins, rosin ester resins, hydrogenated rosin ester resins, xylene resins, low-molecular weight polystyrene resins, styrene copolymer resins, petroleum resins (e.g., $C_5$ hydrocarbon resins, $C_9$ hydrocarbon resins, $C_5$-$C_9$ hydrocarbon copolymer resins, etc.), hydrogenated petroleum resins, terpene resins, DCPD resins and the like; and these resins may be used alone or in combination of two or more. Among the tackifier resins above, terpene phenol resins, rosin ester resins, hydrogenated rosin ester resins, xylene resins, styrene copolymer resins, $C_9$ hydrocarbon resins, hydrogenated petroleum resins and terpene resins are particularly favorable in compatibility and adhesive properties and thus preferable. The blending rate of the tackifier resin is preferably 2 to 70 parts by weight, particularly preferably 5 to 20 parts by weight, with respect to 100 parts by weight of the curable resin (A).

[Thixotropic Agent]

Examples of the thixotropic agents include, but are not limited to, anhydrous silica, amide waxes, fatty acid bisamides, hydrogenated castor oil and the like.

[Dehydrating Agent]

Examples of the dehydrating agent include, but are not limited to, calcium oxide, magnesium oxide, zinc oxide, calcium chloride, orthosilicic acid esters, silane-coupling agents such as vinyltrimethoxysilane, silicate compounds such as methyl silicate and ethyl silicate, activated carbon, zeolite and the like.

[Plasticizer]

Examples of the plasticizer include, but are not limited to, aromatic carboxylic esters such as dioctyl phthalate and dibutyl phthalate, aliphatic carboxylic esters such as dioctyl adipate and dibutyl sebacate, polyalkylene glycols, polyalkylene glycol modified products, (meth)acrylic polymers, liquid tackifiers such as low-molecular weight terpene or terpene phenol copolymers, oils such as naphthene-based oil, aromatic oil, paraffin oil and silicone oil, and the like.

[Flame Retardant]

Examples of the flame retardant include, but are not limited to, metal hydroxides such as aluminum hydroxide and magnesium hydroxide, halogen-based flame retardants, phosphorus-based flame retardants and the like.

[Oligomer]

Examples of the oligomer for use include, but are not limited to, polyethylene oligomers, liquid polypropylene, oligostyrene, liquid chloroprene polymers, liquid polyisoprene, liquid SBR, liquid NBR, liquid butyl rubbers, liquid isobutylene polymers, liquid polybutadiene, polyhydroxypolyolefin oligomers, α-methylstyrene oligomers, phosphorus-containing styrene-α-methylstyrene oligomers, oligoester acrylates and the like.

[Antioxidant and Ultraviolet Absorbent]

Any one of antioxidants and ultraviolet absorbents commonly used for prevention of degradation of various resins may be used as the antioxidant and ultraviolet absorbent as it is properly selected, and examples thereof include compounds having a primary amino group, a secondary amino group, a tertiary amino group, a hydroxyl group, a carboxyl group or a mercapto group in the molecule. Typical examples thereof include, but are not limited to, triacetonediamine, poly[(6-morpholino-s-triazine-2,4-diyl){2,2,6,6-tetramethyl-4-pyperidyl}imino]hexamethylene{2,2,6,6-tetramethyl-4-pyperidyl}imino]], bis(2,2,6,6-tetramethyl-4-pyperidyl)sebacate, bis(1,2,2,6,6-pentamethyl-4-pyperidyl) sebacate, 4-benzoyloxy-2,2,6,6-tetramethylpiperidine, poly(2,2,4-trimethyl-1,2-dihydroquinoline), 6-ethoxy-2,2,4-trimethyl-1,2-dihydroquinoline, N,N'-diphenyl-p-phenylenediamine, N-isopropyl-N'-phenyl-p-phenylenediamine, N-1,3-dimethylbutyl-N'-phenyl-p-phenylenediamine, mixed N,N'-diallyl-p-phenylenediamine, alkylated diphenylamines, 8-acetyl-3-dodecyl-7,7,9,9-tetramethyl-1,3,8-triazaspiro[4.5]decane-2,4-dione, poly[{6-(1,1,3,3-tetramethylbutyl)amino-1,3,5-triazine-2,4-diyl}{2,2,6,6-tetramethyl-4-pyperidyl}imino]hexamethylene{2,2,6,6-tetramethyl-4-pyperidyl}imino]], N,N'-bis(3-aminopropyl)ethylenediamine-2,4-bis[n-butyl-N-(1,2,2,6,6-pentamethyl-4-pyperidyl)amino]-6-chloro-1,3,5-triazine condensates, diphenylguanidine, di-o-tolylguanidine, N-cyclohexylbenzothiazylsulfenamide, 2,2'-dihydroxy-4-methoxybenzophenone, 2-hydroxy-4-n-octyloxybenzophenone, 2-hydroxy-4-methoxybenzophenone, 2-hydroxy-4-methoxybenzophenone trihydrate, 2,4-dihydroxybenzophenone, 2-hydroxy-4-methoxybenzophenone-5-sulfuric acid trihydrate, 4-dodecyloxy-2-hydroxybenzophenone, 4-benzyloxy-2-hydroxybenzophenone, 2,2',4,4'-tetrahydroxybenzophenone, 2,2'-dihydroxy-4,4'-dimethoxybenzophenone, 2-hydroxy-4-octoxybenzophenone, 2-hydroxy-4-octoxybenzophenone, 2-(2'-hydroxy-5'-t-octylphenyl)benzotriazole, 2-(2'-hydroxy-5'-methylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-di-t-amylphenyl)-5-chlorobenzotriazole, 2-(2'-hydroxy-3',5'-t-butylphenyl)benzotriazole, 2-(2-hydroxy-4-octyloxyphenyl)-2H-benzotriazole, 2-(2-hydroxy-5-methylphenyl)-2H-benzotriazole, 5-chloro-2-(3,5-di-t-butyl-2-hydroxyphenyl)-2H-benzotriazole, 2-(3-t-butyl-2-hydroxy-5-methylphenyl)-5-chloro-2H-benzotriazole, 2-(3,5-di-t-pentyl-2-hydroxyphenyl)-2H-benzotriazole, 2-(3,5-di-t-butyl-2-hydroxyphenyl)-2H-benzotriazole, 2-(2-hydroxy-5-t-octylphenyl)-2H-benzotriazole, 2-[2'-hydroxy-3'-(3",4",5",6"-tetrahydrophthalimido-methyl)-5'-methylphenyl]benzotriazole, 2-(2'-hydroxy-3',5'-di-t-amylphenyl)benzotriazole, 2-(2-hydroxy-3-dodecyl-5-methylphenyl)benzotriazole, 2-[2-hydroxy-3,5-bis(α,α-dimethylbenzyl)phenyl]-2H-benzotriazole, n-hexadecyl-3,5-di-t-butyl-4-hydroxybenzoate, n-hexadecyl-3,5-di-t-butyl-4-hydroxybenzoate, 2',4'-di-t-butylphenyl-3,5-di-t-butyl-4-hydroxybenzoate, 1,3,5-tris(4-t-butyl-3-hydroxy-2,6-dimethylbenzyl)isocyanuric acid, tris(3,5-di-t-butyl-4-hydroxybenzyl)isocyanurate, 1,3,5-tris(3,5-di-t-butyl-4-hydroxybenzyl)isocyanuric acid, ethylene glycol bis[3-(3-t-butyl-4-hydroxy-5-methylphenyl)propionate], tetrakis[methylene-3(3',5'-di-t-butyl-4'-hydroxyphenyl)propionato]methane, n-octadecyl-3(3',5'-di-t-butyl-4'-hydroxyphenyl)propionate, triethylene glycol-bis[3-(3-t-butyl-4-hydroxy-5-methylphenyl)propionate], isooctyl-3-(3,5-di-t-butyl-4-hydroxyphenyl)propionate, 1,6-hexanediol-bis[3-(3,5-di-t-butyl-4-hydroxyphenyl)propionate], 2,2-thio-diethylene bis[3-(3,5-di-t-butyl-4-hydroxyphenyl)propionate], 4,4'-butylidene-bis(3-methyl-6-t-butylphenol), 2,2'-butylidene-bis(4-methyl-6-t-butylphenol), 2,2'-butylidene-bis(4-ethyl-6-t-butylphenol), 4,4'-thio-bis(3-methyl-6-t-butylphenol), 2,2'-methylene-bis[4-methyl-6-t-butylphenol], 2,2'-methylene-bis(4-methyl-t-butylphenol), 2,2'-methylene-bis(4-ethyl-t-butylphenol), 6-(2-benzotriazolyl)-4-t-octyl-6'-t-butyl-4'-methyl-2,2'-methylene-bisphenol, styrenated phenols, 2,6-di-t-butyl-4-methylphenol, 2,4-dimethyl-6-(1-methylcyclohexyl)phenol, 2-[4,6-bis(2,4-dimethylphenyl)-1,3,5-triazine-2-yl]-5-(octyloxy)phenol, 2,6-di-t-butyl-4-ethylphenol, 2-(2H-benzotriazole-2-yl)-4-menthyl-6-(3,4,5,6-tetrahydrophthalimidylmethyl)phenol, 2-(4,6-diphenyl-1,3,5-triazin-2-yl)-5-[(hexyl)oxy]phenol, 2,5-di-t-butylhydroquinone, poly(2,2,4-trimethyl-1,2-dihydroquinone), 6-ethoxy-2,2,4-trimethyl-1,2-dihydroquinone, 2,5-di-t-amylhydroquinone, 4,4'-butylidene-bis(6-t-butyl-m-cresol), 2,2'-methylene-bis[6-(1-methylcyclohexyl)-p-cresol], 1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetramethylpiperidine, S-(3,5-di-t-butyl-4-hydroxybenzyl)-2-ethyl-n-hexyl-thioglycolate, 4,4'-thiobis(6-t-butyl-m-cresol), p-benzoquinone dioxime, 1,6-bis(4-benzoyl-3-hydroxyphenoxy)hexane, 1,4-bis(4-benzoyl-3-hydroxyphenoxy)butane, phenyl salicylate, 4-t-butylphenyl salicylate, 1,1,3-tris(2-methyl-t-butyl-4-hydroxy-5-t-butylphenyl)butane, 1,1-bis(4-hydroxyphenyl)cyclohexane, 3,9-bis[2-{3-(3-t-butyl-4-hydroxy-5-methylphenyl)propionyloxy}-1,1-dimethylethyl]-2,4,8,10-tetraoxaspiro[5,5]undecane, 2-t-butyl-6-(3'-t-butyl-5'-methyl-2'-hydroxybenzyl)-4-methylphenyl acrylate, dimethyl succinate-1-(2-hydroxyethyl)-4-hydroxy-2,2,6,6-tetramethylpiperidine polycondensates, condensates of methyl-3-[3-t-butyl-5-(2H-benzotriazole-2-yl)-4-hydroxyphenyl]propionate and polyethylene glycol, 3,4-dihydro-2,5,7,8-tetramethyl-2-(4,8,12-trimethyltridecyl)-2H-benzopyran-6-ol and glycerol/low-density polyethylene mixtures or stearic acid mixtures containing the same, mixtures of calcium bis(ethyl 3,5-di-t-butyl-4-hydroxybenzylsulfonate) and polyethylene wax, 2,4-bis[(octylthio)methyl]-o-cresol, N,N'-hexamethylene bis(3,5-di-t-butyl-4-hydroxy-hydrocinnamide), 3,5-di-t-butyl-4-hydroxybenzyl phosphonate diethylester, 1,3,5-trimethyl-2,4,6-tris(3,5-di-t-butyl-4-hydroxybenzyl)benzene, bis(1,2,2,6,6-pentamethyl-4-pyperidyl) 2-(3,5-di-t-butyl-4-hydroxybenzyl)-2-n-butylmalonate, 2,3-bis[{3-(3,5-di-t-butyl-4-hydroxyphenyl)propionyl}]propionohydrazide, 2,4-bis(n-octylthio)-6-(4-hydroxy-3,5-di-t-butylanilino)-1,3,5-triazine, 2-hydroxy-4-methoxy-2'-carboxybenzophenone, mercaptobenzothiazole, 2-mercaptobenzimidazole, products manufactured by Sankyo LifeTech (trade name: Sanol LS-765, Sanol LS-292, Sanol LS-944, Sanol LS-440, Sanol LS-770, and Sanol LS-744), products manufactured by Ciba Specialty Chemicals (trade name: Tinuvin 123, Tinuvin 292, and Tinuvin 144) and the like.

In addition, a compound prepared in the reaction of a compound having an isocyanate group and a reactive functional group (e.g., primary or secondary amino, hydroxyl, carboxyl or mercapto group) in the molecule among the antioxidants and ultraviolet absorbents described above with the compound (CC) above may also be used as the antioxidant and ultraviolet absorbent. Use of such a compound is effective in improving the potential of aging resistance and ultraviolet ray absorption.

The antioxidant and ultraviolet absorbent may be used alone or in combination of two or more. The blending ratio of the antioxidant and ultraviolet absorbent is suitably 0.001 to 10 parts by weight, preferably 0.01 to 5 parts by weight, and most suitably 0.1 to 2 parts by weight, with respect to 100 parts by weight of the curable resin (A).

[Curable Compound]

The curable compound is a compound other than the curable resin (A) described above that is so added according to the application that the curable resin (A) exhibits properties suitable for the application when it is cured. Examples of the curable compound for use include, but are not limited to, urethane prepolymer having an isocyanate group in the molecule, epoxy resin, maleic anhydride-grafted polybutadiene oil (e.g., a product manufactured by Degussa Japan (trade name: POLYVEST OC 800S), the curable compound (M) described above, and the like; and one or more of these compounds may be selected and used.

The urethane prepolymer is not particularly limited, if it has at least one isocyanate group in the molecule. Such a urethane prepolymer can be prepared in the reaction of a compound having at least one hydroxyl, amino, mercapto or carboxyl group in the molecule with a compound having at least two isocyanate groups in the molecule. The raw material, an isocyanate compound, may remain in the urethane prepolymer.

Typical examples of the epoxy resin include bisphenol A epoxy resins, bisphenol F epoxy resins, novolak epoxy resins, glycidylated-amine epoxy resins, heterocyclic ring-containing epoxy resins, alicyclic epoxy resins, hydrogenated bisphenol A epoxy resins, urethane-modified epoxy resins, hydantoin epoxy resin, terminal-epoxidized polyoxyalkylenes and the like; and these resins may be used alone or in combination of two or more.

When an epoxy resin is used, combined use of a ketimine or oxazoridine compound such as ketimine, aldimine, etc. is more effective. The ketimine compound is a compound having the group represented by general formula: —N═C(X)(Y) (wherein X represents a hydrogen atom or an organic group, and Y represents an organic group); and in the present invention, the following compounds of (1) and (2), for example, are effectively utilized.

(1) Compounds represented by the following general formula (134') and the derivatives thereof, wherein the derivatives are, for example, compounds obtained by reacting the secondary amino group of a compound represented by general formula (134') with a compound having an epoxy group.

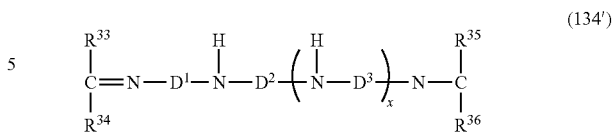

(wherein $R^{33}$, $R^{34}$, $R^{35}$ and $R^{36}$ each independently represents a group selected from the group consisting of a hydrogen atom, alkyl groups having 1 to 6 carbons, a phenyl group and phenyl groups containing an alkyl group having 1 to 6 carbons; $D^1$, $D^2$ and $D^3$ independently represent an alkylene group having 2 to 6 carbons, respectively; and x is 0 or 1.)

(2) Compounds obtained by reacting an amine compound having at least one primary amino group in the molecule with a carbonyl compound. It is possible to obtain a ketimine by blocking the amine compound with a ketone, while an aldimine by blocking it with an aldehyde. The compounds (2) include both ketimine derivatives and aldimine derivatives of the compound (2).

Examples of the compounds represented by general formula (134') include, but are not limited to, 2,5,8-triaza-1,8-nonadiene, 2,10-dimethyl-3,6,9-triaza-2,9-undecadiene, 2,10-diphenyl-3,5,9-triaza-2,9-undecadiene, 3,11-dimethyl-4,7,10-triaza-3,10-tridecadiene, 3,11-diethyl-4,7,10-triaza-3,10-tridecadiene, 2,4,12,14-tetramethyl-5,8,11-triaza-4,11-pentadecadiene, 2,4,20,22-tetramethyl-5,12,19-triaza-4,19-trieicosadiene, 2,4,15,17-tetramethyl-5,8,11,14-tetraaza-4,14-octadecadiene, and the like.

Examples of the compound having an epoxy group, which is used in the reaction with the secondary amino group of the compound represented by general formula (134'), include styrene oxide, butyl glycidyl ether, allyl glycidyl ether, p-tert-butylphenyl glycidyl ether, p-sec-butylphenyl glycidyl ether, m- and p-cresyl glycidyl ethers, p-cresyl glycidyl ether, vinylcyclohexane dioxide, versatic glycidyl ester, cardanol-modified glycidyl ethers, dimer acid glycidyl ester, 1,6-hexanediol diglycidyl ether, resorcinoglycidylether, propylene glycol diglycidyl ether, 1,4-butanediol diglycidyl ether, neopentylglycol diglycidyl ether, and the like. In particular, styrene oxide derivatives are preferable. The ketimine derivative of compound (1) used may be a compound prepared by reacting an epoxy group-containing compound with only one of two imino groups on the compound represented by the structural Formula above.

The compounds (1) also include the compounds represented by the following general formulae (135') and (136'). Here, in the following general formula (135'), n is a number of 1 to 6. In addition, in the following general formula (136'), x, y and z may be the same as or different from each other, and x+y+z is approximately 5.3.

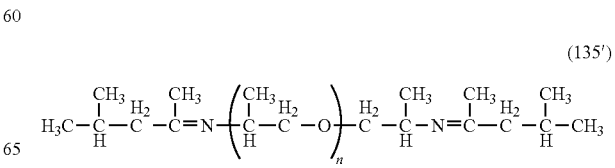

-continued (136')

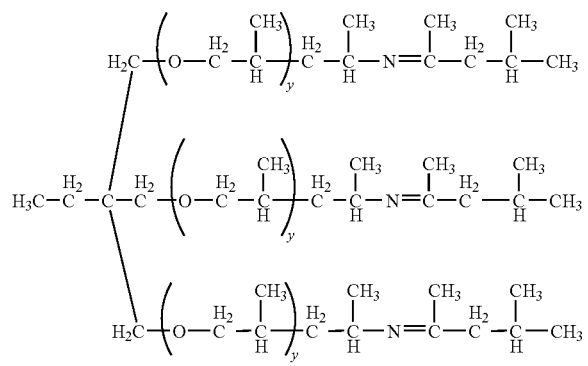

On the other hand, the amine compound for preparation of the compound (2) above approximately has a primary amino group 20 equivalence in the range of about 2,000 or less, preferably about 30 to 1,000, and a number-average molecular weight in the range of approximately 5,000 or less, preferably about in the range of 60 to 3,000. Typical examples of the amine compound include ethylenediamine, propylenediamine, butylenediamine, diethylenetriamine, triethylenetetramine, tetraethylenepentamine, pentaethylene hexamine, hexamethylenediamine, trimethylhexamethylenediamine, N-aminoethylpiperazine, 1,2-diaminopropane, iminobispropylamine, methyliminobispropylamine; polyamines having a polyoxylene skeleton such as poly(oxypropylene)diamines; diamines having a polyether skeleton such as a product manufactured by Santechno Chemicals (trade name: Jeffermine EDR148); isophoronediamine, 1,3-bisaminomethylcyclohexane, 1-cyclohexylamino-3-aminopropane, 3-aminomethyl-3,3,5-trimethyl-cyclohexylamine; diamines having a norbornane skeleton such as a product manufactured by Mitsui Chemicals (trade name: NBDA); diamines having a xylylene skeleton such as meta-xylylenediamine and a product manufactured by Mitsubishi Gas Chemical Company, (trade name: MXDA); diaminodiphenylmethane, phenylenediamine; aliphatic, aromatic and alicyclic polyamines such as polyamide amines having a primary amino group at the ends of the molecule; and the like.

Other examples include silicon atom-containing amine compounds such as N-β-(aminoethyl)-γ-aminopropyltrimethoxysilane, N-β-(aminoethyl)-γ-aminopropylmethyldimethoxysilane, γ-aminopropyltrimethoxysilane, and γ-aminopropyltriethoxysilane; and the like. Among the amine compounds above, polyamine compounds having two or more primary amino groups in the molecule are particularly preferable.

Examples of the carbonyl compounds for preparation of the compound (2) include ketones such as acetone, methylethylketone, methylisopropylketone, methylisobutylketone, methyl-t-butylketone, diethylketone, dipropylketone, diisobutylketone, ethylpropylketone, ethylbutylketone, cyclohexanone, propiophenone and benzophenone; and aldehydes such as acetaldehyde and benzaldehyde.

The reaction between the amine compound and the carbonyl compound may be performed according to a known method, and is carried out at the ratio and under the condition at which substantially all primary amino groups in the amine compound are reacted with the carbonyl compound. The reaction between them is carried out by heating them under reflux, while removing the water generated by azeotropic distillation, in the absence of a solvent or in the presence of a non-polar solvent such as hexane, cyclohexane, toluene and benzene. It is also possible to use a ketone that is less soluble in water and smaller in steric hindrance such as methylisobutylketone or methylethylketone as the carbonyl compound, for acceleration of the reaction (dehydration reaction).

It is preferred to use the epoxy resin in an amount of 1 to 200 parts by weight and the ketimine compound in an amount of 1 to 200 parts by weight with respect to 100 parts by weight of the curable resin (A), and is particularly preferred to use 1 to 100 parts by weight of the epoxy resin and 1 to 100 parts by weight of the ketimine compound with respect to 100 parts by weight of the curable resin (A).

In the present invention, it is possible to make an adhesive with a mixture (I) containing the curable resin (A) and a curing agent of the epoxy resin; and a mixture (II) containing the epoxy resin and a curing catalyst (B). In particular, it is possible to obtain an adhesive extremely favorable in curing efficiency and adhesive strength by blending a mixture (I) consisting essentially of 100 parts by weight of the curable resin (A) and 0.01 to 80 parts by weight of the epoxy resin-curing agent; and a mixture (II) consisting essentially of 100 parts by weight of the epoxy resin and 0.1 to 20 parts by weight of the curing catalyst (B), and by setting the mixing ratio of the mixture (I) to the mixture (II) at a ratio of 15-80% by weight to 85-15% by weight.

Examples of the epoxy resin-curing agent include, but are not limited to, ethylenediamine, 1,3-propanediamine, hexamethylenediamine, diethylenetriamine, triethylenetetramine, 2,2,4-trimethyl-1,6-hexanediamine, m-xylylenediamine, bis(4-aminocyclohexyl)propane, isophoronediamine, tetraethylenepentamine, dipropylenetriamine, bishexamethylenetriamine, 1,3,6-trisaminomethylhexane, trimethylhexamethylenediamine, polyether diamine, diethylaminopropylamine, menthenediamine, bis(4-amino-3-methylcyclohexyl)methane, N-aminoethylpiperazine, m-phenylenediamine, diaminodiphenylsulfone, diaminodiphenylmethane, the modified products thereof, and the like. The modification methods include, for example, epoxy compound addition, ethylene oxide addition, propylene oxide addition, acrylonitrile addition, Mannich addition with phenol or the derivative thereof and formalin, thiourea addition, ketone blocking, and the like.

In addition to the epoxy resin-curing agents above, it is also possible to use a copmpound selected from phenolic novolak resins, polymercaptan compounds, polysulfide, ketimines, tertiary amines, organic acid hydrazides, dicyandiamides and the derivatives thereof, amine imides, carboxylic esters, boron trifluoride-amine complexes, imidazoles, Lewis acids, acid anhydrides, halogenated acid anhydrides, aromatic diazonium salts, diallyliodonium salts, triallylsulfonium salts, triallylselenium salts, polyamide amines, polyphenols, alcohols, acetylacetonate metal salts, phosphines and the like; and these compounds may be used alone or in combination of two or more.

Hereinafter, the present invention will be described in detail with reference to Examples, but it should be understood that the present invention is not limited to the following Examples.

EXAMPLE

<Preparation of Curable Resin (A)>

Preparative Example 1

[Preparation of Curable Resin B-1 Having a Trimethoxysilyl Group and a Sulfide Bond in the Molecule]

In a reaction container placed were 100 g of a polyester having allyl groups at both terminals (trade name: SDX-1690, manufactured by Asahi Denka, number-average molecular weight: 3,000) and 10.3 g of 1,5-dimercapto-3-thiapentane (trade name: DMDS, manufactured by Maruzen Chemical). The mixture was then heated to 90° C. in a nitrogen atmospher. A mixture solution of 0.5 g of AIBN (2,2'-azobisisobutylonitrile) and 5 g of toluene was added dropwise over 1 hour at the same temperature, and the mixture was allowed to react at the same temperature for two hours reaction, to give a compound (PB-1) having a mercapto group in the molecule. The reaction product containing the compound (PB-1) was cooled to 85° C., and 15.6 g of γ-acryloxypropyltrimethoxysilane (trade name: KBM5103, manufactured by Shin-Etsu Chemical) was added and allowed to react at the same temperature for 3 hours, to give a curable resin B-1 having a trimethoxysilyl group in the molecule that was liquid at room temperature.

Preparative Example 2

[Preparation of Curable Resin B-2 Having a Methyldimethoxysilyl Group and a Sulfide Bond in the Molecule]

With cooling the reaction product containing the compound PB-1 prepared in Preparative Example 1 to 85° C. in a reaction container, 14.6 g of γ-acryloxypropylmethyldimethoxysilane (trade name: KBM5102, manufactured by Shin-Etsu Chemical) was added thereto, and the mixture was allowed to react at the same temperature for 3 hours, to give a curable resin B-2 having a methyldimethoxysilyl group in the molecule that is liquid at room temperature.

Preparative Example 3

[Preparation of Curable Resin B-3 Having a Trimethoxysilyl Group, a Urethane Bond and a Substituted Urea Bond in the Molecule]

In a reaction container placed were 179 g of γ-aminopropyltrimethoxysilane (trade name: KBM903, manufactured by Shin-Etsu Chemical) and 184 g of 2-ethylhexyl acrylate. The mixture was then stirred and allowed to react at 80° C. for 10 hours in a nitrogen atmosphere, to give a reaction product SE-3.

In another reaction container placed were 700 g of a polyoxypropylene polyol (trade name: PML4010, manufactured by Asahi Glass Urethane, number-average molecular weight: 10,000), 300 g of a polyoxyethylene-containing polyoxypropylene polyol (trade name: PR5007, manufactured by Asahi Denka) and 58.8 g of isophorone diisocyanate (trade name: Desmodule I, manufactured by Sumika Bayer Urethane). The mixture was then stirred and allowed to react at 90° C. for 8 hours in a nitrogen atmospher, to give a polyoxyalkylene resin PB-3 having an isocyanate group in the molecule. Then 119 g of the reaction product SE-3 was added thereto, and the mixture was stirred and allowed to react at 90° C. for two hours in a nitrogen atmospher, to give a curable resin B-3, namely, a polyoxyalkylene resin having a urethane bond, a substituted urea bond and a silicon-containing functional group in the molecule, that was liquid at room temperature.

Preparative Example 4

[Preparation of Curable Resin B-4 Having a Trimethoxysilyl Group, a Methyldimethoxysilyl Group, Urethane Bonds and a Substituted Urea Bond in the Molecule]

In a reaction container placed were 35.9 g of γ-aminopropyltrimethoxysilane (trade name: KBM903, manufactured by Shin-Etsu Chemical), 130.6 g of γ-aminopropylmethyldimethoxysilane (trade name: KBM902, manufactured by Shin-Etsu Chemical) and 114 g of n-butyl acrylate. The mixture was then stirred and allowed to react at 80° C. for 10 hours under a nitrogen atmospher, to give a reaction product SE-4.

In another reaction container placed were 700 g of a polyoxypropylene polyol (trade name: PML4010, manufactured by Asahi Glass Urethane, number-average molecular weight: 10,000), 300 g of a polyoxyethylene-containing polyoxypropylene polyol (trade name: PR5007, manufactured by Asahi Denka) and 52.3 g of isophorone diisocyanate (trade name: Desmodule I, manufactured by Sumika Bayer Urethane). The mixture was then stirred and allowed to react at 90° C. for 8 hours under a nitrogen atmospher, to give a polyoxyalkylene resin PB-4 having an isocyanate group in the molecule. Then 82 g of the reaction product SE-4 was added thereto, and the mixture was allowed to react while stirred and mixed at 90° C. for two hours in a nitrogen atmospher, to give a curable resin B-4, namely, a polyoxyalkylene resin having a urethane bond, a substituted urea bond and a silicon-containing functional group in the molecule, that was liquid at room temperature.

Examples 1 to 4 and Comparative Example 1

For comparison of the curing speeds of the curable resins 1 to 4 obtained, each of the curable resins and a boron trifluoride monoethylamine complex was mixed at the blending ratio (parts by weight) shown in Table 1 for 30 seconds rapidly. The mixture was left at 23° C. in an atmosphere of a relative humidity of 50 to 60%, and the period until a hardened film was formed on the surface and the surface became not tacky any more (skinning period) was determined. A skinning period of 2'30" in the Table, for example, means that the skinning period was 2 minutes and 30 seconds.

As apparent from the results in Table 1, when a boron trifluoride monoethylamine complex was used, hardening was extremely faster in Examples 1 to 4 wherein a curable resin having a trimethoxysilyl group in the molecule was used, than in Comparative Example 1 wherein a curable resin having no trimethoxysilyl group but having only a methyldimethoxysilyl group in the molecule was used. That is, the boron trifluoride monoethylamine complex functions as an extremely effective curing catalyst for the trimethoxysilyl group.

Here, it is noted that, when 3 parts by weight of the boron trifluoride monoethylamine complex was replaced with 3 parts by weight of a thermal latent catalyst (trade name: San-Aid SI-145L, manufactured by Sanshin Chemical Industry, $SbF_6^-$ aromatic sulfonium salt) in Example 3, there was no skinning observed even after 3 hours, indicating that the effect was due to the boron trifluoride monoethylamine complex.

TABLE 1

|  | example | | | | comparative example |
|---|---|---|---|---|---|
|  | 1 | 2 | 3 | 4 | 1 |
| curable resin B-1 | 100 | 60 | | | |
| curable resin B-2 | | 30 | | | |
| curable resin B-3 | | | 100 | | |
| curable resin B-4 | | 10 | | 100 | |
| S303 | | | | | 100 |
| boron trifluoride monoethylamin complex | 3 | 3 | 3 | 3 | 3 |
| skinning period | 11'00" | 18'00" | 2'30" | 22'00" | not skinned over 3 hrs. |

S303: trade name of methyldimethoxysilyl group-containing polyoxyalkylene manufactured by Kaneka Corporation Examples 5 to 25 and Comparative Examples 2 and 3

The curable resin B-1 obtained in Preparative Example 1 or the curable resin B-3 obtained in Preparative Example 3, N-β-(aminoethyl)-γ-aminopropyltrimethoxysilane (trade name: KBM603, manufactured by Shin-Etsu Chemical) and the curing catalyst at the blending ratio (parts by weight) shown in Table 2 or 3 were mixed rapidly in a mixer for 30 seconds. Then the skinning period of the mixture was determined. The results are summarized in Tables 2 and 3.

As apparent from the results in Tables 2 and 3, the curable resins having a trimethoxysilyl group in the molecule hardened extremely rapidly in the cases where the curing catalyst used was a metal halide and a boron halide compound, in comparison with the cases where a dialkyltin catalyst was used. The fact that the hardening speeds in Examples 5 to 15 were higher than those in Examples 16 to 26 indicates that the curable resin B-3 having a urethane group, a substituted urea bond and a tertiary amino group in the molecule hardens more rapidly than the curable resin B1 having a sulfide bond but no urethane bond, when a Lewis acid compound was used as the curing catalyst. In addition, it is understood that an extremely high curing speed is possibly achieved, when titanium chloride or a boron trifluoride compound is used as the curing catalyst, among the Lewis acids and the complexes.

TABLE 2

|  | example | | | | | | | | | | | comparative |
|---|---|---|---|---|---|---|---|---|---|---|---|---|
|  | 5 | 6 | 7 | 8 | 9 | 10 | 11 | 12 | 13 | 14 | 15 | example 2 |
| curable resin B-3 | 100 | 100 | 100 | 100 | 100 | 100 | 100 | 100 | 100 | 100 | 100 | 100 |
| KBM603*1 | 3 | 3 | 3 | 3 | 3 | 3 | 3 | 3 | 3 | 3 | 3 | 3 |
| tin chloride ($SnCl_4$) | 0.005 | | | | | | | | | 100 | | |
| aluminum chloride ($AlCl_3$) | | 0.005 | | | | | | | | 10 | 100 | |
| zirconium chloride ($ZrCl_4$) | | | 3 | | | | | | | | | 100 |
| titanium chloride ($TiCl_4$) | | | | 3 | | | | | | | | |
| boron trifluoride diethyl ether complex | | | | | 3 | | | | | | | |
| boron trifluoride monoethylamin complex | 1.5 | 1.5 | | | | 3 | 3 | 3 | 3 | 3 | 3 | |
| Stan No. 918*2 | | | | | | | | | 1 | | | |
| SCAT-51*3 | | | | | | | | | | 1 | | |
| Neostan U-700*4 | | | | | | | | | | | 1 | |
| Neostan U-830*5 | | | | | | | | | | | 1 | 3 |
| skinning period | 2'30" | 4'00" | 5'00" | 0'30" | 0'30" | 2'30" | 2'30" | 2'15" | 2'30" | 2'00" | 2'30" | 8'00" |

*1 trade name of N-β-(aminoethyl)-γ-aminopropyltrimethoxysilane manufactured by Shin-Etsu Chemical
*2 trade name of dibutyl tin compound manufactured by Sankyo Organic Chemicals
*3 trade name of dioctyltin compound manufactured by Sankyo Organic Chemicals
*4 trade name of poly(dibutylstannoxane) disilicate compound manufactured by Nitto Kasei
*5 trade name of dioctyltin compound manufactured by Nitto Kasei

TABLE 3

|  | example | | | | | | | | | | | comparative |
|---|---|---|---|---|---|---|---|---|---|---|---|---|
|  | 16 | 17 | 18 | 19 | 20 | 21 | 22 | 23 | 24 | 25 | 26 | example 3 |
| curable resin B-1 | 100 | 100 | 100 | 100 | 100 | 100 | 100 | 100 | 100 | 100 | 100 | 100 |
| KBM603*1 | 3 | 3 | 3 | 3 | 3 | 3 | | 3 | 3 | 3 | 3 | 3 |
| tin chloride ($SnCl_4$) | 0.005 | | | | | | | | | 100 | | |
| aluminum chloride ($AlCl_3$) | | 0.005 | | | | | | | 10 | | 100 | |
| zirconium chloride ($ZrCl_4$) | | | 3 | | | | | | | | | 100 |
| titanium chloride ($TiCl_4$) | | | | 3 | | | | | | | | |
| boron trifluoride diethyl ether complex | | | | | 3 | | | | | | | |
| boron trifluoride monoethylamin complex | 1.5 | 1.5 | | | | 3 | 3 | 3 | 3 | 3 | 3 | |
| Stan No. 918*2 | | | | | | | | 1 | | | | |
| SCAT-51*3 | | | | | | | | | 1 | | | |

TABLE 3-continued

|  | example |  |  |  |  |  |  |  |  |  |  | comparative example 3 |
|---|---|---|---|---|---|---|---|---|---|---|---|---|
|  | 16 | 17 | 18 | 19 | 20 | 21 | 22 | 23 | 24 | 25 | 26 |  |
| Neostan U-700*4 |  |  |  |  |  |  |  |  |  | 1 |  |  |
| Neostan U-830*5 |  |  |  |  |  |  |  |  |  |  | 1 | 3 |
| skinning time | 8'00" | 13'00" | 10'00" | 2'30" | 0'45" | 12'00" | 8'00" | 10'00" | 11'00" | 9'00" | 12'00" | 30'00" |

*1 trade name of N-β-(aminoethyl)-γ-aminopropyltrimethoxysilane manufactured by Shin-Etsu Chemical
*2 trade name of dibutyltin compound manufactured by Sankyo Organic Chemicals
*3 trade name of dioctyltin compound manufactured by Sankyo Organic Chemicals
*4 trade name of poly(dibutylstannoxane) disilicate compound manufactured by Nitto Kasei
*5 trade name of dioctyltin compound manufactured by Nitto Kasei Examples 27 to 31 and Comparative Example 4 and 5

In a planetary mixer placed were 100 parts by weight of the curable resin B-3 obtained in Preparative Example 3 and 10 parts by weight of silica aerogel hydrophobilized with dimethylsiloxane (trade name: Sylophobic 200, manufactured by Fuji Silysia Chemical). The mixture was heated and dehydrated at 100° C. for one hour under reduced pressure while it was kneaded. It was then cooled to room temperature, and 5 parts by weight of terminal-blocked polyethylene glycol (trade name: Hisolve MPM, manufactured by Toho Chemical Industry), 5 parts by weight of γ-aminopropyltrimethoxysilane (trade name: KBM903, manufactured by Shin-Etsu Chemical) and the curing catalyst shown in Table 4 were added thereto at the blending ratio (parts by weight) shown in Table 4. The mixture was kneaded under reduced pressure for 30 minutes, to give each of curable resin compositions. Each curable resin composition was filled rapidly into a container with a stopper, which was tightly sealed and left at 23° C. for 2 weeks or more. Then, the resin composition was taken out from the container and left at 23° C. in an atmosphere of a relative humidity of 50% in a similar manner to Example 1, and the skinning period of each of the curable resin compositions was determined. Results are summarized in Table 4.

According to the results in Table 4, the hardening was significantly fast when a boron trifluoride compound (specifically, a complex of boron trifluoride and an amine compound) was used as the curing catalyst for the composition containing the curable resin B-3, in comparison with that when a dialkyltin compound was used. In particular, when the amount of the curing catalyst was approximately 0.1 parts by weight or more with respect to 100 parts by weight of the curable resin B-3, a markedly high curing efficiency was observed. Hardening was also very fast when a boron trifluoride compound and a tin compound were used in combination, indicating that the boron trifluoride compound was effective in action.

TABLE 4

|  | example |  |  |  |  | comparative example |  |
|---|---|---|---|---|---|---|---|
|  | 27 | 28 | 29 | 30 | 31 | 4 | 5 |
| curable resin B-3 | 100 | 100 | 100 | 100 | 100 | 100 | 100 |
| Sylophobic 200*6 | 10 | 10 | 10 | 10 | 10 | 10 | 10 |
| Hisolve MPM*7 | 5 | 5 | 5 | 5 | 5 | 5 | 5 |
| KBM903*8 | 5 | 5 | 5 | 5 | 5 | 5 | 5 |
| boron trifluoride piperidine complex |  | 0.1 | 0.01 |  |  |  |  |
| boron trifluoride monoethylamin complex | 1 |  |  | 0.1 | 0.01 |  |  |
| SCAT-51*9 |  |  |  | 1 | 1 | 3 |  |
| bis(dioctylstanoxane)diethyl silicate |  |  |  |  |  |  | 1 |
| skinning period | 0'45" | 1'45" | 12'00" | 1'15" | 10'00" | 13'00" | 15'30" |

*6 trade name of silica aerogel hydrophobilized with dimethylsiloxane, manufactured by Fiji Silysia Chemical
*7 trade name of terminal-blocked polyethylene glycol manufactured by Toho Chemical Industry
*8 trade name of γ-aminopropyltrimethoxysilane manufactured by Shin-Etsu Chemical
*9 trade name of dioctyltin compound manufactured by Sankyo Organic Chemicals Preparative Example 5

[Preparation of Curable Resin B-5 Having Silicon-containing Functional Group and Urethane Bond in the Molecule]

In a reaction container placed were 100 g of a polyether polyol (trade name: PML4010, manufactured by Asahi Glass Urethane, number-average molecular weight: 10,000) and 4.1 g of γ-isocyanatopropyltrimethoxysilane (trade name: Y-5187, manufactured by Nippon Unicar). The mixture was stirred and allowed to react at 90° C. in a nitrogen atmospher for 8 hours, to give a curable resin B-5, namely, a polyoxyalkylene resin having a silicon-containing functional group and a urethane bond in the molecule.

Preparative Example 6

[Preparation of Curable Resin B-6 Having Silicon-containing Functional Group and Thiourethane Bond in the Molecule]

In a reaction container placed were 100 g of a polyether having allyl groups at both terminals (trade name: SDX-1690, manufactured by Asahi Denka, number-average molecular weight: 3,000) and 11.3 g of 1,5-dimercapto-3-thiapentane (trade name: DMDS, manufactured by Maruzen Chemical). The mixture was heated up to 90° C. and kept at the same temperature in a nitrogen atmospher. Then, a mixture solution of 0.5 g of AIBN and 5 g of toluene was added dropwise over 2 hours, and the mixture was allowed to react at the same temperature for one hour, to give a reaction product PB-6. The reaction product PB-6 was cooled to 70° C., and 13.7 g of γ-isocyanatopropyltrimethoxysilane (trade name: Y-5187) and 0.15 g of triethylamine were added thereto. The mixture was allowed to react at 70° C. for 8 hours in a nitrogen atmosphere, to give a curable resin B-6, namely, a polyoxyalkylene resin having a silicon-containing functional group and a thiourethane bond in the molecule, that was liquid at room temperature.

Preparative Example 7

[Preparation of Curable Resin B-7 Having Silicon-containing Functional Group and Urea Bond in the Molecule]

In a reaction container placed were 100 g of a polyether polyol having primary amino groups at both terminals (trade name: Jeffermine D-4000, manufactured by SunTechno Japan, number-average molecular weight: 4,000) and 8.7 g of γ-isocyanatopropyltrimethoxysilane (trade name: Y-5187, manufactured by Nippon Unicar Co., Ltd.). The mixture was heated and allowed to react at 70° C. for 8 hours in a nitrogen atmospher, to give a curable resin B-7, namely, a polyoxyalkylene resin having silicon-containing functional group and urea bonds in the molecule, that was liquid at room temperature.

Preparative Example 8

[Preparation of Curable Resin B-8 Having Silicon-containing Functional Group and Substituted Urea Bond in the Molecule]

In a reaction container placed were 100 g of a polyether polyol having primary amino groups at both terminals (trade name: Jeffermine D-4000, manufactured by SunTechno Japan, number-average molecular weight: 4,000) and 4.9 g of butyl acrylate. The mixture was heated and allowed to react at 50° C. for 10 hours in a nitrogen atmospher, to give a reaction product PB-8. Moreover, 4.4 g of γ-isocyanatopropyltrimethoxysilane (trade name: Y-5187, manufactured by Nippon Unicar Co., Ltd.) was added thereto, and the mixture was heated and allowed to react at 90° C. for 10 hours in a nitrogen atmospher, to give a curable resin B-8, namely, a polyoxyalkylene resin having a silicon-containing functional group and substituted urea bonds in the molecule.

Preparative Example 9

[Preparation of Curable Resin B-9 Having Silicon-containing Functional Group and Thiourea Bond in the Molecule]

In a reaction container mixed were 53.8 g of 3-(trimethoxysilyl)propylamine and 600 ml of dry tetrahydrofuran (THF), with cooling to 0° C. To this solution, 34.2 g of carbon disulfide was added dropwise, and the mixture was stirred at 0° C. for 5 hours in a nitrogen atmosphere. Then, a solution of 61.9 g of dicyclohexyl carbodiimide in 180 ml of dry THF and 3 g of triethylamine were added thereto, and the mixture was allowed to react at 40° C. for 5 hours. THF was removed from the reaction mixture obtained, and the residue was extracted with n-hexane. Then n-hexane was removed from the extract under reduced pressure, and the residue was distilled under reduced pressure, to obtain γ-isothiocyanatopropyltrimethoxysilane.

In another reaction container placed were 1,000 g of a polyether polyol having primary amino groups at both terminals (trade name: Jeffermine D-4000, manufactured by SunTechno Japan, number-average molecular weight 4,000) and 110.7 g of the γ-isothiocyanatopropyltrimethoxysilane obtained above. The mixture was stirred and allowed to react at 90° C. for 8 hours in a nitrogen atmosphere, to give a curable resin B-9, namely, a polyoxyalkylene resin having a silicon-containing functional group and a thiourea bond in the molecule, that was liquid at room temperature.

Preparative Example 10

[Preparation of Curable Resin B-10 Having Silicon-containing Functional Group and Substituted Thiourea Bond in the Molecule]

In a reaction container placed were 100 g of a polyether polyol having primary amino groups at both terminals (trade name: Jeffermine D-4000, manufactured by SunTechno Japan, number-average molecular weight: 4,000) and 3.7 g of methyl acrylate. The mixture was heated and allowed to react at 50° C. for 10 hours in a nitrogen atmosphere while it was stirred, to give a reaction product PB-10. Moreover, 5.5 g of the γ-isothiocyanatopropyltrimethoxysilane obtained in Preparative Example 5 was added thereto, and the mixture was heated and allowed to react at 90° C. for 8 hours in a nitrogen atmosphere while it was stirred, to give a curable resin B-10, namely, a polyoxyalkylene resin having a silicon-containing functional group and a thiourea bond in the molecule, that was liquid at room temperature.

Preparative Example 11

[Preparation of Curable Resin Having the Silicon-containing Functional Group and Amide Bond in the Molecule]

In a reaction container placed was 500 g of toluene. Next, a monomer solution was prepared by mixing 100 g of methyl methacrylate, 100 g of butyl acrylate, 30 g of lauryl methacrylate, 20 g of acrylamide, 40 g of acrylic acid diacetone amide (trade name: diacetone acryl amide, manufactured by Kyowa Hakko Kogyo), 20 g of γ-methacryloxypropyltrimethoxysilane (trade name: KBM503, manufactured by Shin-Etsu Chemical), 10 g of γ-mercaptopropyltrimethoxysilane (trade name: KBM803, manufactured by Shin-Etsu Chemical), and 3 g of 2,2'-azobis(2,4-dimethylvaleronitrile) (trade name: V-65, manufactured by Wako Pure Chemical Industries) as a polymerization initiator. The monomer solution was added dropwise to the toluene in the container while heated at 100° C. over 2 hours in a nitrogen atmosphere, and the mixture was allowed to react additionally for one hour. A polymerization initiator solution in which 1 g of the polymerization initiator described above was dissolved in 20 g of toluene was added dropwise over 10 minutes, and the mixture was allowed to react additionally for 4 hours. Toluene was then removed from the reaction product by distillation under reduced pressure, to give a curable resin B-11, namely, a vinyl polymer having a silicon-containing functional group and an amide bond in the molecule, that was liquid at room temperature.

Preparative Example 12

[Preparation of Curable Resin B-12 Having Silicon-containing Functional Group and Hydroxyl Group in the Molecule]

In a reaction container placed were 100 g of a polyester having allyl groups at both terminals (trade name: SDX-1690, manufactured by Asahi Denka, number-average molecular weight: 3,000) and 11.3 g of 1,5-dimercapt-3-thiapentane (trade name: DMDS, manufactured by Maruzen Chemical). The mixture was heated to 90° C. and kept at the same temperature in a nitrogen atmosphere. Then, a mixture solution of 0.5 g of AIBN and 5 g of toluene was added dropwise thereto over one hour, and the mixture was allowed to react at the same temperature additionally for two hours, to give a reaction product PB-12. Cooling the reaction product PB-12 to 70° C., 18.9 g of γ-glycidoxypropylmethyltrimethoxysilane (trade name: TSL8350, manufactured by GE Toshiba Silicones) and 0.15 g of triethylamine were added thereto, and the mixture was allowed to react at 70° C. for 8 hours in a nitrogen atmosphere, to give a curable resin B-12, namely, a polyoxyalkylene resin having a silicon-containing functional group and a hydroxyl group in the molecule, that was liquid at room temperature.

Preparative Example 13

[Preparation of Curable Resin B-13 Having Silicon-containing Functional Group and Secondary Amino Group in the Molecule]

In a reaction container placed were 100 g of a polyether polyol having primary amino groups at both terminals (trade name: Jeffermine D-4000, manufactured by SunTechno Japan, number-average molecular weight: 4,000) and 11.7 g of γ-acryloxypropyltrimethoxysilane (trade name: KBM5103, manufactured by Shin-Etsu Chemical). The mixture was allowed to react at 50° C. for 10 hours while stirred in a nitrogen atmosphere, to give a curable resin B-13, namely, a polyoxyalkylene resin having a silicon-containing functional group and a secondary amino group in the molecule that was liquid at room temperature.

Preparative Example 14

[Preparation of Curable Resin B-14 Having Silicon-containing Functional Group and Tertiary Amino Group in the Molecule]

In a reaction container placed was 500 g of toluene. Next, a monomer solution was prepared by mixing 100 g of methyl methacrylate, 100 g of butyl acrylate, 30 g of lauryl methacrylate, 20 g of a tertiary amino group-containing acrylic ester compound (trade name: Light Ester DM, manufactured by Kyoeisha Chemical), 20 g of a tertiary amino group-containing acrylic ester compound (trade name: Light Ester DE, manufactured by Kyoeisha Chemical), 20 g of γ-methacryloxypropyltrimethoxysilane (trade name: KBM503, manufactured by Shin-Etsu Chemical), 10 g of γ-mercaptopropyltrimethoxysilane (trade name: KBM803, manufactured by Shin-Etsu Chemical), and 3 g of 2,2'-azobis(2,4-dimethylvaleronitrile) (trade name: V-65, manufactured by Wako Pure Chemical Industries) as a polymerization initiator. The monomer solution was added to the toluene in the reaction container over two hours while heated to 100° C. in a nitrogen atmosphere, and the mixture was allowed to react additionally for one hour. Moreover, a solution in which 1 g of the polymerization initiator described above was dissolved in 20 g of toluene was added dropwise over 10 minutes, and the mixture was allowed to react additionally for four hours. Toluene was then removed from the reaction product by distillation under reduced pressure, to obtain a curable resin B-14, namely, a vinyl polymer having a silicon-containing functional group and a tertiary amino bond in the molecule, that was liquid at room temperature.

Examples 32 to 44 and Comparative Examples 6 and 7

Each of the curable resins B-5 to B-14 obtained in Preparative Examples 5 to 14, and either one of a hydrolytic silyl group-containing polyoxyalkylene (trade name: Syril S303, manufactured by Kaneka Corporation) and a mixture of a hydrolytic silyl group-containing polyoxyalkylene and a hydrolytic silyl group-containing acrylic polymer (trade name: MA440, manufactured by Kaneka Corporation) were placed in a planetary mixer at the composition shown in Table 5; the mixture was kneaded while heated and dehydrated at 100° C. for one hour under reduced pressure and then cooled to room temperature; 5 parts by weight of isoparaffin (trade name: Shellsol TK, manufactured by Shell Chemicals Japan), 1 part by weight of γ-aminopropyltrimethoxysilane (trade name: KBM903, manufactured by Shin-Etsu Chemical) and the curing catalyst shown in Table 5 were added thereto at the blending ratio (parts by weight) shown in Table 5; and the mixture was kneaded for 30 minutes under reduced pressure, to give a curable resin composition, respectively. Each curable resin composition was filled rapidly in a container with a stopper and tightly sealed, which was left for 2 weeks or more. Then, the resin composition was taken out from the container and left at 23° C. in an atmosphere of a relative humidity of 50%, and the skinning period of each curable resin composition was determined in a similar manner to Example 1. Results are summarized in Table 5.

As apparent from Table 5, the curing speed was extremely fast when a boron trifluoride monoethylamine complex was used, in comparison with that when a dialkyltin compound was used, as seen from the results of the curable resins B5 to B14, and the acceleration of curing was common to the curable resins having a silicon-containing functional group and a polar component in the molecule.

TABLE 5

|  | example |  |  |  |  |  |  |  |  |  |  |  |  | comparative |  |
| --- | --- | --- | --- | --- | --- | --- | --- | --- | --- | --- | --- | --- | --- | --- | --- |
|  | 32 | 33 | 34 | 35 | 36 | 37 | 38 | 39 | 40 | 41 | 42 | 43 | 44 | 6 | 7 |
| curable resin B-5 | 100 |  |  |  |  |  |  |  |  |  | 50 | 50 | 50 |  | 50 |
| curable resin B-6 |  | 100 |  |  |  |  |  |  |  |  |  |  |  |  |  |
| curable resin B-7 |  |  | 100 |  |  |  |  |  |  |  |  |  |  |  |  |
| curable resin B-8 |  |  |  | 100 |  |  |  |  |  |  |  |  |  |  |  |
| curable resin B-9 |  |  |  |  | 100 |  |  |  |  |  |  |  |  |  |  |

TABLE 5-continued

|  | example | | | | | | | | | | | | | comparative | |
| --- | --- | --- | --- | --- | --- | --- | --- | --- | --- | --- | --- | --- | --- | --- | --- |
|  | 32 | 33 | 34 | 35 | 36 | 37 | 38 | 39 | 40 | 41 | 42 | 43 | 44 | 6 | 7 |
| curable resin B-10 |  |  |  |  |  | 100 |  |  |  |  |  |  |  |  |  |
| curable resin B-11 |  |  |  |  |  |  | 100 |  |  |  | 50 |  |  |  |  |
| curable resin B-12 |  |  |  |  |  |  |  | 100 |  |  |  |  |  |  |  |
| curable resin B-13 |  |  |  |  |  |  |  |  | 100 |  |  |  |  | 100 |  |
| curable resin B-14 |  |  |  |  |  |  |  |  |  | 100 |  |  |  |  |  |
| Syryl S303*[10] |  |  |  |  |  |  |  |  |  |  |  | 50 |  |  |  |
| MA440*[11] |  |  |  |  |  |  |  |  |  |  |  |  | 50 |  | 50 |
| Shellsol TK*[12] | 5 | 5 | 5 | 5 | 5 | 5 | 5 | 5 | 5 | 5 | 5 | 5 | 5 | 5 | 5 |
| KBM903*[13] | 1 | 1 | 1 | 1 | 1 | 1 | 1 | 1 | 1 | 1 | 1 | 1 | 1 | 1 | 1 |
| boron trifluoride monoethyl | 0.1 | 0.1 | 0.1 | 0.1 | 0.1 | 0.1 | 0.1 | 0.1 | 0.1 | 0.1 | 0.1 | 0.1 | 0.1 |  |  |
| Neostan U-700*[14] |  |  |  |  |  |  |  |  |  |  |  |  |  | 0.1 | 0.1 |
| skinning period | 1'30" | 1'45" | 2'00" | 2'15" | 2'30" | 3'30" | 4'30" | 2'15" | 2'30" | 5'00" | 1'45" | 5'30" | 6'30" | 90'00" | 60'00" |

*[10]trade name of polyoxyalkylene intramolecularly containing the above-described silicon-containing charastaristic group, manufactured by Kaneka Corporation
*[11]trade name of a mixture of polyoxyalkylene having a hydrolyzable siryl radical and acryl polymer having a hydrolyzable siryl radical, manufactured by Kaneka Corporation
*[12]trade name of isoparaffin manufactured by Shell Chemicals Japan
*[13]trade name of γ-aminopropyltrimethoxysilane manufactured by Shin-Etsu Chemical
*[14]trade name of poly(dibutylstannoxane) disilicate compound manufactured by Nitto Kasei As apparent from the results in Tables 1 to 5, it is possible to prepare a curable resin composition that the curing speed is extremely high, by blending a curable resin (A) having a bifunctional or trifunctional silicon-containing functional group (hydrolytic silyl or silanol group) in the molecule and additionally having a bond or a group selected from urethane, thiourethane, urea, thiourea, substituted urea, substituted thiourea, amide and sulfide bonds, and hydroxyl, secondary amino and tertiary amino groups in the molecule, with a Lewis acid or the complex (B) thereof described above as the curing catalyst.

<Effectiveness of Curable Resin Having Urethane Bond, Substituted Urea Bond or Tertiary Amino Group as the Polar Components>

(Preparation of Secondary Amino Group-containing Hydrolytic Alkoxysilane Compound)

The compounds shown in Table 6 were mixed in the amounts shown in Table 6 (parts by weight) in a nitrogen atmosphere, and the mixture was allowed to react at 40° C. for 7 days, to obtian three kinds of silylating agents (reaction products 1-A, 1-B and 1-C), i.e., hydrolytic alkoxysilane compounds having a secondary amino group (—NH—).

TABLE 6

|  | reaction product 1-A | reaction product 1-B | reaction product 1-C |
| --- | --- | --- | --- |
| KBM903(*[15]) | 179.3 | 179.3 |  |
| KBM603(*[16]) |  |  | 222.4 |
| dimethyl maleate | 132.1 |  |  |
| ethyl acrylate |  | 100.1 |  |
| methyl acrylate |  |  | 172.2 |

(*[15])trade name of γ-aminopropyltrimethoxysilane manufactured by Shin-Etsu Chemical
(*[16])trade name of N-β-(aminoethyl)-γ-aminopropyltrimethoxysilane manufactured by Shin-Etsu Chemical (Preparation of Polymerizable Vinyl Monomer Having Isocyanate Group and Thiourethane Bond)

Mixed were 157.2 g of allylmercaptan and 174.2 g of tolylene diisocyanate (manufactured by Sumika Bayer Urethane, trade name "Sumidur T-80") in a nitrogen atmosphere. The mixture was allowed to react at 40° C. for 24 hours, to obtain polymerizable vinyl compound having an isocyanate group and a thiourethane bond (reaction product 2-A).

(Preparation of Polymerizable Vinyl Monomer Having Silicon-containing Functional Group and One of Substituted Urea Bond, Thiourethane Bond, Urethane Bond and Michael-Addition Reaction-Derived Nitrogen Atom Group in the Molecule)

In a nitrogen atmosphere, the compounds shown in Table 7 were mixed respectively in the amounts shown in Table 7 (parts by weight), and the mixture was allowed to react at 50° C. for 7 days, to obtain three kinds of hydrolytic silyl group-containing polymerizable vinyl monomers (reaction products 3-A, 3-B and 3-C). The reaction product 3-A, 3-B and 3-C were all hydrolytic silyl group-containing polymerizable vinyl monomers having a Michael-addition reaction-derived nitrogen-containing atom group in the molecule. Separately, the compounds shown in Table 7 were mixed respectively in the amounts shown in Table 7 (parts by weight) in a nitrogen atmosphere, and the mixture was allowed to react at 40° C. for 24 hours, to obtain two kinds of hydrolytic silyl group-containing polymerizable vinyl monomers (reaction products 3-D and 3-E). The reaction product 3-D was a hydrolytic silyl group-containing polymerizable vinyl monomer having a urethane bond in the molecule, and the reaction product 3-E was a hydrolytic silyl group-containing polymerizable vinyl monomer having a thiourethane bond in the molecule.

TABLE 7

|  | reaction product 3-A | reaction product 3-B | reaction product 3-C | reaction product 3-D | reaction product 3-E |
|---|---|---|---|---|---|
| neopentyl glycol diacrylate | 212 | | | | |
| Light Ester G-201P (*17) | | 214 | | | |
| Light Acrylate TMP-A (*18) | | | 296 | | |
| m-TMI (*19) | | | | 201.3 | |
| reaction product 2-A | | | | | 248.3 |
| reaction product 1-A | 311.4 | | | | 311.4 |
| reaction product 1-B | | 279.4 | | | |
| reaction product 1-C | | | 394.5 | | |
| KBM903 (*20) | | | | 179.3 | |

(*17) trade name of 2-hydroxy-3-acryloyloxypropyl methacrylate manufactured by Kyoei Kagaku Kogyo
(*18) trade name of trimethylolpropane triacrylate manufactured by Kyoei Kagaku Kogyo
(*19) trade name of m-isopropenyl-α,α-dimethylbenzylisocyanate manufactured by Japan SciTec Industry
(*20) trade name of γ-aminopropyltrimethoxysilane manufactured by Shin-Etsu Chemical (Preparation of Curable Resin Having Silicon-containing Functional Group and at Least One Urethane Bond, Substituted Urea Bond or Tertiary Amino Group in the Molecule)

Preparative Examples 15 to 18

The polyol compounds and the isocyanate compounds shown in Table 8 were mixed in the amounts shown in Table 8 (parts by weight), and the mixtures were allowed to react at 90° C. for 10 hours, respectively, while stirred in a nitrogen atmosphere. Then, the reaction products obtained and the silylating agents shown in Table 8 were mixed in the amounts shown in Table 8 (parts by weight), and the mixtures were allowed to react at 90° C. for one hour, respectively, while stirred in a nitrogen atmosphere, to give four kinds of liquid curable resins (curable resins B-15, B-16, B-17 and B-18).

TABLE 8

|  |  | preparative example | | | |
|---|---|---|---|---|---|
|  |  | 15 | 16 | 17 | 18 |
|  | curable resin | B-15 | B-16 | B-17 | B-18 |
| polyol compound | PML-4010 (*21) | 100.00 | | | |
|  | P-28 (*22) | | 100.00 | | |
|  | NS-2400 (*23) | | | 100.00 | |
|  | PTMG2000 (*24) | | | | 100.00 |
| isocyanate compound | Desmodule I (*25) | | 8.35 | 13.89 | 13.89 |
|  | Sumidur T-80 (*26) | 3.47 | | | |
| silylating agent | reaction product 1-A | 6.22 | | | |
|  | reaction product 1-B | | 7.00 | | |
|  | reaction product 1-C | | | 9.86 | |
|  | KBM573 (*27) | | | | 6.39 |

(*21) trade name of polypropylene glycol manufactured by Asahi Glass Urethane
(*22) trade name of polypropylene glycol manufactured by Takeda Chemical Industries
(*23) trade name of polyesther polyol manufactured by Asahi
(*24) trade name of polytetramethylene grycol manufactured by Mitsubishi Chemical Corp.
(*25) trade name of isophorone diisocyanate manufactured by Sumika Bayer Urethane
(*26) trade name of tolylene diisocyanate manufactured by Sumika Bayer Urethane
(*27) trade name of N-phenyl-γ-aminopropyltrimethoxysilane manufactured by Shin-Etsu Chemical (Preparation of Vinyl Polymer Having Silicon-containing Functional Groups)

Preparative Examples 19 to 23

A liquidi monomer mixture was prepared by mixing n-butyl acrylate, a hydrolytic silyl group-containing polymerizable vinyl monomer (reaction product 3-A, 3-B, 3-C, 3-D or 3-E), laurylmercaptan as a chain transfer agent, and 2,2'-azobisisobutylonitrile (AIBN) as a polymerization initiator, respectively, in the amounts shown in Table 9 (parts by weight). In a nitrogen amosphere, the mixture was added dropwise, while heated to 100° C., to a reaction solvent that was the silylated urethane resin shown in Table 9 (reaction product 4-A, 4-B, 4-C or 4-D), over 5 hours. The resulting mixture was then allowed to react for two hours in a nitrogen atmosphere to prodeced a vinyl polymer containing a silicon-containing functional group, consequently obtaining a five kinds of mixture resin solutions (curable resins B-19, B-20, B-21, B-22 and B-23), respectively containing a silicon-containing functional group-containing vinyl polymer and a liquid curable resin of B-15 to B-18.

TABLE 9

|  |  | preparative example | | | | |
|---|---|---|---|---|---|---|
|  |  | 19 | 20 | 21 | 22 | 23 |
|  | curable resin | B-19 | B-20 | B-21 | B-22 | B-23 |
| reaction solvent resin | curable resin B-15 | 1000 | 1000 | | | |
|  | curable resin B-16 | | | 1000 | | |
|  | curable resin B-17 | | | | 1000 | |
|  | curable resin B-18 | | | | | 1000 |
| monomer mixture solution | n-butyl acrylate | 480 | 495 | 480 | 400 | 400 |
|  | reaction product 3-A | 20 | | | | |
|  | reaction product 3-B | | 5 | | | |
|  | reaction product 3-C | | | 20 | | |
|  | reaction product 3-D | | | | 100 | |
|  | reaction product 3-E | | | | | 100 |
|  | lauryl mercaptan | 10 | 10 | 10 | 10 | 10 |
|  | AIBN | 5 | 5 | 5 | 5 | 5 |

Examples 45 to 53 and Comparative Examples 8 and 9

Each of the curable resins B-15 to B-23 was placed in a planetary mixer in the amount (parts by weight) shown in Table 10 and heated and dehydrated at 100° C. for one hour, while kneaded under reduced pressure. It was then cooled to room temperature, and the curing catalyst shown in Table 10 dissolved in 2 parts by weight of a terminal-blocked polyethylene glycol (trade name: Hisolve M™, manufactured by Toho Chemical Industry) was added thereto. The mixture was kneaded for 30 minutes under reduced pressure, to obtain eleven kinds of curable resin compositions.

<Curing Efficiency Test>

Each of the curable resin compositions of Examples 45 to 53 and Comparative Examples 8 and 9 was rapidly filled in a container with a stopper and tightly sealed, and it was left at 23° C. for 2 weeks or more. The composition was taken out from the container, and the skinning period thereof was determined in a similar manner to Example 1 at 23° C. and a relative humidity of 50%. Results are summarized in Tables 10 and 11.

As apparent from the results in Tables 10 and 11, it is also shown in Examples 45 to 53 and Comparative Examples 8 and 9, wherein a curable resin having a urethane bond, a thiourethane bond or a nitrogen-containing atom group was used as the polar component, that the curable resin compositions employing the Lewis acid complex according to the present invention as the curing catalyst had a significantly short skinning period, in comparison with the curable resin compositions employing an organic tin compound.

TABLE 10

|  | example | | | |
|---|---|---|---|---|
|  | 45 | 46 | 47 | 48 |
| curable resin B-15 | 100.0 | | | |
| curable resin B-16 | | 100.0 | | |
| curable resin B-17 | | | 100.0 | |
| curable resin B-18 | | | | 100.0 |
| Hisolve MTM(*28) | 2.0 | 2.0 | 2.0 | 2.0 |
| boron trifluoride piperidine complex | 0.1 | 0.1 | 0.1 | |
| boron trifluoride monoethylamin complex | | | | 0.1 |
| skinning period | 1'30" | 1'10" | 2'10" | 4'10" |

(*28)trade name of a terminal-blocked polyethylene glycol manufactured by Toho Chemical Industry

TABLE 11

|  | example | | | | | comparative example | |
|---|---|---|---|---|---|---|---|
|  | 49 | 50 | 51 | 52 | 53 | 8 | 9 |
| curable resin B-19 | 100.0 | | | | | 100.0 | 100.0 |
| curable resin B-20 | | 100.0 | | | | | |
| curable resin B-21 | | | 100.0 | | | | |
| curable resin B-22 | | | | 100.0 | | | |
| curable resin B-23 | | | | | 100.0 | | |
| Hisolve MTM | 2.0 | 2.0 | 2.0 | 2.0 | 2.0 | 2.0 | 2.0 |
| boron trifluoride piperidine complex | 0.1 | 0.1 | 0.1 | | | | |
| boron trifluoride monoethylamin complex | | | | 0.1 | 0.1 | | |
| Neostan U-700 (*29) | | | | | | 2.0 | |
| Neostan U-220 (*30) | | | | | | | 2.0 |
| skinning period | 3'20" | 2'50" | 2'20" | 4'20" | 5'00" | 15'30" | 17'10" |

(*29) trade name of reaction product of dibutyltin salt and ethyl silicate, manufactured by Nitto Kasei
(*30) trade name of dibutylstannane diacetylacetonate manufactured by Nitto Kasei Example 54 and Comparative Example 10

The curable resin B-19 and a filler (trade name: Silophobic 200, silica aerogel hydrophobilized with dimethylsiloxane, manufactured by Fuji Silysia Chemical) were placed in a planetary mixer in the amounts shown in Table 12 (parts by weight), and the mixture was kneaded under reduced pressure while heated and dehydrated at 100° C. for one hour. It was then cooled to room temperature, and 2 parts by weight of a silane-coupling agent (trade name: KBM-903, manufactured by Shin-Etsu Chemical) and the curing catalyst of Table 12 dissolved in 2 parts by weight of isoparaffin (trade name: Shellsol TK, manufactured by Shell Chemicals Japan) were added thereto in the amounts shown in Table 12 (parts by weight). The mixture was kneaded for 30 minutes under reduced pressure, to obtain two kinds of moisture-curing adhesive compositions.

Each of the moisture-curing adhesive compositions above was filled in a 250-ml aluminum-laminated tube by using a sealed filling machine and left at 23° C. for 2 weeks or more. The composition was then taken out of the tube, and the skinning period and the adhesive strength thereof were determined at 23° C. and a relative humidity 50%. The skinning period was also determined after the aluminum-laminated tube was left in an atmosphere at 50° C. for one month, to evaluate its storage stability. The adhesive strength was determined according to the following method. Results are summarized in Table 12.

<Adhesive Strength>

On the surface (25 mm×25 mm) of a hardhack wood plate (25 mm×100 mm), 0.2 g of a moisture-curing adhesive composition was coated uniformly, and it was rapidly adhered to a hardhack wood, a stainless steel or an acrylic plate (25 mm×25 mm). The composite was aged at 23° C. and a relative humidity of 50 to 60% for 7 days, and the tensile shear adhesive strength thereof (N/mm$^2$) was determined according to JIS K 6850.

TABLE 12

|  |  | example 54 | comparative example 10 |
|---|---|---|---|
| curable resin B-19 | | 100.0 | 100.0 |
| Silophobic 200 | | 10.0 | 10.0 |
| KBM-903 | | 2.0 | 2.0 |
| Shellsol TK | | 2.0 | 2.0 |
| boron trifluoride monoethylamin complex | | 0.1 | |
| Neostan U-220 | | | 2.0 |
| skinning period | after storage at r.t. | 1'10" | 10'00" |
|  | after storage stability test | 1'05" | 15'00" |
| tensile shear adhesive strength (N/mm$^2$) | hardhack wood/hardhack wood | 2.63 | 2.93 |
|  | hardhack wood/stainless steel | 2.85 | 2.53 |
|  | hardhack wood/acryl | 2.34 | 2.43 |

As apparent from Table 12, the moisture-curing adhesive composition of Example 54 employing a boron trifluoride monoethylamine complex had a significantly short skinning period, in comparison with the moisture-curing adhesive composition of Comparative Example 10 employing an organic tin compound. In addition, the moisture-curing adhesive composition of Example 54 had a sufficiently high adhesive strength similar to that of the Comparative Example 10. The composition also had a curing property and hardening quickness even after storage at 50° C. for one month.

Preparative Example 24

In a reaction container placed were 222.4 g of N-β-(aminoethyl)-γ-aminopropyltrimethoxysilane (trade name: KBM603, manufactured by Shin-Etsu Chemical) and 172.2 g of methyl acrylate. The mixture was allowed to react at 80° C. for 10 hours while stirred in a nitrogen atmosphere, to obtain a reaction product SE-24.

In another reaction container placed were 900 g of a polyoxypropylene polyol (trade name: PML4010, manufactured by Asahi Glass Urethane, number-average molecular weight: 10,000), 100 g of a polyoxyethylene-containing polyoxypropylene polyol (trade name: PR5007, manufactured by Asahi Denka) and 50 g of isophorone diisocyanate (trade name:

Desmodule I, manufactured by Sumika Bayer Urethane). The mixture was allowed to react at 90° C. for 8 hours while stirred in a nitrogen atmosphere, to obtain a curable resin PB-24, namely, a polyoxyalkylene resin having an isocyanate group in the molecule. Then 110 g of the reaction product SE-24 was added thereto, and the mixture was then allowed to react at 90° C. for two hours while stirred in a nitrogen atmosphere, to obtain a curable resin B-24, namely, a polyoxyalkylene resin having a urethane bond, a substituted urea bond and a silicon-containing functional group in the molecule, that was liquid at room temperature.

Preparative Example 25

In a reaction container placed were 206.4 g of N-β-(aminoethyl)-γ-aminopropylmethyldimethoxysilane (trade name: KBM602, manufactured by Shin-Etsu Chemical) and 172.2 g methyl acrylate. The mixture was allowed to react at 80° C. for 10 hours while stirred in a nitrogen atmosphere, to obtain a reaction product SE-25.

In another reaction container placed were 900 g of a polyoxypropylene polyol (trade name: PML4010, manufactured by Asahi Glass Urethane, number-average molecular weight: 10,000), 100 g of a polyoxyethylene-containing polyoxypropylene polyol (trade name: PR5007, manufactured by Asahi Denka) and 50 g of isophorone diisocyanate (trade name: Desmodule I, manufactured by Sumika Bayer Urethane). The mixture was allowed to react at 90° C. for 8 hours while stirred in a nitrogen atmosphere, to obtain a curable resin PB-25, namely, a polyoxyalkylene resin having an isocyanate group in the molecule. Then 104 g of the reaction product SE-25 was added thereto, and the mixture was allowed to react at 90° C. for two hours while stirred in a nitrogen atmosphere, to obtain a curable resin B-25, namely, a polyoxyalkylene resin having a urethane bond, a substituted urea bond and a silicon-containing functional group in the molecule that was liquid at room temperature.

(Preparation of Secondary Amino Group-containing Hydrolytic Alkoxysilane Compound)

In a reaction container placed were 100.1 g of ethyl acrylate and 163.3 g of γ-aminopropylmethyldimethoxysilane (trade name: KBM902, manufactured by Shin-Etsu Chemical). The mixture was allowed to react at 23° C. for 7 days while stirred in a nitrogen atmosphere, to obtain a reaction product 4-A. Separately, 200.2 g of ethyl acrylate and 222.4 g of N-β-(aminoethyl)-γ-aminopropyltrimethoxysilane (trade name: KBM603, manufactured by Shin-Etsu Chemical) were placed in another reaction container, and the mixture was allowed to react at 23° C. for 7 days while stirred in a nitrogen atmosphere, to obtain a reaction product 4-B.

(Preparation of Hydrolytic Silyl Group-containing Polymerizable Vinyl Monomer Having Secondary Amino Group)

Placing 100.1 g of ethyl acrylate and 57.1 g of allylamine in a reaction container, the mixture was allowed to react at 50° C. for 7 days while stirred in a nitrogen atmosphere, to obtain a reaction product 5-A.

(Preparation of a Compound Having an Isocyanate Group and a Substituted Urea, Thiourethane or Urethane Bond)

The compounds shown in Table 13 or the reaction product 5-A obtained in Preparative Example 2 and tolylene diisocyanate (trade name: Sumidur T-80, manufactured by Sumika Bayer Urethane) were blended in the amounts shown in Table 13 (parts by weight), and the mixture was allowed to react at 40° C. for 7 days while stirred in a nitrogen atmosphere, to obtain a reaction product 6-A, 6-B, 6-C or 6-D.

TABLE 13

|  | reaction product 6-A | reaction product 6-B | reaction product 6-C | reaction product 6-D |
|---|---|---|---|---|
| allyl alcohol | 58.1 | | | |
| eugenol | | 164.2 | | |
| allylmercaptan | | | 74.1 | |
| reaction product 5-A | | | | 157.2 |
| Sumidur T-80 | 174.2 | 174.2 | 174.2 | 174.2 |

(Preparation of Compound Having an Isocyanate Group and a Substituted Urea, Thiourethane or Urethane Bond)

The compounds shown in Table 14 and the reaction product 4-A or 4-B were blended in the amounts shown in Table 14 (parts by weight), and the mixture was allowed to react at 50° C. for 7 days while stirred in a nitrogen atmosphere, to obtain respectively a reaction product 7-A, 7-B, 7-C, 7-D or 7-E. Separately, the compounds shown in Table 14 and the reaction product 4-A, 4-B, 6-A, 6-B, 6-C or 6-D were mixed in the amounts shown in Table 14 (parts by weight), and the mixture was allowed to react at 40° C. for 1 day while stirred in a nitrogen atmosphere, to obtain reaction products 7-E, 7-F, 7-G, 7-H, 7-I and 7-J.

TABLE 14

|  | reaction product 7-A | reaction product 7-B | reaction product 7-C | reaction product 7-D | reaction product 7-E |
|---|---|---|---|---|---|
| neopentyl glycol diacrylate | 212.0 | | | | |
| 1,6-hexanediol diacrylate | | 220.3 | | | |
| Light Ester G-201P (*31) | | | 214 | | |
| Light Acrylate TMP-A (*32) | | | | 296 | |
| m-TMI (*33) | | | | | 201.3 |
| reaction product 4-A | 263.4 | 263.4 | | | 263.4 |
| reaction product 4-B | | | | | |

|  | reaction product 7-F | reaction product 7-G | reaction product 7-H | reaction product 7-I | reaction product 7-J |
|---|---|---|---|---|---|
| Karenz MOI (*34) | 155.1 | | | | |
| reaction product 6-A | | 232.3 | | | |
| reaction product 6-B | | | 338.4 | | |
| reaction product 6-C | | | | 248.3 | |
| reaction product 6-D | | | | | 331.4 |

TABLE 14-continued

| | | | | | |
|---|---|---|---|---|---|
| reaction product 4-A | | 263.4 | | | 263.4 |
| reaction product 4-B | | | 422.6 | 422.6 | |
| KBM-903 (*35) | 221.4 | | | | |

(*31) trade name of 2-hydroxy-3-acryloyloxypropyl methacrylate manufactured by Kyoeisha Chemical
(*32) trade name of trimethylolpropane triacrylate manufactured by Kyoeisha Chemical
(*33) trade name of m-isopropenyl-α,α-dimethylbenzylisocyanate manufactured by Japan SciTec Industry
(*34) trade name of 2-isocyanateethyl methacrylate manufactured by Showa Denko
(*35) trade name of γ-aminopropyltrimethoxysilane manufactured by Shin-Etsu Chemical (Preparation of Polymerizable Vinyl Monomer Having a Silicon-containing Functional Group and a Hydroxyl Group in the Molecule)

In a reaction container placed were 114 g of allylglycidylether, 196 g of a mercaptosilane compound (trade name; KBM803, Shin-Etsu Chemical) and 1 g of triethylamine. The mixture was allowed to react at 50° C. for 7 days while stirred in a nitrogen atmosphere, to obtain a reaction product 8-A.

Preparative Examples 26 to 39

Using the curable resin B-24 or B-25 obtained in Preparative Example 24 or 25 as a reaction solvent, a mixture solution containing the compounds shown in Tables 15 or 16, the reaction product 7-A to 7-J or reaction product 8-A, laurylmercaptan and AIBN, and γ-methacryloxypropyltrimethoxysilane (trade name: KBM503, manufactured by Shin-Etsu Chemical) in the amounts shown in Tables 15 and 16 (parts by weight) was added dropwise to the reaction solvent over 5 hours, and the mixture was allowed to react at 100° C. for two hours, to obtain each of the resins B-26 to B-39 that were liquid at room temperature.

TABLE 15

| | | preparative example | | | | | | |
|---|---|---|---|---|---|---|---|---|
| | | 26 | 27 | 28 | 29 | 30 | 31 | 32 |
| reaction solvent | curable resin B-15 | 100 | 100 | 100 | 100 | 100 | 100 | 100 |
| monomer mixture solution | n-butyl acrylate | 48 | 48 | 48 | 48 | 48 | 48 | 48 |
| | reaction product 3-A | 2 | | | | | | |
| | reaction product 3-B | | 2 | | | | | |
| | reaction product 3-C | | | 2 | | | | |
| | reaction product 3-D | | | | 2 | | | |
| | reaction product 3-E | | | | | 2 | | |
| | reaction product 3-F | | | | | | 2 | |
| | reaction product 3-G | | | | | | | 2 |
| | reaction product 3-H | | | | | | | |
| | reaction product 3-I | | | | | | | |
| | reaction product 3-J | | | | | | | |
| | reaction product 5-A | | | | | | | |
| | KBM503 | | | | | | | |
| | lauryl mercaptan | 1 | 1 | 1 | 1 | 1 | 1 | 1 |
| | AIBN | 0.5 | 0.5 | 0.5 | 0.5 | 0.5 | 0.5 | 0.5 |

TABLE 16

| | | preparative example | | | | | | |
|---|---|---|---|---|---|---|---|---|
| | | 33 | 34 | 35 | 36 | 37 | 38 | 39 |
| reaction solvent | curable resin B-24 | 100 | 100 | 100 | 50 | 100 | 100 | |
| | curable resin B-25 | | | | | | | 100 |
| monomer mixture solution | n-butyl acrylate | 48 | 48 | 48 | 40 | 48 | 48 | 48 |
| | reaction product 7-A | | | | | | | |
| | reaction product 7-B | | | | | | | |
| | reaction product 7-C | | | | | | | |
| | reaction product 7-D | | | | 10 | | | |
| | reaction product 7-E | | | | | | | |
| | reaction product 7-F | | | | | | | |
| | reaction product 7-G | | | | | | | |
| | reaction product 7-H | 2 | | | | | | |
| | reaction product 7-I | | 2 | | | | | |
| | reaction product 7-J | | | 2 | | | | |
| | reaction product 5-A | | | | | | 2 | |
| | KBM503 | | | | | 2 | | 2 |
| | lauryl mercaptan | 1 | 1 | 1 | 1 | 1 | 1 | 1 |
| | AIBN | 0.5 | 0.5 | 0.5 | 0.5 | 0.5 | 0.5 | 0.5 |

Examples 55 to 70

In a planetary mixer placed was 100 g of one of the curable resins B-24 to B-39 obtained in Preparative Examples 24 to 39 together with 40 g of a methacrylic acid resin powder (trade name: MR-10G, manufactured by Soken Chemical & Engineering). The mixture was kneaded while heated and dehydrated at 100° C. under reduced pressure, and 0.5 g of γ-aminopropyltrimethoxysilane (trade name: KBM903, manufactured by Shin-Etsu Chemical) and 0.2 g of $BF_3$ piperidine complex were added thereto. The mixture was kneaded to obtain a curable resin composition. Each of these curable resin compositions was filled in a container with a stopper and tightly sealed, which was left at 23° C. for 2 weeks or more. The composition was taken out from the container, and hardened at a temperature of 23° C. and a relative humidity of 50 to 60%, while the skinning period thereof was determined. Results are summarized in Table 17.

In addition, 0.2 g of the moisture-curing adhesive composition was coated uniformly on a stainless steel plates (SUS3042B, dimensions: 25 mm×100 mm), which were provided as adherend, and they were joined and cured at 23° C. and a relative humidity of 50 to 60% for 7 days. The tensile shear adhesive strength thereof (N/mm$^2$) was determined according to JIS K 6850.

Comparative Examples 11 and 12

In a planetary mixer placed and mixed was 100 g of one of the curable resins B-24 and B-25 together with 40 g of a methacrylic acid resin powder (trade name: MR-10G, manufactured by Soken Chemical & Engineering). The mixture was kneaded while heated and dehydrated at 100° C. under reduced pressure, and 0.5 g of γ-aminopropyltrimethoxysilane (trade name: KBM903, manufactured by Shin-Etsu Chemical) and 0.2 g of a dialkyltin bis(triethoxy silicate) (trade name: Neostan U-303, manufactured by Nitto Kasei Co., Ltd.) were added thereto. The mixture was kneaded to obtain a curable resin composition. Each of these curable resin compositions was filled in a container with a stopper and tightly sealed, which was left at 23° C. for 2 weeks or more. The composition was taken out from the container, and the skinning period thereof was determined at a temperature of 23° C. and a relative humidity of 50 to 60%. Results are shown in Table 17.

In addition, 0.2 g of the moisture-curing adhesive composition was coated uniformly on stainless steel plates (SUS3042B, dimension: 25 mm×100 mm), which were provided as adherend, and they were joined and cured at 23° C. and a relative humidity of 50 to 60% for 7 days. The tensile shear adhesive strength thereof (N/mm) was determined according to JIS K 6850.

TABLE 17

| | curable resin | skinning period (min.) | tensile shear adhesive strength (N/mm$^2$) |
|---|---|---|---|
| example 55 | B-24 | 2-3 | 2.51 |
| example 56 | B-25 | 20-30 | 2.29 |
| example 57 | B-26 | 3-5 | 2.45 |
| example 58 | B-27 | 3-5 | 2.33 |
| example 59 | B-28 | 3-5 | 2.37 |
| example 60 | B-29 | 3-5 | 2.31 |
| example 61 | B-30 | 2-4 | 2.4 |
| example 62 | B-31 | 2-4 | 2.42 |
| example 63 | B-32 | 2-4 | 2.39 |
| example 64 | B-33 | 2-4 | 2.31 |
| example 65 | B-34 | 2-4 | 2.33 |
| example 66 | B-35 | 2-4 | 2.44 |
| example 67 | B-36 | 2-4 | 2.52 |
| example 68 | B-37 | 10-15 | 2.34 |
| example 69 | B-38 | 8-13 | 2.49 |
| example 70 | B-39 | 40-60 | 2.56 |
| comparative example 11 | B-24 | 25-35 | 2.49 |
| comparative example 12 | B-25 | 120 or more | 2.31 |

From comparison between Examples 55 and 56 and Comparative Examples 11 and 12 shown in Table 17, it is obviously understood that the hardening speed is quite high when a boron trifluoride piperidine complex was used than when a dialkyltin compound was used, as the curing catalyst for the curable resins B-24 and B-25 having a silicon-containing functional group and a polar component. The acceleration of curing by the boron trifluoride piperidine complex was observed independent of whether the silicon-containing functional group was a bifunctional group (curable resin B-25) or a trifunctional group (curable resin B-24), and in particular, presence of urethane bond, substituted urea bond and secondary amino group as the polar components in the molecule is effective in increasing the effect, as shown in Examples 55 to 56. It is probably because the polar component in curable resin withdraws the $BF_3$ piperidine complex in the neighborhood of the polar components and increase reaction frequency, thus cuasing increase in the curing speed.

Example 71 and Comparative Example 13

Under reduced pressure, 100 parts by weight of the curable resin B-24 and 50 parts by weight of calcium carbonate (trade name: Hakuenka CCR, manufactured by Shiraishi Kogyo) were heated and dehydrated at 100° C. and then cooled to room temperature. Then, 5 parts by weight of an epoxy resin curing agent (trade name: Anchormine K-54, manufactured by Air Products) and 3 parts by weight of γ-aminopropyltrimethoxysilane (trade name: KBM903, manufactured by Shin-Etsu Chemical), and 0.1 part by weight of boron trifluoride piperidine complex (Example 71) or 1.5 parts by weight of an organic tin compound (trade name: Stan No. 918) (Comparative Example 13) were added thereto, and the mixture was kneaded under reduced pressure for 30 minutes, to give agents A, respectively. Separately, 50 parts by weight of a bisphenol A epoxy resin (trade name: Epikote 828, manufactured by Japan Epoxy Resins) and 40 parts by weight of calcium carbonate (trade name: Hakuenka CCR) were kneaded to prepare an agent B. The agents A and the agent B were filled respectively in 250 ml aluminum-laminated tubes by using a sealed filling machine and left at 23° C. for 2 weeks or more. Then, the agents A were mixed, respectively, with the agent B at a ratio of 2:1 (weight ratio), to give two kinds of curable resin composition. The skinning periods of the curable resin compositions were determined in a similar manner to Examples 55 to 70. The results are summarized in Table 18.

Example 72 and Comparative Example 14

Under reduced pressure, 100 parts by weight of the curable resin B-24, 50 parts by weight of a bisphenol A epoxy resin (trade name: Epikote 828, manufactured by Japan Epoxy Resins) and 40 parts by weight of calcium carbonate (trade name: Hakuenka CCR, manufactured by Shiraishi Kogyo) were heated and dehydrated at 100° C. and cooled to room temperature. Then 15 parts by weight of a ketimine compound (trade name: Versamine 15N, manufactured by Cognis Japan), 3 parts by weight of γ-glycidoxypropyltrimethoxysilane (trade name: KBM403, manufactured by Shin-Etsu Chemical), and 0.1 part by weight of boron trifluoride piperidine complex (Example 72) or 1.5 parts by weight of an organic tin compound (trade name: Stan No. 918)(Comparative Example 14) were added thereto, and the mixture was blended for 30 minutes under reduced pressure, to obtain two kinds of curable resin compositions, major agents. The curable resin compositions were filled respectively in 250 ml aluminum-laminated tubes by using a sealed filling machine and left at 23° C. for 2 weeks or more. The skinning speed thereof was determined in a similar manner to Examples 55 to 70. Results are summarized in Table 18.

Example 73 and Comparative Example 15

Under reduced pressure, 100 parts by weight of the curable resin B-31 was heated and dehydrated at 100° C. and cooled to room temperature. Then 5 parts by weight of an epoxy resin curing agent (trade name: Anchormine K-54), and 0.1 part by weight of a boron trifluoride piperidine complex (Example 73) or 1.5 parts by weight of an organic tin compound (trade name: Stan No. 918)(Comparative Example 15) were added thereto, and the mixture was kneaded for 30 minutes under reduced pressure, to obtain agents A. The agents A and a bisphenol A epoxy resin (trade name: Epikote 828) were filled respectively in 250 ml aluminum-laminated tubes by using a sealed filling machine and left at 23° C. for 2 weeks or morel. The agents A were mixed with the bisphenol A epoxy resin, respectively, at a ratio of 2:1 (weight ratio), to obtain curable resin composition of Example 73 or Comparative Example 15. The skinning periods of the curable resin compositions were determined in a similar manner to Examples 55 to 70. Results are summarized in Table 18.

Example 74 and Comparative Example 16

Under reduced pressure, 100 parts by weight of the curable resin B-31, 50 parts by weight of a bisphenol A epoxy resin (trade name: Epikote 828) and 40 parts by weight of calcium carbonate (trade name: Hakuenka CCR) were heated and dehydrated at 100° C. and cooled to room temperature. Then 15 parts by weight of a ketimine compound (trade name: Versamine 15N, manufactured by Cognis Japan), 3 parts by weight of γ-glycidoxypropyltrimethoxysilane (trade name: KBM403, manufactured by Shin-Etsu Chemical), and 0.1 part by weight of boron trifluoride piperidine complex (Example 74) or 1.5 parts by weight of an organic tin compound (trade name: Stan No. 918) (Comparative Example 16) were added thereto, and the mixture was kneaded for 30 minutes under reduced pressure, to obtain two kinds of curable resin compositions. Each of the curable resin compositions was filled in a 250 ml aluminum-laminated tube by using a sealed filling machine and left at 23° C. for 2 weeks or more. The skinning period thereof was determined in a similar manner to Examples 55 to 70. Results are summarized in Table 18.

TABLE 18

| | example | | | | comparative example | | | |
|---|---|---|---|---|---|---|---|---|
| | 71 | 72 | 73 | 74 | 13 | 14 | 15 | 16 |
| skinning period (min) | 10 | 12 | 11 | 13 | 13 | 15 | 13 | 15 |

As apparent from the results in Table 18, the skinning speed of the curable resin compositions prepared by using the curable resin B-24 obtained in Preparative Example 24 (Examples 71 and 72) and the curable resin compositions prepared by using the curing resin B-31 obtained in Preparative Example 31 (Examples 73 and 74) was not significantly different from the skinning speed of the curable resin compositions prepared in Comparative Examples 13 to 16, which used a normal amount of an organic tin compound (Stan No. 918) as the curing catalyst, indicating that a small amount of the boron trifluoride piperidine complex has a catalytic hardening activity equivalent to that of a larger amount of the organic tin compound. It is probably because the $BF_3$ piperidine complex is located closer to the polar components on the main chain of the resin molecule than the organic tin compound and thus become more reactive, increasing the curing speed of curable resin.

<Effectiveness of the Curable Resin Having Silicon-containing Functional Group and Hydroxyl Group in the Molecule>

Preparative Example 40

In a reaction container placed were 100 g of 1,5-dimercapto-3-thiapentane (trade name: DMDS, manufactured by Maruzen Petrochemical), 80 g of γ-glycidoxypropyltrimethoxysilane (trade name: TSL8350, manufactured by GE Toshiba Silicones) and 1.0 g of 2,4,6-tris(dimethylaminomethyl)phenol. The mixture was allowed to react at 50° C. for 7 days reaction in a nitrogen atmosphere, and various unreacted components are removed under reduced pressure, to obtain a reaction product PB-40.

In a reaction container placed were 100 g of a polyoxyalkylene having allyl groups at both terminals (trade name: SDX-1690, manufactured by Asahi Denka, number-average molecular weight 3,000) and 25 g of the reaction product PB-40. The mixture was heated to 90° C. in a nitrogen atmosphere and kept at the same temperature, and a mixture solution of 1 g of 2,2'-azobisisobutylonitrile (AIBN) and 5 g of toluene was added dropwise thereto over 2 hours. The mixture was allowed to react at the same temperature additionally for one hour, to obtain a curable resin B-40 that was liquid at room temperature.

Preparative Example 41

In a reaction container placed were 100 g of 1,8-dimercapto-3,6-dioxaoctane (trade name: DMDO, manufactured by Maruzen Petrochemical), 80 g of γ-glycidoxypropyltrimethoxysilane (trade name: TSL8350, manufactured by GE Toshiba Silicones,) and 1.0 g of 2,4,6-tris(dimethylaminomethyl)phenol. The mixture was allowed to react at 40° C. for 10 days in a nitrogen atmosphere, and various unreacted components were removed under reduced pressure, to obtain a reaction product PB-41.

In a reaction container placed were 100 g of a polyoxyalkylene having allyl groups at both terminals (trade name: SDX-1690) and 26 g of the reaction product PB-41. The mixture was heated to 90° C. in a nitrogen atmosphere and kept at the same temperature, and a mixture solution of 5 g of AIBN and 20 g of toluene was added dropwise thereto over 2 hours. The mixture was allowed to react at the same temperature additionally for one hour, to obtain a curable resin B-41 that was liquid at room temperature.

Preparative Example 42

In a reaction container placed were 100 g of a polyoxyalkylene having ally groups at both terminals (trade name: SDX-1690) and 11 g of 1,8-dimercapto-3,6-dioxaoctane (trade name: DMDO). The mixture was heated to 90° C. in a nitrogen atmosphere and kept at the same temperature, and a mixture solution of 1 g of AIBN and 5 g of toluene was added dropwise thereto over 2 hours. The mixture was allowed to react at the same temperature additionally for one hour, to give a reaction product PB-42.

After the reaction product PB-42 was cooled to 70° C., 18.9 g of γ-glycidoxypropylmethyltrimethoxysilane (trade name: TSL8350, manufactured by GE Toshiba Silicones) and 0.2 g of 2,4,6-tris(dimethylaminomethyl)phenol were added thereto, and the mixture was allowed to react at 70° C. for 10 hours in a nitrogen atmosphere, to obtain a curable resin B-42 that was liquid at room temperature.

Preparative Example 43

In a reaction container placed was 500 g of a polyolefin polyol (trade name: Polytail HA, manufactured by Mitsubishi Chemical Corp.). Then, 28% by weight sodium methoxide/methanol solution was added thereto in such an amount that the mole number of sodium atom was 1.05 times of the mole number of the hydroxyl groups contained in one polyolefin polyol molecule, and the mixture was stirred at 120° C. for 30 minutes. Then, methanol was removed under reduced pressure, and 36 g of allyl chloride was added thereto. The mixture was allowed to react for one hour. Various unreacted components were removed by distillation under a reduced pressure and the by-product inorganic materials and others were removed, and the residue was purified to obtain a terminal-allylated hydrocarbon polymer PB-43.

In a reaction container placed were 100 g of the terminal allylated hydrocarbon polymer PB-43 and 16 g of a mercaptosilane compound (trade name: KBM803, Shin-Etsu Chemical). The mixture was heated to 90° C. in a nitrogen atmosphere and kept at the same temperature, and a mixture solution of 1 g of AIBN and 5 g of toluene was added dropwise thereto over 2 hours. The mixture was allowed to react at the same temperature additionally for one hour, to obtain a reaction product PB-43.

Preparative Example 44

In a reaction container placed were 100 g of 1,2-ethanedithiol, 248 g of γ-glycidoxypropyltrimethoxysilane (trade name: TSL8350, manufactured by GE Toshiba Silicones) and 1.0 g of triethylamine. The mixture was allowed to react at 50° C. for 7 days in a nitrogen atmosphere, and unreacted 1,2-ethanedithiol was removed by distillation at 100° C. under reduced pressure, to obtain a reaction product PB-44.

In a reaction container placed were 100 g of a polyoxyalkylene having ally groups at both terminals (trade name: SDX-1690) and 14 g of the reaction product PB-44. The mixture was heated to 90° C. in a nitrogen atmosphere and kept at the same temperature, and a mixture solution of 1 g of AIBN and 5 g of toluene was added dropwise thereto over 2 hours. The mixture was allowed to react at the same temperature additionally for one hour, to obtain a reaction product PB-44.

Examples 75 to 89

In a planetary mixer placed were 100 g of each of the curable resins B-40 to B-44 obtained in Preparative Examples 40 to 44 and 40 g of a methacrylic acid resin powder (trade name: MR-10G, manufactured by Soken Chemical & Engineering). The mixture was kneaded while heated and dehydrated at 100° C. under reduced pressure, and 0.5 g of γ-aminopropyltrimethoxysilane (trade name: KBM903, manufactured by Shin-Etsu Chemical) and 0.2 g of a $BF_3$ piperidine complex were added thereto and the mixture was kneaded, to obtain each of the curable resin compositions. These curable resin compositions were filled in a container with a stopper and tightly sealed, respectively, and left at 23° C. for 2 weeks or more. The composition was taken out from the container and hardened at a temperature of 23° C. and a relative humidity of 50 to 60%, and the skinning period thereof was determined. Results are summarized in Table 19.

Comparative Example 16

In a planetary mixer placed were 100 g of the curable resin B-40 and 40 g of a methacrylic acid resin powder (trade name: MR-10G, manufactured by Soken Chemical & Engineering). The mixture was kneaded while heated and dehydrated at 100° C. under reduced pressure, and 0.5 g of γ-aminopropyltrimethoxysilane (trade name: KBM903, manufactured by Shin-Etsu Chemical) and 0.2 g of a dialkyltin bis(triethoxy silicate) (trade name: Neostan U-303, manufactured by Nitto Kasei) were added thereto. The mixture was kneaded to obtain a curable resin composition. The curable resin composition was filled in a container with a stopper and tightly sealed, which was left at 23° C. for 2 weeks or more. It was then taken out from the container and hardened at a temperature of 23° C. and a relative humidity of 50 to 60%, and the skinning period thereof was determined. Results are summarized in Table 19.

TABLE 19

|  | curable resin | skinning period (min) |
| --- | --- | --- |
| example 75 | B-40 | 2-4 |
| example 76 | B-41 | 2-4 |
| example 77 | B-42 | 3-5 |
| example 78 | B-43 | 4-6 |
| example 79 | B-44 | 2-4 |
| comparative example 16 | B-40 | 25-35 |

As apparent from Table 19, the curable resin in the curable resin composition obtained in each Example has a hydroxyl group, and the drastic increase in curing speed compared to that of the commonly used tin catalyst seems to be the result of the $BF_3$ piperidine complex withdrawn to the polar groups.

<Effectiveness of Curable Resin Having a Silicon-containing Functional Group and a Sulfide or Thiourethane Bond in the Molecule>

Preparative Example 45

In a nitrogen atmosphere, 222 g of isophorone diisocyanate (IPDI) was placed in a reaction container and 222 g of N-ethyl-aminoisobutyltrimethoxysilane (trade name:

A-link15, manufactured by Nippon Unicar Co., Ltd.) was added dropwise thereto while stirred. After finishing the dropwise addition, the mixture was allowed to react at 80° C. for two hours, to obtain a reaction product PB-45-A.

In another reaction container placed was 77 g of 1,5-dimercapto-3-thiapentane (trade name: DMDS, manufactured by Maruzen Petrochemical). It was heated to 90° C. and kept at the same temperature in a nitrogen atmosphere. Then, 222 g of the reaction product PB-45-A described above was added dropwise thereto while stirred, and the mixture was allowed to react at 90° C. for 10 hours, to give a reaction product PB-45-B.

Separately, 200 g of a polyoxyalkylene having ally groups at both terminals (trade name: SDX-1690, manufactured by Asahi Denka, number-average molecular weight: 3,000) and 68 g of the reaction product PB-45-B were placed in another reaction container and heated to 90° C. in a nitrogen atmosphere. A mixture solution of 2 g of 2,2'-azobisisobutylonitrile (AIBN) and 10 g of toluene was added dropwise thereto over 3 hours. The mixture was allowed to react at the same temperature additionally for one hour, to obtain a curable resin B-45 that was liquid at room temperature.

Preparative Example 46

In a nitrogen atmosphere, 98 g of ethyl acrylate and 179 g of γ-aminopropyltrimethoxysilane (trade name: KBM903, manufactured by Shin-Etsu Chemical) was mixed in a reaction container and allowed to react at 23° C. for 7 days, to obtain a reaction product PB-46-A.

In a nitrogen atmosphere, 80 g of 2,4-tolylene diisocyanate (TDI) was placed in another reaction container and 138 g of the reaction product PB-46-A obtained above was added dropwise thereto while the mixture was stirred. After dropwise addition, the mixture was allowed to react at 80° C. for two hours, to obtain a reaction product PB-46-B.

Separately, in a nitrogen atmosphere, 77 g of 1,5-dimercapto-3-thiapentane (trade name: DMDS, manufactured by Maruzen Petrochemical) was placed in another reaction container and heated to 90° C. and kept at the same temperature, and 110 g of the reaction product PB-46-B obtained above was dropwise added thereto. The mixture was allowed to react at 90° C. for 10 hours to obtain a reaction product PB-46-C.

Moreover, 200 g of a polyoxyalkylene having ally groups at both terminals (trade name: SDX-1690, manufactured by Asahi Denka, number-average molecular weight: 3,000) and 55 g of the reaction product PB-46-C obtained above were placed in another reaction container and heated to 90° C. and kept at the same temperature in a nitrogen atmosphere. A mixture solution of 2 g of AIBN and 10 g of toluene was added dropwise thereto over 3 hours. The mixture was allowed to react at the same temperature additionally for one hour, to obtain a curable resin B-46 that was liquid at room temperature.

Preparative Example 47

In a reaction container, 200.0 g of ethyl acrylate and 220.0 g of N-β-(aminoethyl)-γ-aminopropyltrimethoxysilane (trade name: KBM603, manufactured by Shin-Etsu Chemical) were mixed and allowed to react at 23° C. for 7 days in a nitrogen atmosphere, to obtain a reaction product PB-47-A.

In another reaction container, 210.0 g of the reaction product PB-47-A obtained above was added to 80.0 g of TDI, while the mixture was stirred in a nitrogen atmosphere. After dropwise addition, the mixture was allowed to react at 80° C. for two hours, to obtain a reaction product PB-47-B.

Separately, 77 g of 1,5-dimercapto-3-thiapentane (trade name: DMDS, manufactured by Maruzen Petrochemical) was placed in another reaction container. It was heated to 90° C. and kept at the same temperature in a nitrogen atmosphere, and 290.0 g of the reaction product PB-47-B obtained above was added dropwise while the mixture was stirred. The mixture was allowed to react at 90° C. for 10 hours, to obtain a reaction product PB-47-C.

Additionally, 200 g of a polyoxyalkylene (trade name: SDX-1690, manufactured by Asahi Denka, number-average molecular weight: 3,000) and 77.0 g of the reaction product PB-47-C described above were placed in another reaction container and heated to 90° C., with kept at the same temperature in a nitrogen atmosphere. A mixture solution of 2 g of AIBN and 10 g of toluene 10 g was added dropwise thereto over 3 hours. The mixture was allowed to react at the same temperature additionally for one hour, to obtain a curable resin B-47 that was liquid at room temperature.

Preparative Example 48

In a reaction container placed were 2.0 g of dimethyl maleate, 86.5 g of phenylmaleimide and 179 g of γ-aminopropyltrimethoxysilane (trade name: KBM903, manufactured by Shin-Etsu Chemical). The mixture was allowed to react at 23° C. for 7 days in a nitrogen atmosphere, to obtain a reaction product PB-48-A.

In another reaction container, 169 g of the reaction product PB-48-A above was added dropwise to 87 g of TDI in a nitrogen atmosphere while the mixture was stirred. After dropwise addition, the mixture was allowed to react at 80° C. for two hours, to obtain a reaction product PB-48-B.

Separately, 36 g of 1,5-dimercapto-3-thiapentane (trade name: DMDS, manufactured by Maruzen Petrochemical) was placed in another reaction container and heated to 90° C. and kept at the same temperature in a nitrogen atmosphere. Then 128 g of the reaction product PB-48-B described above was added dropwise thereto and allowed to react at 90° C. for 10 hours while the mixture was stirred, to obtain a reaction product PB-48-C.

Further, 200 g of a polyoxyalkylene (trade name: SDX-1690, manufactured by Asahi Denka, number-average molecular weight: 3,000) and 68 g of the reaction product PB-48-C described above were placed in a separate reaction container and heated to 90° C. and kept at the same temperature in a nitrogen atmosphere. Then a mixture solution of 2 g of AIBN and 10 g of toluene was added dropwise over 3 hours, and the mixture was allowed to react at the same temperature additionally for one hour, to obtain a curable resin B-48 that was liquid at room temperature.

Preparative Example 49

In a reaction container, 117 g of γ-acryloxypropyltrimethoxysilane (trade name: KBM5103, manufactured by Shin-Etsu Chemical) and 89.5 g of γ-aminopropyltrimethoxysilane (trade name: KBM903, manufactured by Shin-Etsu Chemical) were placed and allowed to react at 23° C. for 7 days while stirred in a nitrogen atmosphere, to obtain a reaction product PB-49-A.

In a nitrogen atmosphere, 207 g of the reaction product PB-49-A above was added dropwise to 87 g of TDI in a separate reaction container while the mixture was stirred. After dropwise addition, the mixture was allowed to react at 80° C. for two hours reaction, to obtain a reaction product PB-49-B.

Separately, 36 g of 1,5-dimercapto-3-thiapentane (trade name: DMDS, manufactured by Maruzen Petrochemical) was placed in another reaction container and heated to 90° C. and kept at the same temperature in a nitrogen atmosphere. Then 137 g of the reaction product PB-49-B above was added dropwise while stirred. The mixture was allowed to react at 90° C. for 10 hours, to obtain a reaction product PB-49-C.

Further, 200 g of a polyoxyalkylene (trade name: SDX-1690, manufactured by Asahi Denka, number-average molecular weight: 3,000) and 85 g of the reaction product PB-49-C described above were placed in a separate reaction container, and heated to 90° C. and kept at the same temperature in a nitrogen atmosphere. Then a mixture solution of 2 g of AIBN and 10 g of toluene was added dropwise over 3 hours, and the mixture was allowed to react at the same temperature additionally for one hour, to obtain a curable resin B-49 that was liquid at room temperature.

Preparative Example 50

In a nitrogen atmosphere, 86 g of methyl acrylate was added dropwise to 77 g of 2-amino ethanethiol placed in a reaction container, while the mixture was stirred. After dropwise addition, the mixture was allowed to react at 40° C. for 48 hours. Then 203 g of γ-isocyanatopropyltrimethoxysilane (trade name: Y-5187, manufactured by Nippon Unicar) was added thereto, and the mixture was allowed to react at 23° C. for 7 days in a nitrogen atmosphere while the mixture was stirred, to obtain a reaction product PB-50.

In another reaction container, 300 g of a polyoxyalkylene having ally groups at both terminals (number-average molecular weight: 8,000) and 25 g of the reaction product PB-50 above were placed and heated to 90° C. and kept at the same temperature in a nitrogen atmosphere. Then a mixture solution of 2 g of AIBN and 10 g of toluene was added dropwise over 3 hours. The mixture was allowed to react at the same temperature additionally for one hour, to obtain a curable resin B-50 that was liquid at room temperature.

Preparative Example 51

In a nitrogen atmosphere, 154 g of 1,5-dimercapto-3-thiapentane (trade name: DMDS, manufactured by Maruzen Petrochemical) was placed in a reaction container, and 100 g of γ-isocyanatopropyltrimethoxysilane (trade name: Y-5187, manufactured by Nippon Unicar) was added dropwise thereto while the mixture was stirred. The mixture was allowed to react at 50° C. additionally for 10 days, and the unreacted DMDS was removed by distillation at 120° C. under reduced pressure, to obtain a reaction product PB-51.

In a nitrogen atmosphere, 300 g of a polyoxyalkylene having ally groups at both terminals (number-average molecular weight: 8,000) and 25 g of the reaction product PB-51 above were placed in another reaction container, and heated to 90° C. and kept at the same temperature. Then a mixture solution of 2 g of AIBN and 10 g of toluene was added dropwise over 3 hours, and the mixture was allowed to react at the same temperature additionally for one hour, to obtain a curable resin B-51 that was liquid at room temperature.

Preparative Example 52

In a nitrogen atmosphere, 86 g of methyl acrylate was added dropwise to 57 g of allylamine placed in a reaction container. After dropwise addition, the mixture was allowed to react at 40° C. for 48 hours, to obtain a reaction product PB-52-A.

In a nitrogen atmospher, 128 g of N-phenyl-γ-aminopropyltrimethoxysilane (trade name: KBM573, manufactured by Shin-Etsu Chemical) was added dropwise to 111 g of IPDI placed in a separate reaction container while the mixture was stirred. After dropwise addition, the mixture was allowed to react at 50° C. for 10 days, to obtain a reaction product PB-52-B.

Additionally, 72 g of the reaction product PB-52-B above was added dropwise to 238 g of the reaction product PB-52-A above placed in a separate reaction container in a nitrogen atmosphere. The mixture was allowed to react at 50° C. additionally for 7 days, to obtain a reaction product PB-52-C.

Separately, 62 g of the reaction product PB-52-C above and 15 g of 1,5-dimercapto-3-thiapentane (trade name: DMDS, manufactured by Maruzen Petrochemical) were placed in a separate reaction container and mixed in a nitrogen atmosphere. The mixture was heated to 90° C. and kept at the same temperature, and a mixture solution of 2 g of AIBN and 10 g of toluene was added dropwise thereto over 3 hours, to obtain a reaction product PB-52-D.

Further, 300 g of a polyoxyalkylene having ally groups at both terminals (number-average molecular weight: 8,000) and 55 g of the reaction product PB-52-D above were placed in a separate reaction container. The mixture was heated to 90° C. and kept at the same temperature, and a mixture solution of 2 g of AIBN and 10 g of toluene was added dropwise over 3 hours in a nitrogen atmosphere. The mixture was allowed to react at the same temperature additionally for one hour, to obtain a curable resin B-52 that was liquid at room temperature.

Preparative Example 53

In a nitrogen atmosphere, 400 g of a polyoxyalkylene having ally groups at both terminals (number-average molecular weight 8,000) and 21 g of γ-mercaptopropyltrimethoxysilane (trade name: KBM803, manufactured by Shin-Etsu Chemical trade name) were placed in a reaction container and heated to 90° C. Then a mixture solution of 2 g of AIBN and 10 g of toluene was added dropwise thereto over 2 hours. The mixture was allowed to react at the same temperature additionally for one hour, to obtain a curable resin B-53 that was liquid at room temperature.

Preparative Example 54

In a nitrogen atmosphere, 114 g of allyl glycidyl ether and 221 g of N-ethyl-aminoisobutyltrimethoxysilane (trade name: A-link15, manufactured by Nippon Unicar) were placed in a reaction container and allowed to react at 50° C. for 14 days, to obtain a reaction product PB-54-A.

A 160 g portion of the reaction product PB-54-A above was mixed with 154 g of 1,5-dimercapto-3-thiapentane (trade name: DMDS, manufactured by Maruzen Petrochemical), and the mixture was heated to 90° C. and kept at the same temperature. Then a mixture solution of 2 g of AIBN and 10 g of toluene was added dropwise thereto over 3 hours, and unreacted 1,5-dimercapto-3-thiapentane was remove by distillation under reduced pressure, to obtain a reaction product PB-54-B.

In a reaction container placed were 300 g of a polyoxyalkylene having ally groups at both terminals (number-average molecular weight 8,000) and 32 g of the reaction product PB-54-B above. The mixture was heated to 90° C. and kept at the same temperature in a nitrogen atmosphere. Then a mixture solution of 2 g of AIBN and 10 g of toluene was added dropwise over 3 hours. The mixture was allowed to react at the same temperature additionally for one hour, to obtain a curable resin B-54 that was liquid at room temperature.

Preparative Example 55

In a nitrogen atmosphere, 114 g of allyl glycidyl ether, 196 g of γ-mercaptopropyltrimethoxysilane (trade name: KBM803, manufactured by Shin-Etsu Chemical) and 1 g of an epoxy resin curing agent (trade name: Anchormine K54, manufactured by Air Products) were placed in a reaction container and allowed to react at 50° C. for 7 days, to obtain a reaction product PB-55-A.

In another reaction container, 300 g of a polyoxyalkylene having ally groups at both terminals (number-average molecular weight 8,000) and 24 g of 1,5-dimercapto-3-thiapentane (trade name: DMDS, manufactured by Maruzen Petrochemical) were placed and heated to 90° C., keeping at the same temperature in a nitrogen atmosphere. Then a mixture solution of 2 g of AIBN and 10 g of toluene was added dropwise over 3 hours. The mixture was allowed to react at the same temperature additionally for one hour, to obtain a reaction product PB-55-B.

Then 22 g of the reaction product PB-55-A and 300 g of the reaction product PB-55-B were mixed and stirred, and the mixture was heated to 90° C. and kept at the same temperature. Then a mixture solution of 2 g of AIBN and 10 g of toluene was added dropwise thereto over 3 hours. The mixture was heated at 90° C. and allowed to react at the same temperature additionally for one hour, to give a curable resin B-55 that was liquid at room temperature.

Preparative Example 56

In a nitrogen atmosphere, 86 g of methyl acrylate was added dropwise to 57 g of allylamine placed in a reaction container. After dropwise addition, the mixture was allowed to react at 40° C. for 48 hours, to obtain a reaction product PB-56-A.

In a nitrogen atmosphere, 72 g of the reaction product PB-56-A was placed in a container, and 118 g of γ-glycidoxypropyltrimethoxysilane (trade name: KBM403, manufactured by Shin-Etsu Chemical) was added dropwise thereto while stirred. After dropwise addition, the mixture was allowed to react at 50° C. for 10 days, to obtain a reaction product PB-56-B.

In a nitrogen atmosphere, 154 g of 1,5-dimercapto-3-thiapentane (trade name: DMDS, manufactured by Maruzen Petrochemical) and 180 g of the reaction product PB-56-B were stirred and mixed in a reaction container, and heated to 90° C. and kept at the same temperature. A mixture solution of 2 g of AIBN and 10 g of toluene was added dropwise thereto over 3 hours, and unreacted 1,5-dimercapto-3-thiapentane was removed by distillation under reduced pressure, to obtain a reaction product PB-56-C.

In a separate reaction container, 300 g of a polyoxyalkylene having ally groups at both terminals (number-average molecular weight: 8,000) and 35 g of the reaction product PB-56-C were placed, and the mixture was heated to 90° C. and kept at the same temperature in a nitrogen atmosphere. Then a mixture solution of 2 g of AIBN and 10 g of toluene was added dropwise over 3 hours. The mixture was allowed to react at the same temperature additionally for one hour, to obtain a curable resin B-56 that was liquid at room temperature.

Preparative Example 57

A monomer solution was prepared by mixing 100 g of butyl acrylate, 10 g of lauryl methacrylate, 30 g of γ-methacryloxypropyltrimethoxysilane (trade name: KBM503, manufactured by Shin-Etsu Chemical) and 1.5 g of 2,2'-azobis(2,4-dimethylvaleronitrile) (trade name: V-65, manufactured by Wako Pure Chemical Industries) as a polymerization initiator. The monomer solution was added dropwise to 100 g of toluene placed in a reaction container over 1 hour in a nitrogen atmosphere, while the mixture was heated to 100° C. The mixture was allowed to react additionally for one hour. A polymerization initiator solution containing 0.5 g of 2,2'-azobis(2,4-dimethylvaleronitrile) (trade name: V-65) dissolved in 20 g of toluene was added dropwise thereto over 10 minutes, and the mixture was allowed to react additionally for 4 hours. Then toluene was removed by distillation under reduced pressure, to obtain a curable resin B-57 that was liquid at room temperature.

Examples 80 to 92

In a planetary mixer, 100 g of one of the curable resins B-45 to B-57 prepared in Preparative Examples 45 to 57, 40 g of a methacrylic acid resin powder (trade name: MR-10G, manufactured by Soken Chemical & Engineering) and 0.03 g of silica aerogel hydrophobilized with dimethylsiloxane (trade name: R-812, manufactured by Nippon Aerosil) were placed and kneaded while heated and dehydrate at 100° C. under reduced pressure. Then 114 g of allyl glycidyl ether, 0.5 g of γ-mercaptopropyltrimethoxysilane (trade name: KBM803, manufactured by Shin-Etsu Chemical trade name) and 0.2 g of a boron trifluoride piperidine complex were added thereto and kneaded, to obtain a curable resin composition. Each of these curable resin compositions was filled rapidly in a container with a stopper and tightly sealed, with left at 23° C. for 2 weeks or more. It was then hardened at a temperature of 23° C. and a relative humidity of 50 to 60%, and the skinning period thereof was determined. The results are summarized in Table 20.

Comparative Example 17

In a planetary mixer, 100 g of the curable resin B-47 obtained in Preparative Example 47, 40 g of methacrylic acid resin powder (trade name: MR-10G, manufactured by Soken Chemical & Engineering) and 0.03 g of silica aerogel hydrophobilized with dimethylsiloxane (trade name: R-812, manufactured by Nippon Aerosil) were placed and kneaded, while heated and dehydrated at 100° C. under reduced pressure. Then 0.5 g of γ-mercaptopropyltrimethoxysilane (trade name: KBM803, manufactured by Shin-Etsu Chemical trade name) and 0.2 g of a dialkyltin bis(triethoxy silicate) (trade name: Neostan U-303, manufactured by Nitto Kasei Co., Ltd.) were added thereto and kneaded, to obtain a curable resin composition. Each of the curable resin compositions was filled rapidly in a container with a stopper and tightly sealed, with left at 23° C. for 2 weeks or more. It was then hardened at a temperature of 23° C. and a relative humidity of 50 to 60%, and the skinning period thereof was determined. The results are summarized in Table 20.

TABLE 20

| | curable resin | skinning period (min) |
|---|---|---|
| example 80 | B-45 | 2-3 |
| example 81 | B-46 | 2-3 |
| example 82 | B-47 | 2-3 |
| example 83 | B-48 | 2-3 |
| example 84 | B-49 | 2-3 |
| example 85 | B-50 | 1-2 |
| example 86 | B-51 | 1-2 |
| example 87 | B-52 | 2-3 |
| example 88 | B-53 | 3-5 |
| example 89 | B-54 | 2-3 |
| example 90 | B-55 | 3-5 |
| example 91 | B-56 | 2-3 |
| example 92 | B-57 | 20-25 |
| comparative example 17 | B-47 | 120 or more |

As apparent from the results shown in Table 20, each of the resin compositions of Examples 80 to 91 has a short skinning period. The extremely low hardening speed in Comparative Example 17 seems to be the result of inactivation of the dialkyltin compound by the thiol group of mercaptosilane. In other words, if a boron trifluoride compound is used as the curing catalyst, a mercaptosilane compound is possibly used as the adhesiveness improver without delaying hardening. Although mercaptosilane compounds are known to have a great adhesiveness-improving effect (in particular, to metals), considering that use of an organic tin compound is practically difficult because of the delay in hardening, use of a boron trifluoride compound as the curing catalyst is very useful for industrial applications. The present invention allows use of a mercaptosilane compound as the adhesiveness improver, and provides a curable resin composition very favorable in adhesiveness to various metals.

Preparative Example 57

In a reaction container placed were 100 g of a methyldimethoxysilyl group-containing polyoxyalkylene (trade name: S203, manufactured by Kaneka Corporation) and 400 g of toluene. Separately, a monomer solution was prepared by mixing 30 g of butyl acrylate, 30 g of lauryl methacrylate, 10 g of γ-methacryloxypropyltrimethoxysilane (trade name: KBM503, manufactured by Shin-Etsu Chemical), and 1 g of 2,2'-azobis(2,4-dimethylvaleronitrile) (trade name: V-65, manufactured by Wako Pure Chemical Industries) as a polymerization initiator. The monomer solution was added dropwise into the reaction container above over one hour, while heated to 100° C. in a nitrogen atmosphere, and the mixture was allowed to react additionally for one hour. Then, a polymerization initiator solution containing 0.5 g of 2,2'-azobis(2,4-dimethylvaleronitrile) (trade name: V-65) dissolved in 20 g of toluene was added dropwise thereto over 10 minutes, and the mixture was allowed to react additionally for 4 hours. Toluene was removed by distillation under reduced pressure, to obtain a curable resin B-58, that was a mixture of a curable polyoxyalkylene polymer and a curable vinyl polymer, and that was liquid at room temperature.

Examples 93 to 97 and Comparative Example 18

The curable resin B-24 or the curable resin B-58 was placed in a planetary mixer and stirred, while heated and dehydrated at 100° C. for one hour under reduced pressure. It was then cooled to room temperature, and the raw materials shown in Table 21 were added in the amounts (parts by weight) shown in Table 21. The mixture was kneaded under reduced pressure for 30 minutes, to obtain six kinds of moisture-curing adhesive compositions. The viscosity of each of the adhesive compositions at 23° C. was determined by using a Type-B model viscometer. Results are summarized in Table 21.

Each of the moisture-curing adhesive composition was filled in a 250 ml aluminum-laminated tube by using a sealed filling machine and left at 23° C. for 2 weeks or more. Then the skinning period and the adhesive strength thereof were determined. The adhesive strength was determined according to the following method. Results are summarized in Table 21.

<Adhesive Strength>

A 0.2 g portion of a moisture-curing adhesive composition was applied on the surface (25 mm×25 mm) of a soft steel plate (25 mm×100 mm); the coated surface was bonded to an acrylic plate (25 mm×25 mm); the composite was aged at 23° C. and a relative humidity of 50 to 60% for 7 days; and the tensile shear adhesive strength (N/mm$^2$) thereof was determined according to JIS K 6850.

As apparent from the results shown in Table 21, use of a boron trifluoride monoethylamine complex as the curing catalyst results in drastic shortening of the skinning period. In Comparative Example 18, the composition was not hardened sufficiently under the condition of 23° C. and a relative humidity of 50 to 60% for 7 days, and it is probably because the organic tin catalyst was inactivated by the mercaptosilane compound to reduce the curing speed.

INDUSTRIAL APPLICABILITY

The curable resins having the silicon-containing functional group, which are hardened extremely rapidly in the presence of moisture in the atmosphere, provide fast-curing adhesives, sealants, paints, coating agents, fillers, molding materials, coating materials and the like, that are cured at room temperature, and they are effective in improving the efficiency of the operations such as bonding and sealing. In addition, it is possible to provide new fast-curing solvent-free adhesives usable in various applications by applying the composition to moisture-curing adhesives, because it is possible to prevent degradation of the plastic material when it is used for bonding or sealing of a plastic material containing hydrolytic groups, improve adhesiveness, and to alleviate the danger and health hazards by use of heavy metals. It is also possible to improve the adhesiveness to various metals and thus, the composition according to the invention provides fast-curing products superior in adhesiveness.

TABLE 21

| | example | | | | | comparative |
|---|---|---|---|---|---|---|
| | 93 | 94 | 95 | 96 | 97 | example 18 |
| curable resin B-24 | 100 | | 100 | 100 | | 100 |
| curable resin B-58 | | 100 | | | | |

TABLE 21-continued

|  |  | example | | | | | comparative |
|---|---|---|---|---|---|---|---|
|  |  | 93 | 94 | 95 | 96 | 97 | example 18 |
| ES-GX3440ST*36 |  |  |  |  |  | 100 |  |
| n-undecane |  |  | 20 |  |  |  |  |
| Actflow 300*37 |  | 30 |  |  |  |  |  |
| KC-89S*38 |  |  |  | 30 | 30 | 30 | 30 |
| KBM-603*39 |  | 5 | 5 | 5 | 5 | 5 | 5 |
| KBM-803*40 |  | 5 | 5 | 5 | 5 | 5 | 5 |
| Neostan U-830*41 |  | 2 | 2 | 2 |  | 2 | 2 |
| Neostan U-600*42 |  |  |  |  | 2 |  |  |
| boron trifluoride monoethylamin |  | 0.2 | 0.2 | 0.2 | 0.2 | 0.2 |  |
| viscosity (mPa·s) |  | 9000 | 12000 | 6500 | 6500 | 5000 | 6500 |
| skinning period |  | 10-15 min | 15-20 min | 10-15 min | 10-15 min | 20-25 min | not skinning over 2 hrs. |
| adhesive strength (N/mm$^2$) | soft steel plate/ acrylic resin | 5.92 | 4.57 | 5.99 | 5.76 | 4.01 | 2.24 |

*36 trade name of polyoxyalkylene having a trialkoxysilyl radical, manufactured by Asahi Glass
*37 trade name of acrylic oligomer having an alkoxysilyl radical, manufactured by Soken Chemical & Engineering
*38 trade name of silicone oligomer having an alkoxysilyl radical, manufactured by Shin-Etsu Chemical
*39 trade name of N-β-(aminoethyl)-γ-aminopropyltrimethoxysilane manufactured by Shin-Etsu Chemical
*40 trade name of γ-mercaptopropyltrimethoxysilane manufactured by Shin-Etsu Chemical
*41 trade name of dioctylstannoxane di(neodecanoate) manufactured by Nitto Kasei

The invention claimed is:

1. A curable resin composition, comprising:
    a curable resin intramolecularly having a silicon-containing functional group represented by general formula: —SiX$^1$X$^2$X$^3$ (wherein, X$^1$, X$^2$ and X$^3$ respectively represent a hydrolytic group and may be the same as or different from each other);
    a Lewis acid or a complex of the Lewis acid, the Lewis acid being selected from the group consisting of metal halides and boron halides; and
    a mercaptosilane compound intramolecularly having a hydrolytic silyl or silanol group and a mercapto group.

2. A curable resin composition comprising:
    a curable resin intramolecularly having a silicon-containing functional group represented by general formula: —SiX$^1$X$^2$X$^3$ (wherein, X$^1$, X$^2$ and X$^3$ respectively represent a hydrolytic group and may be the same as or different from each other);
    a Lewis acid or a complex of the Lewis acid, the Lewis acid being a boron halide; and
    an organic tin compound in an amount of 0.01 to 10 parts by weight with respect to 100 parts by weight of the curable resin.

3. The curable resin composition according to claim 2, wherein the organic tin compound includes a dioctyltin compound.

4. A curable resin composition comprising:
    a curable resin intramolecularly having: a silicon-containing functional group represented by general formula: —SiR$^1$X$^1$X$^2$ (wherein X$^1$ and X$^2$ respectively represent a hydrolytic group and may be the same as or different from each other, and R$^1$ represents a substituted or unsubstituted organic group having 1 to 20 carbons); and at least one polar component selected from the group consisting of urethane, thiourethane, urea, thiourea, substituted urea, substituted thiourea, amide, and sulfide bonds, and hydroxyl, secondary amino and tertiary amino groups;
    a Lewis acid or a complex of the Lewis acid, the Lewis acid being selected from the group consisting of metal halides and boron halides; and
    a mercaptosilane compound intramolecularly having a hydrolytic silyl or silanol group and a mercapto group.

* * * * *